(12) United States Patent
Jang et al.

(10) Patent No.: US 12,507,237 B2
(45) Date of Patent: Dec. 23, 2025

(54) METHOD AND APPARATUS FOR REPETITIVE TRANSMISSION AND RECEPTION CONSIDERING BEAM APPLICATION TIME IN WIRELESS COMMUNICATION SYSTEM

(71) Applicant: Samsung Electronics Co., Ltd., Gyeonggi-do (KR)

(72) Inventors: Youngrok Jang, Gyeonggi-do (KR); Kyoungmin Park, Gyeonggi-do (KR); Ameha Tsegaye Abebe, Gyeonggi-do (KR); Seongmok Lim, Gyeonggi-do (KR); Hyoungju Ji, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 427 days.

(21) Appl. No.: 18/093,103

(22) Filed: Jan. 4, 2023

(65) Prior Publication Data

US 2023/0217442 A1 Jul. 6, 2023

(30) Foreign Application Priority Data

Jan. 5, 2022 (KR) ........................ 10-2022-0001819

(51) Int. Cl.
*H04W 72/20* (2023.01)
*H04L 1/18* (2023.01)
*H04L 5/00* (2006.01)

(52) U.S. Cl.
CPC ............... *H04W 72/20* (2023.01); *H04L 1/18* (2013.01); *H04L 5/0092* (2013.01)

(58) Field of Classification Search
CPC ......... H04L 1/18; H04L 5/0092; H04W 72/20
See application file for complete search history.

(56) References Cited

U.S. PATENT DOCUMENTS

2021/0259001 A1 8/2021 Park et al.
2022/0295530 A1 9/2022 Lee et al.
(Continued)

FOREIGN PATENT DOCUMENTS

| KR | 1020210083845 | 7/2021 |
|---|---|---|
| KR | 10-2021-0103319 | 8/2021 |
| KR | 10-2022-0126012 | 9/2022 |

OTHER PUBLICATIONS

Vivo, "Remaining Issues on Multi-TRP for PDCCH, PUCCH and PUSCH Enhancements", R1-2110991, 3GPP TSG RAN WG1 #107-e, Nov. 11-19, 2021, 21 pages.
(Continued)

*Primary Examiner* — Brian P Cox
(74) *Attorney, Agent, or Firm* — The Farrell Law Firm, P.C.

(57) ABSTRACT

The present disclosure relates to a 5G communication system or a 6G communication system for supporting higher data rates beyond a 4G communication system such as long term evolution (LTE). More specifically, a method performed by a user equipment (US) in a wireless communication system is provided, the method including transmitting, to a base station (BS), at least one first physical uplink shared channel (PUSCH) of a PUSCH repetition based on at least one first unified transmission configuration indicator (TCI) state, receiving, from the BS, downlink control information (DCI) including information indicating at least one second unified TCI state, and performing an operation for at least one second PUSCH of the PUSCH repetition based on the information, wherein the at least one second PUSCH of the PUSCH repetition is after a beam application time (BAT) from a physical uplink control channel (PUCCH) for the DCI.

20 Claims, 38 Drawing Sheets

(56) References Cited

U.S. PATENT DOCUMENTS

2023/0029850 A1 2/2023 Park et al.
2024/0008044 A1* 1/2024 Bai ..................... H04B 7/0695
2024/0406889 A1* 12/2024 Yuan .................... H04W 52/48

OTHER PUBLICATIONS

Moderator (Samsung), "Moderator Summary for Multi-beam Enhancement", R1-2111715, 3GPP TSG RAN WG1 #107-e, Nov. 11-19, 2021, 46 pages.
Moderator (AT&T), "Summary of UE Features for Further Enhancements on NR-MIMO", R1-2109912, 3GPP TSG RAN WG1 #106bis-e, Oct. 11-19, 2021, 135 pages.
MediaTek Inc., "Enhancement on Multi-beam Operation", R1-2112276, 3GPP TSG RAN WG1 #107-e, Nov. 11-19, 2021, 18 pages.
International Search Report dated Apr. 7, 2023 issued in counterpart application No. PCT/KR2023/000017, 7 pages.

* cited by examiner

METHOD AND APPARATUS FOR REPETITIVE TRANSMISSION AND RECEPTION CONSIDERING BEAM APPLICATION TIME IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0001819, filed on Jan. 5, 2022, in the Korean Intellectual Property Office, the disclosure of which is incorporated by reference herein in its entirety.

BACKGROUND

1. Field

The disclosure relates generally to a wireless communication system, and more particularly, to a method and an apparatus for repetitive transmission and reception considering a beam application time in the wireless communication system.

2. Description of the Related Art

To meet the increased demand for wireless data traffic since deployment of 4G communication systems, efforts have been made to develop an improved 5G or pre-5G communication system. Therefore, the 5G or pre-5G communication system is also called a 'beyond 4G network' or a 'post LTE system'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (mMIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, the Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Accordingly, various attempts to apply the 5G communication system to the IoT are being made. For example, 5G communication technologies, such as a sensor network, M2M and MTC, are implemented by schemes, such as beamforming, MIMO, and an array antenna. The application of a cloud wireless access network (cloud RAN) as the aforementioned big data processing technology may be said to be an example of convergence between the 3eG technology and the IoT technology.

As various services are provided according to the advances of the wireless communication system as mentioned above, a solution for seamlessly providing such services is demanded.

SUMMARY

According to various embodiments, a user equipment (UE) in a wireless communication system is provided, the UE including a transceiver; and a controller coupled with the transceiver and configured to: transmit, to a base station (BS), at least one first physical uplink shared channel (PUSCH) of a PUSCH repetition based on at least one first unified transmission configuration indicator (TCI) state, receive, from the BS, downlink control information (DCI) including information indicating at least one second unified TCI state, and perform an operation for at least one second PUSCH of the PUSCH repetition based on the information, wherein the at least one second PUSCH of the PUSCH repetition is after a beam application time (BAT) from a physical uplink control channel (PUCCH) for the DCI.

According to various embodiments, a base station (BS) in a wireless communication system is provided, the BS including a transceiver; and a controller coupled with the transceiver and configured to: receive, from a user equipment (UE), at least one first physical uplink shared channel (PUSCH) of a PUSCH repetition based on at least one first unified transmission configuration indicator (TCI) state, and transmit, from the UE, downlink control information (DCI) including information indicating at least one unified second TCI state, wherein an operation for at least one second PUSCH of the PUSCH repetition is performed based on the information, and wherein the at least one second PUSCH of the PUSCH repetition is after a beam application time (BAT) from a physical uplink control channel (PUCCH) for the DCI.

According to various embodiments, a method performed by a user equipment (UE) in a wireless communication system is provided, the method including transmitting, to a base station (BS), at least one first physical uplink shared channel (PUSCH) of a PUSCH repetition based on at least one first unified transmission configuration indicator (TCI) state; receiving, from the BS, downlink control information (DCI) including information indicating at least one second unified TCI state; and performing an operation for at least one second PUSCH of the PUSCH repetition based on the information, wherein the at least one second PUSCH of the PUSCH repetition is after a beam application time (BAT) from a physical uplink control channel (PUCCH) for the DCI.

According to various embodiments, a method performed by a base station (BS) in a wireless communication system is provided, the method including receiving, from a user equipment (UE), at least one first physical uplink shared channel (PUSCH) of a PUSCH repetition based on at least one first unified transmission configuration indicator (TCI) state, and transmitting, from the UE, downlink control information (DCI) including information indicating second at least one unified TCI state, wherein an operation for second at least one PUSCH of the PUSCH repetition is performed based on the information, and wherein the second at least one PUSCH of the PUSCH repetition is after a beam application time (BAT) from a physical uplink control channel (PUCCH) for the DCI.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
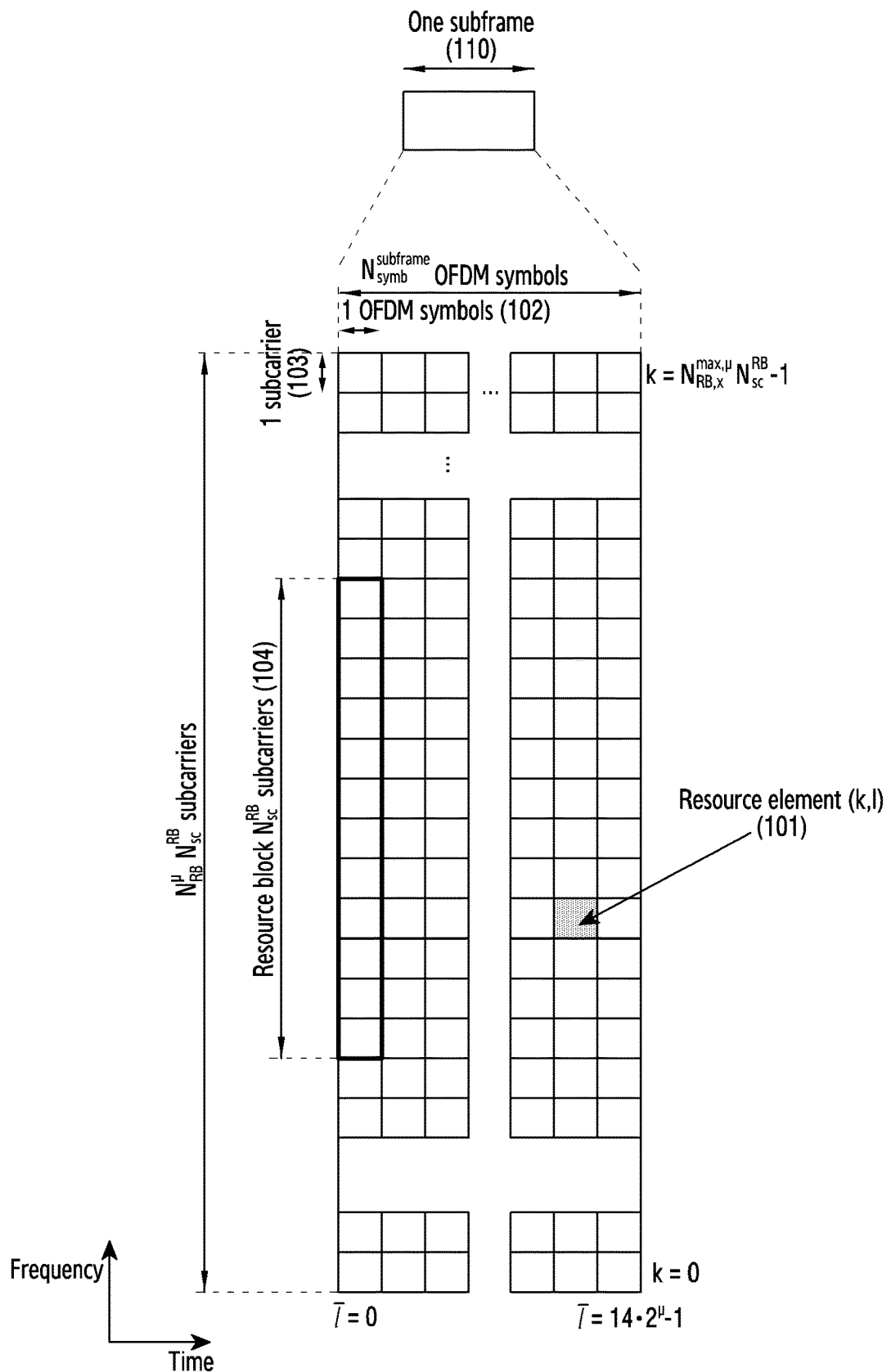
FIG. 1 illustrates a fundamental structure of a time-frequency domain in a wireless communication system according to an embodiment.

Hereinafter, embodiments of the disclosure are described in detail with reference to the accompanying drawings.

In describing the embodiments, technical contents well known in the technical field to which the disclosure pertains and which are not directly related to the disclosure will be omitted in the specification. This is to more clearly provide the subject matter of the disclosure by omitting unnecessary descriptions without obscuring the subject matter of the disclosure.

For the same reason, some components in the accompanying drawings are exaggerated, omitted, or schematically illustrated. Also, a size of each component does not entirely reflect an actual size. The same reference number is given to the same or corresponding element in each drawing.

Advantages and features of the disclosure, and methods for achieving them will be clarified with reference to embodiments described below in detail together with the accompanying drawings. However, the disclosure is not limited to the embodiments disclosed below but may be implemented in various different forms, the embodiments are provided to only complete the scope of the disclosure and to allow those skilled in the art to which the disclosure pertains to fully understand a category of the disclosure, and the disclosure is solely defined within the scope of the claims. The same reference numeral refers to the same element throughout the specification. Also, in describing the disclosure, a detailed description of a related known function or configuration will be omitted if it is deemed to make the gist of the disclosure unnecessarily vague. Terms to be described hereafter have been defined by taking into consideration functions in the disclosure, and may be different depending on a user or an operator's intention or practice. Accordingly, they should be defined based on contents over the entire specification.

Hereinafter, a base station is an entity which performs resource assignment of a terminal, and may be at least one of a gNode B, an eNode B, a Node B, a base station (BS), a radio access unit, a BS controller and a node on a network. The terminal may include a user equipment (UE), a mobile station (MS), a cellular phone, a smartphone, a computer and a multimedia system for performing a communication function. In the disclosure, downlink (DL) indicates a radio transmission path of a signal transmitted from a base station to a terminal, and uplink (UL) indicates a radio transmission path of a signal transmitted from a terminal to a base station. In addition, a long term evolution (LTE) or LTE-advanced (A) system may be explained as an example, but the embodiments of the disclosure may be applied to other communication systems having a similar technical background or channel form. For example, a 5th generation (5G) mobile communication technology (new radio (NR)) developed after LTE-A may be included herein, and 5G may be a concept embracing the existing LTE and LTE-A and similar other services. Further, the disclosure may also be applied to other communication systems through some modifications without significantly departing from the range of the disclosure based on determination of those skilled in the technical knowledge.

At this time, it will be understood that each block of the process flowchart illustrations and combinations of the flowchart illustrations may be executed by computer program instructions. Since these computer program instructions may be mounted on a processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Also, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

At this time, the term '~unit' as used herein indicates software or a hardware component such as a field programmable gate array (FPGA) or an application-specific integrated circuit (ASIC), and unit may perform specific roles. However, unit is not limited to software or hardware. A unit may be configured to reside on an addressable storage medium and configured to reproduce on one or more processors. Accordingly, unit may include, for example, components such as software components, object-oriented software components, class components and task components, processes, functions, attributes, procedures, sub-routines, segments of program code, drivers, firmware, microcode, circuitry, data, databases, data structures, tables, arrays, and variables. The functionalities provided in the components and a unit may be combined to fewer components and units or may be further separated into additional components and units. Further, the components and units may be implemented to reproduce one or more central processing units (CPUs) within a device or a security multimedia card. Also, a unit in one embodiment may include one or more processors.

A wireless communication system is evolving from its early voice-oriented service to, for example, a broadband wireless communication system which provides high-speed, high-quality packet data services according to communication standards such as high-speed packet access (HSPA) of 3rd generation partnership project (3GPP), LTE or evolved universal terrestrial radio access (E-UTRA), LTE-A, LTE-Pro, high-rate packet data (HRPD) of 3GPP2, ultra-mobile broadband (UMB), and Institute of Electrical and Electronics Engineers (IEEE) 802.16e.

As a representative example of the broadband wireless communication system, the LTE system employs an orthogonal frequency division multiplexing (OFDM) scheme in the DL, and a single-carrier frequency-division multiple access (SC-FDMA) scheme in the UL. The UL indicates a radio link through which a UE or an MS transmits data or a control signal to an eNode B or a BS, and the DL indicates a radio link through which an eNode B or a BS transmits data or a control signal to a UE or an MS. Such a multi-access scheme generally distinguishes data or control information of each user by assigning and operating time-frequency resources for carrying data or control information of each user not to overlap, that is, to establish orthogonality.

A future communication system after LTE, that is, the 5G communication system, should be able to freely reflect various requirements of users and service providers, and accordingly should support a service for simultaneously satisfying various requirements. Services considered for the 5G communication systems includes enhanced mobile broadband (eMBB), massive machine type communication (mMTC), ultra reliability low latency communication (URLLC) and so on.

The eMBB aims to provide a faster data rate than a data rate supported by existing LTE, LTE-A or LTE-Pro. For example, the eMBB in the 5G communication system should be able to provide a peak data rate of 20 gigabits per second (Gbps) in the DL and 10 Gbps in the UL in terms of one base station. In addition, the 5G communication system should provide the peak data rate and concurrently provide an increased user perceived data rate of the terminal. To satisfy these requirements, improvements of various transmission and reception technologies are required, including a further advanced multi input multi output (MIMO) transmission technology. In addition, while signals are transmitted using a maximum 20 megahertz. (MHz) transmission bandwidth in a 2 GHz band used by the LTE, the 5G communication system uses a frequency bandwidth wider than 20 MHz in the frequency band of 3~6 GHz or 6 GHz or higher, thus satisfying the required data rate in the 5G communication system.

At the same time, the 5G communication system is considering mMTCl to support application services such as the Internet of things (IoT). The mMTCl requires large-scale terminal access support in a cell, terminal coverage enhancement, improved battery time, and terminal cost reduction to efficiently provide the IoT. The IoT is attached to various sensors and various devices to provide communication functions and accordingly should be able to support a great number of terminals (e.g., 1,000,000 terminals/km²) in the cell. In addition, the terminal supporting the mMTCl is highly likely to be located in a shaded area not covered by the cell such as a basement of building due to its service characteristics, and thus may require wider coverage than other services provided by the 5G communication system. A terminal supporting mMTCl should be configured with a low-priced terminal, and may require a quite long battery lifetime such as 10~15 years because it is difficult to frequently replace the battery of the terminal.

Finally, URLLC is a cellular-based wireless communication service used for mission-critical purposes. For example, services used for robot or machinery remote control, industrial automation, unmanaged aerial vehicle, remote health care, emergency situations, or the like may be considered. Thus, the communication provided by URLLC should provide very low latency and very high reliability. For example, a service supporting URLLC should meet air interface latency smaller than 0.5 milliseconds and at the same time has requirements of a packet error rate below $10^{-5}$. Hence, for the service supporting URLLC, the 5G system should provide a transmit time interval (TTI) smaller than other services, and concurrently requires design issues for allocating a wide resource in the frequency band to obtain communication link reliability.

Three services of the 5G, that is, eMBB, URLLC, and mMTCl may be multiplexed and transmitted in one system. At this time, to satisfy the different requirements of the respective services, different transmission and reception schemes and transmission and reception parameters may be used between the services. Notably, 5G is not limited to the aforementioned three services.

NR Time-Frequency Resource

Hereafter, a frame structure of the 5G system will be described in more detail with reference to the drawings.

FIG. 1 illustrates a fundamental structure of a time-frequency domain in a wireless communication system according to an embodiment. Specifically, the fundamental structure of the time-frequency domain which is a radio resource domain transmitting data or a control channel in the 5G system is depicted.

Referring to FIG. 1, a horizontal axis indicates the time domain, and a vertical axis indicates the frequency domain in FIG. 1. A resource basic unit in the time and frequency domains is a resource element (RE) 101 and may be defined as one OFDM symbol 102 on the time axis and one subcarrier 103 on the frequency axis. $N_{SC}^{RB}$-ary (e.g., 12) consecutive REs may constitute one resource block (RB) 104 in the frequency domain. In addition, $N_{symb}^{slot}$-ary consecutive OFDM symbols may constitute one subframe 110 in the time domain.

Figure 2:
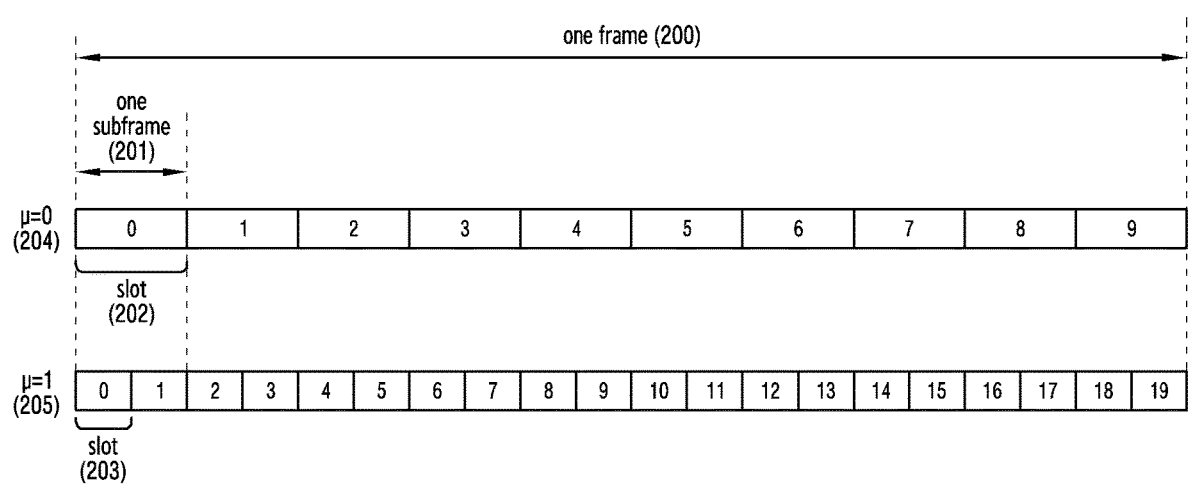
FIG. 2 illustrates frame, subframe, and slot structures in a wireless communication system according to an embodiment.

FIG. 2 illustrates frame, subframe, and slot structures in a wireless communication system according to an embodiment.

FIG. 2 illustrates an example of structures of a frame 200, a subframe 201, and a slot 202. One frame 200 may be defined as 10 ms. One subframe 201 may be defined as 1 ms, and accordingly one frame 200 may include 10 subframes 201 in total. One slot 202 and 203 may be defined as 14 OFDM symbols (i.e., the number of symbols $N_{symb}^{slot}$ for one slot=14). One subframe 201 may include one or more slots 202 and 203, and the number of the slots 202 and 203 for one subframe 201 may vary depending on a subcarrier spacing configuration value μ 204 or 205.

The embodiment of FIG. 2 illustrates that μ=0 204 and μ=1 205 as the subcarrier spacing configuration value. One subframe 201 may include one slot 202 if μ=0 204, and one subframe 201 may include two slots 203 if μ=1 205. That is, the number of slots $N_{slot}^{subframe,\mu}$ for one subframe may vary depending on the subcarrier spacing configuration value p, and accordingly the number of slots $N_{slot}^{frame,\mu}$ for one frame may vary. $N_{slot}^{subframe,\mu}$ and $N_{slot}^{frame,\mu}$ depending on each subcarrier spacing configuration value y may be defined as shown in the following Table 1.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Bandwidth Part (BWP)

Next, BWP configuration in the 5G communication system shall be described in detail with reference to the drawings.

Figure 3:
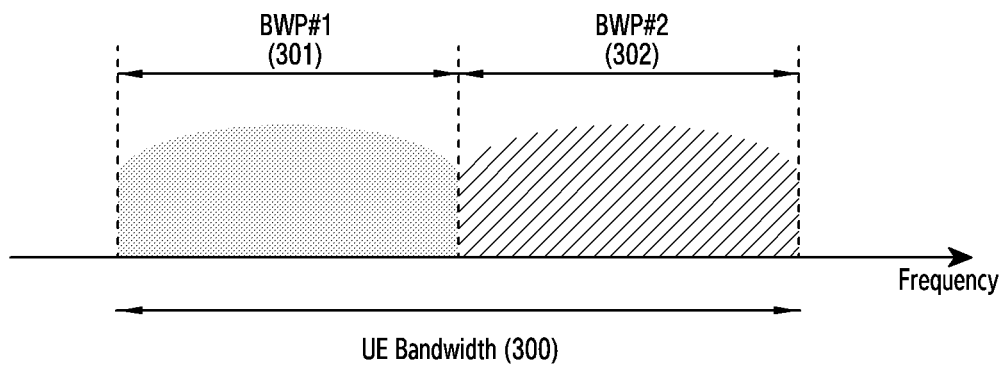
FIG. 3 illustrates a bandwidth part configuration in a wireless communication system according to an embodiment.

FIG. 3 illustrates BWP configuration in a wireless communication system according to an embodiment.

FIG. 3 shows an example in which a UE bandwidth 300 includes two BWPs, that is, a BWP #1 301 and a BWP #2 302. The base station may configure one or more BWPs for the UE, and may configure the following information for each BWP.

TABLE 2

```
BWP : :=                SEQUENCE {
   bwp-Id                  BWP-Id,
   locationAndBandwidth    INTEGER (1..65536),
   subcarrierSpacing       ENUMERATED {n0, n1, n2, n3, n4, n5},
   cyclicPrefix            ENUMERATED { extended }
}
```

Notably, the disclosure is not limited to the above example, and various parameters related to the BWP besides the above configuration information may be configured in the UE. The base station may transmit the above information to the UE through higher layer signaling, for example, radio resource control (RRC) signaling. At least one of the BWPs configured may be activated. The activation of the configured BWP may be transmitted from the base station to the UE semi-statically through the RRC signaling or dynamically through downlink control information (DCI).

According to an embodiment, an initial BWP for initial access may be configured for the UE prior to an RRC connection by the base station through a master information block (MIB). More specifically, the UE may receive configuration information of a control resource set (CORESET) for transmitting a physical downlink control channel (PDCCH) and a search space to receive system information (for example, remaining system information (RMSI) or system information block 1 (SIB1)) required for the initial access through the MIB at the initial access. The CORESET and the search space configured with the MIB each may be regarded as an identity (ID) 0. The base station may notify the UE of configuration information such as frequency allocation information, time allocation information, numerology, and so on, of a CORESET #0 through the MIB. In addition, the base station may notify the UE of monitoring periodicity and occasion configuration information for the CORESET #0, that is, configuration information of a search space #0, through the MIB. The UE may regard the frequency domain configured with the CORESET #0 obtained from the MIB as the initial BWP for the initial access. In so doing, the ID of the initial BWP may be regarded as 0.

BWP configuration supported by 5G may be used for various purposes.

According to an embodiment, if a bandwidth supported by the UE is smaller than a system bandwidth, it may be supported through the BWP configuration. For example, the base station may configure frequency location (configuration information 2) of the BPW for the UE, and thus the UE may transmit and receive data at a specific frequency location within the system bandwidth.

According to an embodiment, the base station may configure a plurality of BWPs for the UE to support different numerologies. For example, to support data transmission and reception using the subcarrier spacing of 15 kHz and the subcarrier spacing of 30 kHz for any UE, two BWPs may be configured with the subcarrier spacings of 15 kHz and 30 kHz respectively. Frequency division multiplexing may be performed on the different BWPs, and, to transmit and receive data with a specific subcarrier spacing, the BWP configured with the corresponding subcarrier spacing may be activated.

According to an embodiment, the base station may configure BWPs having different bandwidths to the UE for the sake of power consumption reduction of the UE. For example, if the UE supports a very large bandwidth, for example, a 100 MHz bandwidth, and always transmits and receives data through the corresponding bandwidth, considerable power consumption may be caused. In particular, it may be very inefficient in terms of power consumption to monitor an unnecessary downlink control channel with the great bandwidth of 100 MHz in the absence of traffic. The base station may configure a BWP having a relatively small bandwidth, for example, a 20 MHz BWP, to the UE, to reduce the power consumption of the UE. With no traffic, the UE may perform a monitoring operation in the 20 MHz BWP, and transmit and receive data using the 100 MHz BWP according to an instruction of the base station if data occurs.

In the method of configuring the BWP, UEs before RRC connected may receive initial BWP configuration information through the MIB at the initial access. More specifically, the UE may be configured from an MIB of a physical broadcast channel (PBCH), with a CORESET for a downlink control channel for transmitting DCI scheduling a system information block (SIB). The bandwidth of the CORESET configured with the MIB may be regarded as the initial BWP, and the UE may receive a physical download shared channel (PDSCH) transmitting the SIB through the configured initial BWP. The initial BWP may be utilized for other system information (OSI), paging, and random access, besides the SIB reception.

Change BWP

If one or more BWPs are configured for the UE, the base station may instruct the UE to change (for example, switch or transit) the BWP, using a BWP indicator field in the DCI. For example, if a currently activated BWP of the UE is the BWP #1 301 in FIG. 3, the base station may indicate the UE of the BWP #2 302 using the BWP indicator of the DCI, and the UE may change the BWP to the BWP #2 302 indicated by the BWP indicator of the received DCI.

As mentioned above, since the DCI-based BWP change may be indicated by the DCI for scheduling the PDSCH or the PUSCH, the UE, if receiving a BWP change request, may need to easily receive and transmit the PDSCH or PUSCH scheduled by the corresponding DCI in the changed BWP. For doing so, the standard regulates requirements for a delay time $T_{BWP}$ required in changing the BWP, and may be defined, for example, as follows:

TABLE 3

| μ | NR Slot length (ms) | BWP switch delay $T_{BWP}$ (slots) | |
|---|---|---|---|
| | | Type 1$^{Note\ 1}$ | Type 2$^{Note\ 1}$ |
| 0 | 1 | 1 | 3 |
| 1 | 0.5 | 2 | 5 |
| 2 | 0.25 | 3 | 9 |
| 3 | 0.125 | 6 | 18 |

Note 1

Depends on UE capability.

Note 2:

If the BWP switch involves changing of SCS, the BWP switch delay is determined by the larger one between the SCS before BWP switch and the SCS after BWP switch.

The requirements for the BWP change delay time supports delay time Type 1 or Type 2, depending on the UE capability. The UE may report its supportable BWP delay time type to the base station.

According to the above-described requirements for the BWP change delay time, if the UE receives the DCI including the BWP change indicator in a slot n, the UE may complete changing to a new BWP indicated by the BWP change indicator at a time not later than a slot n+$T_{BWP}$. In addition, the UE may perform data channel transmission and reception scheduled by the corresponding DCI in the newly changed BWP. If scheduling the data channel with the new BWP, the base station may determine time domain resource assignment for the data channel, by considering the BWP change delay time $T_{BWP}$ of the UE. That is, if scheduling the data channel with the new BWP, the base station may schedule a corresponding data channel after the BWP change delay time, in the method of determining the time domain resource assignment for the data channel. Hence, the UE may not expect that the DCI indicating the BWP change indicates a slot offset value (for example, K0 or K2) smaller than the BWP change delay time $T_{BWP}$.

If the UE receives the DCI (e.g., DCI format 1_1 or 0_1) indicating the BWP change, the UE may not perform any transmission or reception during a time period from a third symbol of the slot receiving the PDCCH including the corresponding DCI, to a starting point of a slot indicated by the slot offset value (for example, K0 or K2 indicated by the time domain resource assignment indicator field of the corresponding DCI. For example, if the UE receives the DCI indicating the BWP change in the slot n and the slot offset value indicated by the corresponding DCI is K, the UE may not perform any transmission or reception from the third symbol of the slot n to a symbol before a slot n+K (i.e., the last symbol of a slot n+K−1).

SS/PBCH Block

Next, a synchronization signal (SS)/PBCH block in the 5G shall be described.

The SS/PBCH block may indicate a physical layer channel block including a primary SS (PSS), a secondary SS (SSS), and a PBCH. Specifically:

PSS is a reference signal for downlink time/frequency synchronization, and may provide some information of the cell ID.

SSS is a reference signal for downlink time/frequency synchronization, and provides remaining cell ID information not provided by the PSS. Additionally, SSS may serve as a reference signal for PBCH demodulation.

PBCH provides essential system information required for data channel and control channel transmission and reception of the UE. The essential system information may include search space related control information indicating radio resource mapping information of the control channel, scheduling control information of a separate data channel transmitting the system information, and the like.

SS/PBCH block includes a combination of the PSS, the SSS, and the PBCH. One or more SS/PBCH blocks may be transmitted within a time of 5 ms, and each transmitted SS/PBCH block may be distinguished using an index.

The UE may detect the PSS and the SSS at the initial access, and decode the PBCH. The UE may acquire an MIB from the PBCH to thus configure a CORESET #0 (which may correspond to the CORESET having the index 0). The UE may assume that the selected SS/PBCH block and a DMRS transmitted in the CORESET #0 are quasi co-located (QCL) and monitor the CORESET #0. The UE may receive system information as downlink control information transmitted in the CORESET #0. The UE may obtain configuration information related to a random access channel (RACH) which is required for the initial access, from the received system information. The UE may transmit a physical RACH (PRACH) to the base station in consideration of the selected SS/PBCH index, and the base station receiving the PRACH may obtain information of the SS/PBCH block index selected by the UE. The base station may identify that the UE selects a certain block from the SS/PBCH blocks and monitors CORESET #0 associated with the certain block.

PDCCH: DCI Related

Next, the DCI in the 5G system shall be described in detail.

In the 5G system, scheduling information of uplink data (or PUSCH) or downlink data (or PDSCH) is transmitted from the base station to the UE through the DCI. The UE may monitor a fallback DCI format and a non-fallback DCI format with respect to the PUSCH or the PDSCH. The fallback DCI format may include a fixed field predefined between the base station and the UE, and the non-fallback DCI format may include a configurable field.

The DCI may be transmitted through the PDCCH after channel coding and modulation. A cyclic redundancy check (CRC) may be attached to a DCI message payload, and the CRC may be scrambled with a radio network temporary identifier (RNTI) corresponding to the identity of the UE. Different RNTIs may be used depending on a purpose of the DCI message, for example, UE-specific data transmission, power control command or random access response. That is, the RNTI is not explicitly transmitted but is included and transmitted in CRC calculation. If receiving a DCI message transmitted on the PDCCH, the UE may identify the CRC using the allocated RNTI, and recognize that the message is destined for the UE if the CRC result is correct.

For example, DCI for scheduling the PDSCH for the system information (SI) may be scrambled by an SI-RNTI. DCI for scheduling the PDSCH for a random access response (RAR) message may be scrambled by a random access (RA)-RNTI. DCI for scheduling the PDSCH for a paging message may be scrambled with a paging (P)-RNTI. DCI notifying a slot format indicator (SFI) may be scrambled with an SFI-RNTI. DCI notifying transmit power control (TPC) may be scrambled with a TPC-RNTI. DCI for scheduling a UE-specific PDSCH or PUSCH may be scrambled with a cell (C)-RNTI.

DCI format 0_0 may be used as the fallback DCI for scheduling the PUSCH, wherein the CRC may be scrambled with the C-RNTI. For example, the DCI format 0_0 in which the CRC is scrambled with the C-RNTI may include the following information:

TABLE 4

- Identifier for DCI formats - [1] bit
- Frequency domain resource assignment - [⌈$\log_2($ $N_{RB}^{UL,BWP}(N_{RB}^{UL,BWP} + 1)/2)$⌉ ] bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH - [2] bits
- UL/SUL indicator - 0 or 1 bit DCI format 0_1 may be used as the non-fallback DCI for scheduling the PUSCH, wherein the CRC may be scrambled with the C-RNTI. The DCI format 0_1 in which the CRC is scrambled with the C-RNTI may include, for example, the following information;

TABLE 5

- Carrier indicator - 0 or 3 bits
- UL/SUL indicator - 0 or 1 bits
- Identifier for DCI formats - [1] bits
- Bandwidth part indicator - 0, 1 or 2 bits
- Frequency domain resource assignment
• For resource allocation type 0, ⌈$N_{RB}^{UL,BWP}/P$⌉ bits
• For resource allocation type 1, ⌈$\log_2(N_{RB}^{UL,BWP}(N_{RB}^{UL,BWP} + 1)/2)$⌉ bits
- Time domain resource assignment -1, 2, 3, or 4 bits
- VRB(virtual resource block)--to-PRB(physical resource block) mapping - 0 or 1 bit, only for resoure allocation type 1.
• 0 bit if only resource allocation type 0 is configured;
• 1 bit otherwise.
- Frequency hopping flag - 0 or 1 bit, only for resource allocation type 1.
• 0 bit if only resource allocation type 0 is configured;
• 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
• 1 bit for semi-static HARQ-ACK codebook;
• 2 bits for dynamic HARQ-ACK codebook with single HARQ-ACK codebook.
- 2nd downlink assignment index - 0 or 2 bits
• 2 bits for dynamic HARQ-ACK codebook with two HARQ-ACK sub-codebooks;
• 0 bit otherwise.
- TPC command for scheduled PUSCH - 2 bits
- SRS resource indicator - ⌈$\log_2 (\Sigma_{k=1}^{Lmax}\Sigma(_k^{NSRS}))$⌉ or ⌈$\log_2(N_{SRS})$⌉ bits
• ⌈$\log_2 (\Sigma_{k-1}^{Lmax}\Sigma(_k^{NSRS}))$⌉ bits for non-codebook based PUSCH transmission;
• ⌈$\log_2(N_{SRS})$⌉ bits for codebook based PUSCH transmission.
- Precoding information and number of layers -up to 6 bits
- Antenna ports - up to 5 bits
- SRS request - 2 bits
- CSI request - 0, 1, 2, 3, 4, 5, or 6 bits
- CBG(code block group) transmission information - 0, 2, 4, 6, or 8 bits
- PTRS-DMRS association - 0 or 2 bits.
- beta_offset indicator - 0 or 2 bits
- DMRS sequency initialization - 0 or 1 bit DCI format 1_0 may be used as the fallback DCI for scheduling the PDSCH, wherein the CRC may be scrambled with the C-RNTI. The DCI format 1_0 in which the CRC is scrambled with the C-RNTI may include, for example, the following information:

TABLE 6

- Identifier for DCI formats - [1] bit
- Frequency domain resource assignment -[⌈$\log_2($ $N_{RB}^{DL,BWP}(N_{RB}^{DL,BWP} + 1)/2)$⌉ ] bits
- Time domain resource assignment - X bits
- TRB-to-PRB mapping - 1 bit.
- Modulation and coding scheme - 5 bits
- New data indicator - 1 bit
- Redundancy version - 2 bits
- HARQ process number - 4 bits
- Downlink assignment number - 2 bits
- TPC command for scheduled PUSCH - [2] bits
- PUCCH resource indicator - 3 bits
- PDSCH-to-HARQ feedback timing indicator - [3] bits DCI format 1_1 may be used as the non-fallback DCI for scheduling the PDSCH, wherein the CRC may be scrambled with the C-RNTI. The DCI format 1_1 in which the CRC is scrambled with the C-RNTI may include, for example, the following information:

TABLE 7

- Carrier indicator - 0 or 3 bits
- Identifier for DCI formats - [1] bits
- Bandwidth part indicator - 0, 1 or 2 bits
- Frequency domain resource assignment TABLE 7-continued For resource allocation type 0, ⌈$N_{RB}^{DL,BWP}/P$⌉ bits
For resource allocation type 1, ⌈$\log_2(N_{RB}^{DL,BWP}(N_{RB}^{DL,BWP} + 1)/2)$⌉ bits TABLE 7-continued

- Time domain resource assignment -1, 2, 3, or 4 bits
- VRB-to-PRB mapping - 0 or 1 bit, only for resource allocation type 1.
0 bit if only resource allocation type 0 is configured;
1 bit otherwise.
- PRB bundling size indicator - 0 or 1 bit
- Rate matching indicator - 0, 1, or 2 bits
- ZP CSI-RS trigger - 0, 1, or 2 bits TABLE 7-continued For tranposrt block 1:
- Modulation and coding scheme - 5 bits
- New data indicator - 1 bit
- Redundancy version - 2 bits
For tranposrt block 2:
- Modulation and coding scheme - 5 bits
- New data indicator - 1 bit
- Redundancy version - 2 bits
- HARQ process number - 4 bits
- Download assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit PDCCH: CORESET, REG, CCE, and Search Space Hereafter, a downlink control channel in the 5G communication system will be described in more detail with reference to the drawings.

Figure 4:
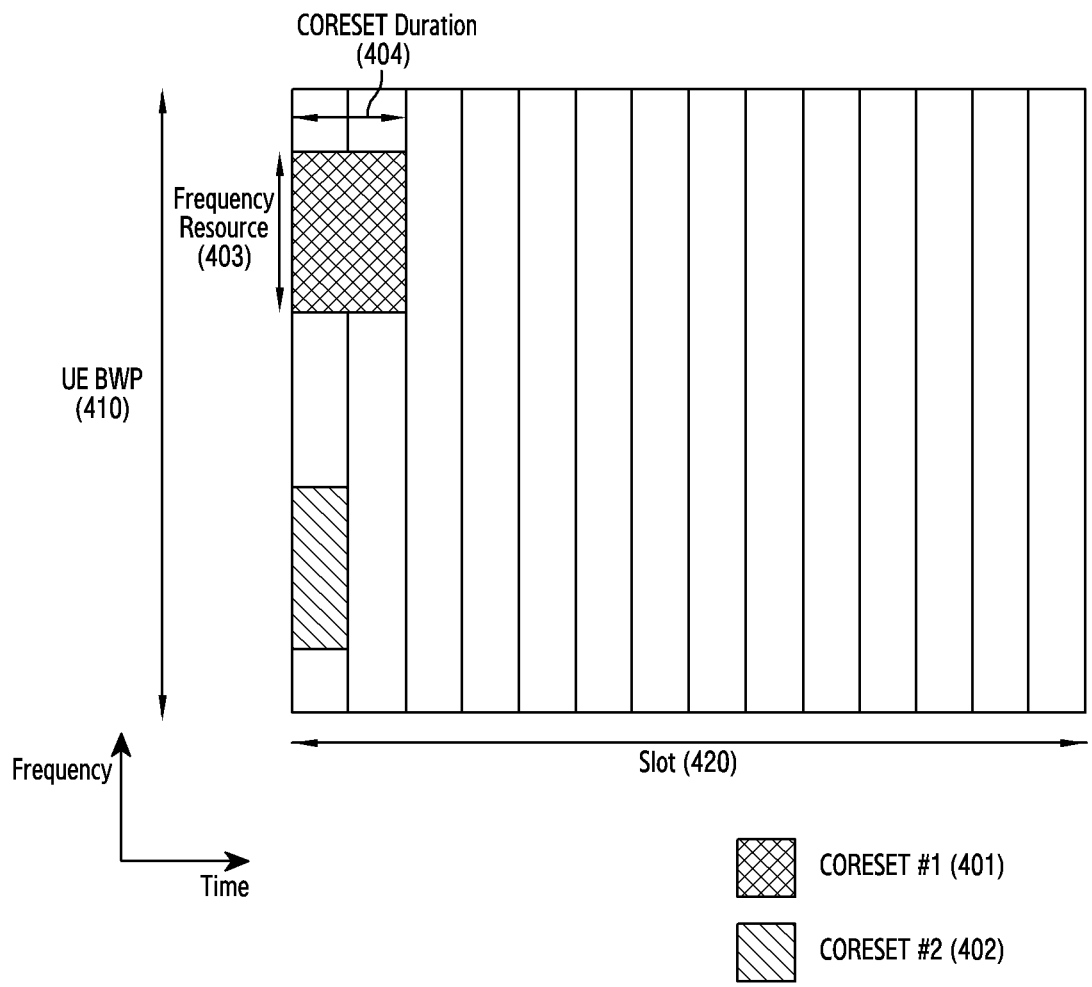
FIG. 4 illustrates a control resource set configuration of a downlink control channel in a wireless communication system according to an embodiment.

FIG. 4 illustrates a CORESET transmitting a downlink control channel in a wireless communication system according to an embodiment.

FIG. 4 illustrates an example in which a UE CORESET 410 on the frequency axis, and two CORESETs (CORESET #1 401, CORESET #2 402) in one slot 420 on the time axis are configured. The CORESETs 401 and 402 may be configured in a specific frequency resource 403 within the whole UE BWP 410 on the frequency axis. One or more OFDM symbols may be configured on the time axis and this may be defined as a CORESET duration 404. Referring to the example shown in FIG. 4, CORESET #1 401 is set to the CORESET duration of two symbols, and CORESET #2 402 is set to the CORESET duration of one symbol.

The above-described CORESET in 5G may be configured through higher layer signaling (e.g., SI, MIB, and RRC signaling) from the base station to the UE. Configuring the CORESET for the UE includes providing information such as CORESET identity, CORESET frequency occasion, and CORESET symbol duration. For example, it may include the following information:

TABLE 8

| ControlResourceSet : := | SEQUENCE { |
| --- | --- |
| -- Corresponds to L1 parameter 'CORESET-ID' | |
| controlResourceSetId | ControlResourceSetId, |
| frequencyDomainResources | BIT STRING (SIZE (45) ), |
| duration | INTEGER (1..maxCoReSetDuration), |
| cce-REG-MappingType | CHOICE { |
| interleaved | SEQUENCE { |
| reg-BundleSize | ENUMERATED {n2, n3, n6}, |
| precoderGranularity | ENUMERATED {sameAsREG-bundle, allContiguousRBs}, |
| interleaverSize | ENUMERATED {n2, n3, n6} |
| shiftIndex | |
| INTEGER (0..maxNrofPhysicalResourceBlocks-1) | |
| OPTIONAL | |
| }, | |
| nonInterleaved | NULL |
| }, | |
| tci-StatesPDCCH | SEQUENCE(SIZE |
| (1..maxNrofTCI-StatesPDCCH) ) OF TCI-StateId | OPTIONAL, |
| tci-PresentInDCI | ENUMERATED {enabled} |
| | OPTIONAL, -- Need S |
| } | |

In Table 8, tci-StatesPDCCH (for example, TCI state) configuration information may include information of one or more SS/PBCH block indexes or channel state information reference signal (CSI-RS) indexes which are quasi co-located with a DMRS transmitted in the corresponding CORESET.

Figure 5A:
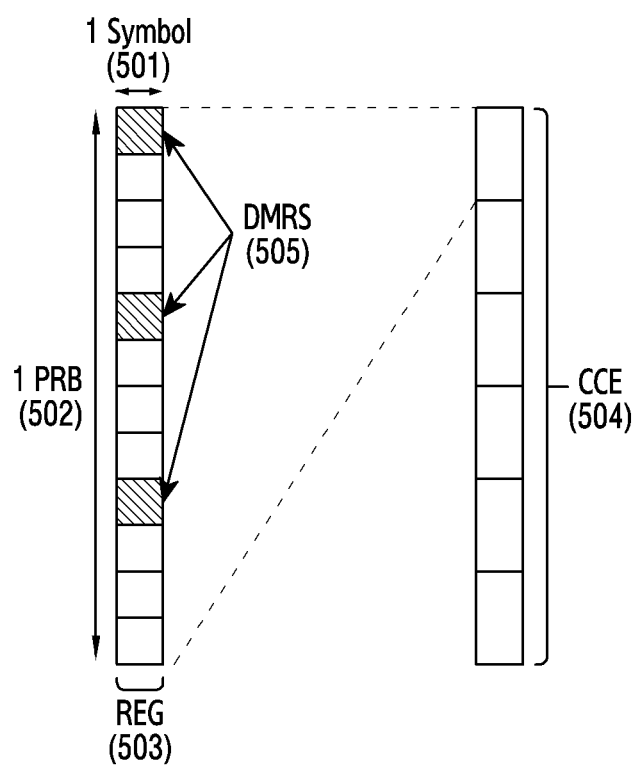
FIG. 5A illustrates a downlink control channel structure in a wireless communication system according to an embodiment.

FIG. 5A illustrates a downlink control channel structure in a wireless communication system according to an embodiment. FIG. 5A shows an example of a basic unit of time and frequency resources constituting the downlink control channel.

Referring to FIG. 5A, the basic unit of the time and frequency resources constituting the control channel may be referred to as a resource element group (REG) 503, and the REG 503 may be defined as one OFDM symbol 501 on the time axis and one physical resource block (PRB) 502, that is, 12 subcarriers on the frequency axis. The base station may configure a downlink control channel allocation unit by concatenating the REG 503.

If the basic unit allocating the downlink control channel in 5G is a control channel element (CCE) 504 as shown in FIG. 5A, one CCE 504 may include a plurality of REGs 503. For example, the REG 503 shown in FIG. 5A may include 12 REs, and if one CCE 504 includes six REGs 503, one CCE 504 may include 72 REs. If the downlink CORESET is configured, the corresponding area may include a plurality of CCEs 504, and a specific downlink control channel may be mapped to one or more CCEs 504 according to an aggregation level (AL) in the CORESET and then transmitted. The CCEs 504 in the CORESET may be distinguished by their number, and the numbers of the CCEs 504 may be assigned in a logical mapping manner.

The basic unit of the downlink control channel shown in FIG. 5A, that is, the REG 503, may include both the REs to which DCI is mapped and an area to which a DMRS 505, which is a reference signal for decoding it, is mapped. As shown in FIG. 5A, three DMRSs 505 may be transmitted in one REG 503. The number of CCEs required to transmit the PDCCH may be 1, 2, 4, 8, or 16 depending on the AL, and the different numbers of CCEs may be used to implement link adaptation of the downlink control channel. For example, if AL=L, one downlink control channel may be transmitted through L-ary CCEs. The UE needs to detect a signal without knowing downlink control channel information, and a search space indicating a set of CCEs for blind decoding is defined. The search space is a set of downlink control channel candidates including CCEs which the UE must attempt to decode on a given AL, and the UE may have a plurality of search spaces since there are various ALs making one bundle from 1, 2, 4, 8, or 16 CCEs. A search space set may be defined as a set of search spaces of all configured ALs.

The search spaces may be classified into a common search space and a UE-specific search space. UEs of a specific cation information of the UE-specific PDSCH or PUSCH may be received by investigating the UE-specific search space of the PDCCH. The UE-specific search space may be UE-specifically defined as a function of the UE identity and various system parameters.

In 5G, parameters of the search space for the PDCCH may be configured for the UE by the base station using higher layer signaling (for example, SIB, MIB, or RRC signaling). For example, the base station may configure for the UE the number of PDCCH candidates of eachAL L, monitoring periodicity of the search space, a symbol-level monitoring occasion within the slot for the search space, a search space type (the common search space or the UE-specific search space), a combination of the DCI format and the RNTI to monitor in a corresponding search space, a control resource set index for monitoring the search space, and the like. For example, it may include the following information:

TABLE 9

```
SearchSpace : :=                          SEQUENCE {
 -- Identity of the search space. SearchSpaceId = 0 identifies the
SearchSpace configured via PBCH (MIB) or ServingCellConfigCommon.
    searchSpaceId                         SearchSpaceId,
    controlResourceSetId                  ControlResourceSetId,
    monitoringSlotPeriodicityAndOffset        CHOICE {
       sl1                                NULL,
       sl2                                INTEGER (0..1),
       sl4                                INTEGER (0..3),
       sl5                                INTEGER (0..4),
       sl8                                INTEGER (0..7),
       sl10                               INTEGER (0..9),
       sl16                               INTEGER (0..15),
       sl20                               INTEGER (0..19)
    }
                                          OPTIONAL,
    duration                              INTEGER (2..2559)
    monitoringSymbolsWithinSlot              BIT STRING (SIZE (14) )
                                          OPTIONAL,
    nrofCandidates                        SEQUENCE {
       aggregationLevel1                     ENUMERATED {n0, n1, n2, n3, n4,
n5, n6, n8},
       aggregationLevel2                     ENUMERATED {n0, n1, n2, n3, n4,
n5, n6, n8},
       aggregationLevel4                     ENUMERATED {n0, n1, n2, n3, n4,
n5, n6, n8},
       aggregationLevel8                     ENUMERATED {n0, n1, n2, n3, n4,
n5, n6, n8},
       aggregationLevel16                    ENUMERATED {n0, n1, n2, n3, n4,
n5, n6, n8}
    },
    searchSpaceType                       CHOICE {
       -- Configures this search space as common search space (CSS) and
DCI formats to monitor.
       common                             SEQUENCE {
       }
       ue-Specific                        SEQUENCE {
         -- Indicates whether the UE monitors in this USS for DCI formats
0-0 and 1-0 or for formats 0-1 and 1-1.
         formats                          ENUMERATED {formats0-0-And-
1-0, formats0-1-And-1-1},
         ...
       }
}
``` group or all UEs may monitor the common search space of the PDCCH to receive cell-common control information such as dynamic scheduling for SI or a paging message. For example, PDSCH scheduling allocation information for SIB transmission including cell operator information may be received by examining the common search space of the PDCCH. Since UEs of a specific group or all UEs must receive the PDCCH, the common search space may be defined as a set of predefined CCEs. The scheduling allo- The base station may configure one or more search space sets for the UE based on the configuration information. According to an embodiment, the base station may configure a search space set 1 and a search space set 2 for the UE, configure to monitor a DCI format A scrambled with an X-RNTI in the search space set 1 in the common search space, and configure to monitor a DCI format B scrambled with a Y-RNTI in the search space set 2 in the UE-specific search space.

According to the configuration information, the common search space or the UE-specific search space may include one or more search space sets. For example, a search space set #1 and a search space set #2 may be configured as the common search space, and a search space set #3 and a search space set #4 may be configured as the UE-specific search space.

The following combinations of DCI formats and RNTIs may be monitored in the common search space. However, the disclosure is not limited thereto.

DCI format 0_0/1_0 with CRC scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI. TPC-PUCCH-RNTI
DCI format 2_3 with CRC scrambled by TPC-SRS-RNTI In the UE-specific search space, the following combinations of DCI formats and RNTIs may be monitored. However, the disclosure is not limited thereto.

DCI format 0_0/1_0 with CRC scrambled by C-RNTI, CS-RNTI, TC-RNTI
DCI format 1_0/1_1 with CRC scrambled by C-RNTI, CS-RNTI, TC-RNTI The specified RNTIs may follow definitions and usages as below:

Cell RNTI (C-RNTI): for scheduling the UE-specific PDSCH
Temporary cell RNTI (TC-RNTI): for scheduling the UE-specific PDSCH
Configured scheduling RNTI (CS-RNTI): for scheduling UE-specific PDSCH semi-statically configured
Random access RNTI (RA-RNTI): for scheduling the PDSCH at random access stage
Paging RNTI (P-RNTI): for scheduling the PDSCH which transmits paging
System information RNTI (SI-RNTI): for scheduling the PDSCH which transmits SI
Interruption RNTI (INT-RNTI): for notifying PDSCH puncturing
Transmit power control for PUSCH RNTI (TPC-PUSCH-RNTI): for indicating power control command for the PUSCH
Transmit power control for PUCCH RNTI (TPC-PUCCH-RNTI): for indicating power control command for the PUCCH
Transmit power control for SRS RNTI (TPC-SRS-RNTI): for indicating power control command for the SRS The above-specified DCI formats may follow the definitions as below:

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the AL L in a CORESET p and a search space set s may be expressed as the following Equation (1).

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \quad (1)$$

L: AL
$n_{CI}$: carrier index
$N_{CCE,p}$: the total number of CCEs in the CORESET p
$n_{s,f}^\mu$: slot index
$M_{s,max}^{(L)}$: the number of PDCCH candidates of the AL L
$m_{s,n_{CI}} = 0, \ldots, M_{s,max}^{(L)} - 1$: PDCCH candidate index of the AL L
$i = 0, \ldots, L-1$
$Y_{p,n_{s,f}^\mu} = (A_p \cdot Y_{p,n_{s,f}^\mu - 1}) \bmod D$, $Y_{p,-1} = n_{RNTI} \neq 0$, $A_p = 39827$ for p mod 3=0, $A_p = 39829$ for p mod 3=1, $A_p = 39839$ for p mod 3=2, D=65537
$n_{RNTI}$: UE ID The value $Y_{p,n_{s,f}^\mu}$ may correspond to 0 in the common search space.

The value $Y_{p,n_{s,f}^\mu}$ may correspond to a value which varies depending on the UE identity (C-RNTI or an ID set to the UE by the base station) and a time index, in the UE-specific search space.

In 5G, as a plurality of search space sets may be configured using different parameters (e.g., the parameters of Table 9), a set of search space sets monitored by the UE may differ at each time. For example, if a search space set #1 is configured in an X-slot periodicity, a search space set #2 is configured in a Y-slot periodicity, and X and Y are different, the UE may monitor both the search space set #1 and the search space set #2 in a specific slot, and monitor one of the search space set #1 and the search space set #2 in a specific slot.

PDCCH: Span

The UE may perform UE capability report in each sub-carrier spacing if the slot has a plurality of PDCCH monitoring occasions, wherein the concept of the span may be used. The span indicates consecutive symbols for the UE to monitor the PDCCH in the slot, and each PDCCH monitoring occasion is within one span. The span may be expressed as (X, Y), where X denotes the minimum number of symbols between first symbols of two consecutive spans, and Y denotes the number of consecutive symbols for monitoring the PDCCH within one span. At this time, the UE may monitor the PDCCH in a period of Y symbols from the first symbol of the span in the span.

Figure 5B:
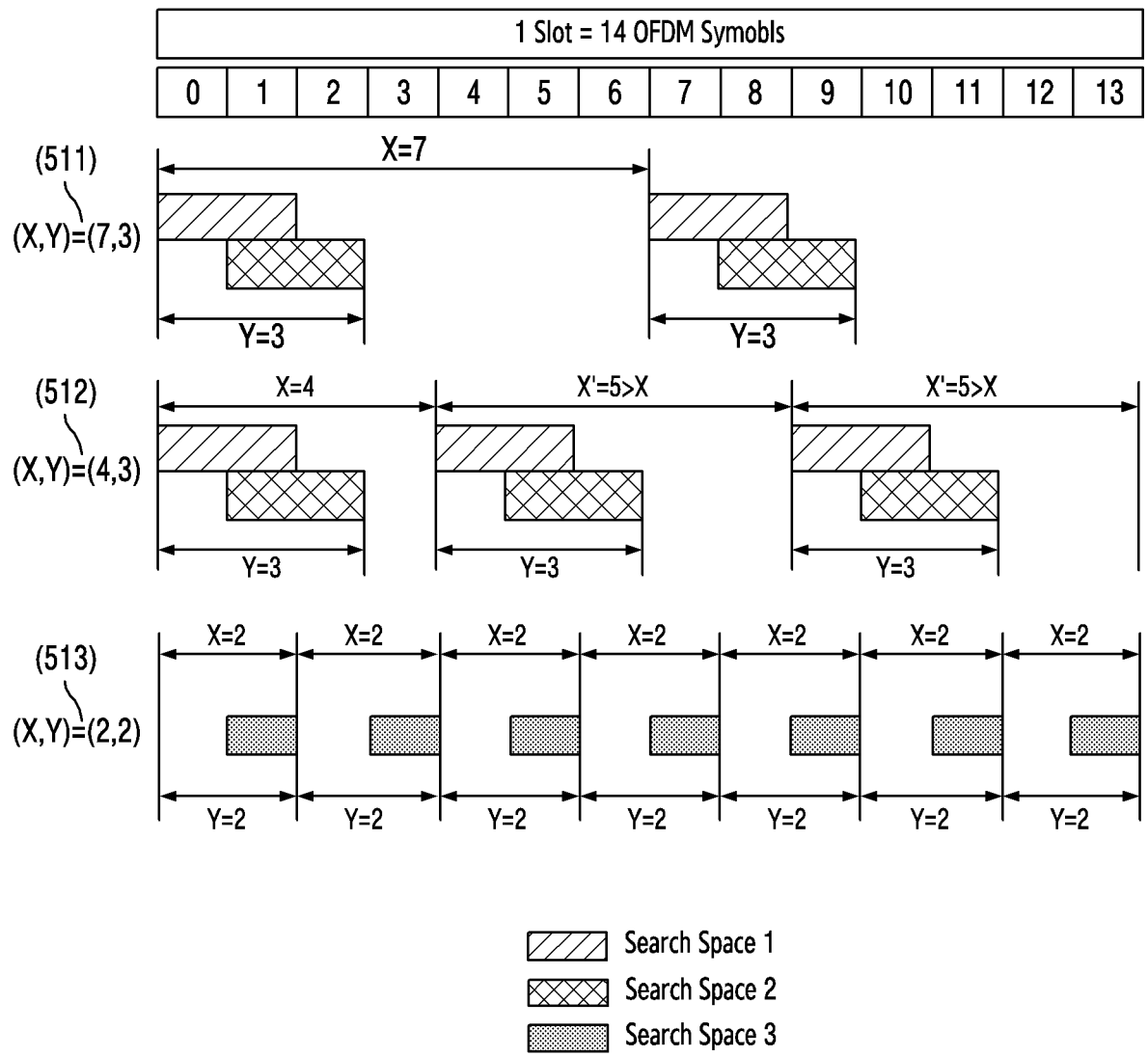
FIG. 5B illustrates, through a span, that a terminal may have a plurality of physical downlink control channel (PDCCH) monitoring occasions within a slot in a wireless communication system according to an embodiment.

FIG. 5B illustrates that the UE may have a plurality of PDCCH monitoring occasions within a slot through the span in the wireless communication system according to an embodiment.

The span (X, Y)=(7,3), (4,3), and (2,2) may be possible, and the spans of the three cases is represented as 511, 512 and 513 respectively in FIG. 5B. For example, 511 represents two spans expressed as (7, 3) in the slot. The spacing between first symbols of two spans is expressed as X=7, PDCCH monitoring occasions may exist within Y=3 symbols in total from the first symbol of each span, and search spaces 1 and 2 exist within Y=3 symbols. As another example, the span 512 includes three spans in total expressed as (4,3) in the slot, and the spacing between second and third spans includes X'=5 symbols greater than X=4.

PDCCH: UE Capability Report

The slot position including the above-described common search space and UE-specific search space is indicated by a parameter monitoringSymbolsWithinSlot of Table 11, and the symbol position in the slot is indicated by a bitmap through the parameter monitoringSymbolsWithinSlot of Table 9. Meanwhile, the symbol position allowing the UE to monitor the search space within the slot may be reported to the base station through the following UE capabilities.

UE capability 1 (for example, index 3-1). This UE capability indicates, if one monitoring occasion (MO) for Type 1 and Type 3 common search spaces or UE-specific search spaces exists in the slot as shown in the following Table 11, capability of monitoring the corresponding MO if the corresponding MO is positioned in first three symbols in the slot. This UE capability is mandatory capability to be supported by every UE supporting the NR and whether or not to support this capability is not explicitly reported to the base station.

TABLE 11

| Index | Feature group | Components | Field name in TS 38.331 [2] |
|---|---|---|---|
| 3-1 | Basic DL control channel | 1) One configured CORESET per BWP per cell in addition to CORESET0<br>- CORESET resource allocation of 6RB bit-map and duration of 1 - 3 OFDM symbols for FR1<br>- For type 1 CSS without dedicated RRC configuration and for type 0, 0A, and 2 CSSs, CORESET resource allocation of 6RB bit-map and duration 1-3 OFDM symbols for FR2<br>- For type 1 CSS with dedicated RRC configuration and for type 3 CSS, UE specific SS, CORESET resource allocation of 6RB bit-map and duration 1-2 OFDM symbols for FR2<br>- REG-bundle sizes of 2/3 RBs or 6 RBs<br>- Interleaved and non-interleaved CCE-to-REG mapping<br>- Precoder-granularity of REG-bundle size<br>- PDCCH DMRS scrambling determination<br>- TCI state(s) for a CORESET configuration<br>2) CSS and UE-SS configurations for unicast PDCCH transmission per BWP per cell<br>- PDCCH aggregation levels 1, 2, 4, 8, 16<br>- UP to 3 search space sets in a slot for a scheduled SCell per BWP<br>This search space limit is before applying all dropping rules.<br>- For type 1 CSS with dedicated RRC configuration, type 3 CSS, and UE-SS, the monitoring occasion is within the first 3 OFDM symbols of a slot<br>- For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

UE capability 2 (for example, index 3-2). This UE capability indicates, if one MO for the common search space or the UE-specific search space exists in the slot as shown in the following Table 12, capability of monitoring the MO regardless of a start symbol position of the corresponding MO. This UE capability is optionally supported by the UE, and whether or not to support this capability is explicitly reported to the base station.

TABLE 12

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (for example, index 3-5 index 3-5a, or index 3-5b). This UE capability indicates, if a plurality of MOs for the common search space or the UE-specific search space exists in the slot, an MO pattern for the UE to monitor, as shown in the following Table 13. The above pattern includes the start symbol spacing X between different MOs and a maximum symbol length Y for one MO. A combination of (X, Y) supported by the UE may include one or more of {(2, 2), (4, 3), (7, 3)}. This UE capability is optionally supported by the UE, and whether or not to support this capability and the above-mentioned combination (X, Y) are explicitly reported to the base station.

TABLE 13

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions { 3-5. withoutDCI-Gap 3-5a. withDCI-Gap } |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as<br>- 2OFDM symbols for 15kHz<br>- 4OFDM symbols for 30kHz<br>- 7OFDM symbols for 60kHz with NCP<br>- 11OFDM symbols for 120kHz<br>Up to one unicast DL DCI and up to one unicast UL DCI in a monitoring occasion except for the monitoring occasions of FG 3-1.<br>In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0<=l<=13 is generated, where b(l)=1 if symbol l of any slot is part of a monitoring occasion, b(l)=0 otherwise. The first span in the span pattern begins at the smallest l for which b(l)=1. The next span in the span pattern begins at the smallest l not included in the previous span(s) for which b(l)=1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span:<br>• Processing one unicast DCI scheduling DL and one unicast DCI scheduling UL per scheduled CC across this set of monitoring occasions for FDD<br>• Processing one unicast DCI scheduling DL and two unicast DCI scheduling UL per scheduled CC across this set of monitoring occasions for TDD | |

TABLE 13-continued

| Index | Feature group | Components | Field name in TS 38.331 [2] |
|---|---|---|---|
| | | • Processing two unicast DCI scheduling DL and one unicast DCI scheduling UL per scheduled CC across this set of monitoring occasions for TDD<br>The number of different start symbol indices of spans for all PDCCH monitoring occasions per slot, including PDCCH monitoring occasions of FG-3-1, is no more than floor(14/X) (X is minimum among values reported by UE).<br>The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. | |

The UE may report whether to support the above-described UE capability 2 and/or UE capability 3 and related parameters to the base station. The base station may perform time axis resource allocation for the common search space and the UE-specific search space based on the reported UE capability. In the resource allocation, the base station may not assign the MO at a position not allowing the UE to monitor.

PDCCH: BD/CCE Limit

If a plurality of search space sets is configured in the UE, the following conditions may be considered in a method for determining a search space set to be monitored by the UE.

If a value monitoringCapabilityConfig-r16 which is higher layer signaling is configured as r15monitoringcapability in the UE, the UE defines maximum values of PDCCH candidates to monitor and CCEs constituting the entire search space (herein, the entire search space indicates an entire CCE set corresponding to a union area of a plurality of search space sets) for each slot, and if the value monitoringCapabilityConfig-r16 is configured as r16monitoringcapability, the UE defines maximum values of the PDCCH candidates to monitor and the CCEs constituting the entire search space (herein, the entire search space indicates the entire CCE set corresponding to the union area of the plurality of the search space sets) for each span.

Condition 1: Limit the Maximum Number of PDCCH Candidates

According to the higher layer signaling configuration value as described above, M which is the maximum number of the PDCCH candidates for the UE to monitor may follow Table 14 below if it is defined based on the slot, and may follow Table 15 below if it is defined based on the span, in a cell having the subcarrier spacing $15 \cdot 2^\mu$ kHz.

TABLE 14

| μ | Maximum number of PDCCH candidates per slot and per serving cell ($M^\mu$) |
|---|---|
| 0 | 44 |
| 1 | 36 |
| 2 | 22 |
| 3 | 20 |

TABLE 15

| | Maximum number $M^\mu$ of monitored PDCCH candidates per span for combination (X, Y) and per serving cell | | |
|---|---|---|---|
| μ | (2, 2) | (4, 3) | (7, 3) |
| 0 | 14 | 28 | 44 |
| 1 | 12 | 24 | 36 |

Condition 2: Limit the Maximum Number of CCEs

According to the higher layer signaling configuration value described above. C which is the maximum number of the CCEs constituting the entire search space (herein, the entire search space indicates the entire CCE set corresponding to the union area of the plurality of the search space sets) may follow Table 16 below if it is defined based on the slot, and may follow Table 17 below if it is defined based on the span, in the cell having the subcarrier spacing $15 \cdot 2^\mu$ kHz.

TABLE 16

| μ | Maximum number of non-overlapped CCEs per slot and per serving cell ($C^\mu$) |
|---|---|
| 0 | 56 |
| 1 | 56 |
| 2 | 48 |
| 3 | 32 |

TABLE 17

| | Maximum number $C^\mu$ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

For ease of explanation, a situation satisfying both the Conditions 1 and 2 at a specific time is defined as a "Condition A". Accordingly, not satisfying the Condition A may include not satisfying at least one of the Conditions 1 and 2.

PDCCH: Overbooking

Condition A may not be satisfied at a specific time depending on the configuration of the search space sets of the base station. If Condition A is not satisfied at the specific time, the UE may select and monitor only some of the search space sets configured to satisfy Condition A at the corresponding time, and the base station may transmit the PDCCH to the selected search space sets.

Selecting some search spaces among the configured search space sets may conform to the following methods.

If Condition A for the PDCCH is not satisfied at the specific time (slot), the UE (or the base station) may first select the search space set in which the search space type is configured as the common search space among the search space sets existing at the corresponding time, over the search space set which is configured as the UE-specific search space.

If all the search space sets configured as the common search space are selected (i.e., if Condition A is satisfied even after selecting all the search spaces configured as the common search space), the UE (or the base station) may select the search space sets configured as the UE-specific search space. At this time, if a plurality of search space sets is configured as the UE-specific search space, the search space set having a lower search space set index may have higher priority. UE-specific search space sets may be selected within a range satisfying Condition A in consideration of the priority.

QCL, TCI State

In the wireless communication system, one or more different antenna ports (may be replaced with one or more channels, signals, and a combination thereof, but shall be collectively referred to as different antenna ports for ease of description of the disclosure below) may be associated with each other by QCL configuration as shown in the following Table 18. The TCI state is to notify the QCL relationship between the PDCCH (or PDCCH DMRS) and other RS or channel, and QCL of a specific reference antenna port A (reference RS #A) and another target antenna port B (target RS #B) indicates that the UE is allowed to apply some or all of large-scale channel parameters estimated from the antenna port A to channel measurement from the antenna port B. The QCL may need to associate different parameters depending on a situation such as 1) time tracking affected by average delay and delay spread, 2) frequency tracking affected by Doppler shift and Doppler spread, 3) radio resource management (RRM) affected by average gain, 4) beam management (BM) affected by a spatial parameter, and the like. Hence, NR supports four QCL relationship types as shown in the following Table 18.

TABLE 18

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

Spatial RX parameters may refer to some or all of various parameters such as angle of arrival (AoA), power angular-spectrum (PAS) of AoA, angle of departure (AoD), PAS of AoD, transmit/receive channel correlation, transmit/receive beamforming, spatial channel correlation, and the like.

The QCL relationship may be configured for the UE through an RRC parameter TCI state and QCL information as shown in the following Table 19. Referring to Table 19, the base station may configure one or more TCI states for the UE and thus notify two QCL relationships qcl-Type1 and qcl-Type2 of the reference RS (that is, a target RS) referring to the ID of the TCI state. At this time, each QCL information included in each TCI state includes a serving cell index and a BWP index of the reference RS indicated by the corresponding QCL information, type and ID of the reference RS, and the QCL type shown in Table 18.

TABLE 19

```
TCI-State : :=          SEQUENCE {
   tci-StateId             TCI-StateId,
   qcl-Type1               QCL-Info,
   qcl-Type2               QCL-Info            OPTIONAL, -- Need R
   ...
}
QCL-Info : :=          SEQUENCE {
   cell                    ServCellIndex       OPTIONAL, -- Need R
   bwp-Id                  BWP-Id              OPTIONAL, -- Cond CSI-RS-Indicated
   referenceSignal         CHOICE {
      csi-rs                  NZP-CSI-RS-ResourceId,
      ssb                     SSB-Index
   },
   qcl-Type                ENUMERATED {typeA, typeB, typeC, typeD},
   ...
}
```

Discontinuous Reception (DRX)

Figure 6:
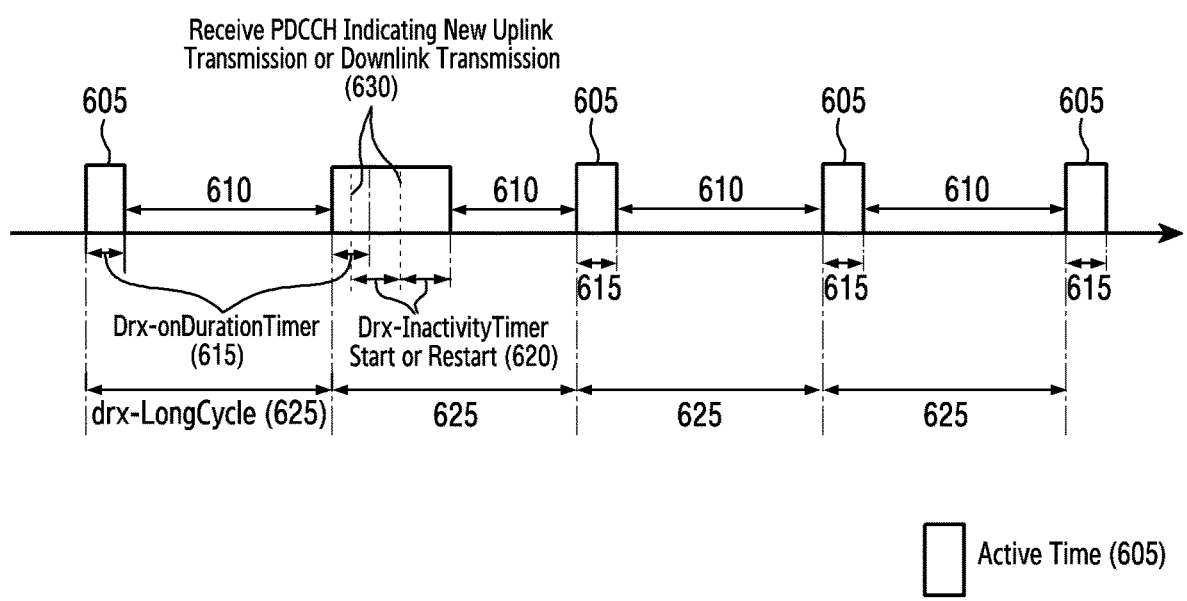
FIG. 6 illustrates a discontinuous reception (DRX) operation in a wireless communication system according to an embodiment.

FIG. 6 illustrates a DRX operation in a wireless communication system according to an embodiment.

The DRX is an operation in which the UE using a service discontinuously receives data in an RRC connected state with a radio link established between the base station and the UE. If the DRX is applied, the UE may turn on a receiver at a specific time to monitor the control channel, and turn off the receiver to reduce power consumption of the UE if there is no data received for a specific time. The DRX operation may be controlled by a media access control (MAC) device based on various parameters and timers.

Referring to FIG. 6, an active time 605 is a time for the UE to wake up every DRX cycle and monitor the PDCCH. The active time 605 may be defined as follows.

drx-onDurationTimer or drx-InactivityTimer or drx-RetransmissionTimerDL or drx-RetransmissionTimerUL or ra-ContentionResolutionTimer is running; or
  a Scheduling Request is sent on PUCCH and is pending; or
  a PDCCH indicating a new transmission addressed to the C-RNTI of the MAC entity has not been received after successful reception of a random access response (RAR) for the random access preamble (RAP) not selected by the MAC entity among the contention-based RAP.

drx-onDurationTimer, drx-InactivityTimer, drx-RetransmissionTimerDL, drx-RetransmissionTimerUL, ra-ContentionResolutionTimer and so on are timers of which values are configured by the base station, and have a function of configuring the UE to monitor the PDCCH if a specific condition is satisfied.

drx-onDurationTimer 615 is a parameter for configuring a minimum time for which the UE is awake in the DRX cycle. drx-InactivityTimer 620 is a parameter for configuring an additional time for which the UE is awake if receiving a PDCCH 630 indicating new uplink transmission or downlink transmission. drx-RetransmissionTimerDL is a parameter for configuring a maximum time for which the UE is awake to receive downlink retransmission in a downlink hybrid automatic repeat request (HARQ) procedure. drx-RetransmissionTimerUL is a parameter for configuring a maximum time for which the UE is awake to receive an uplink retransmission grant in an uplink HARQ procedure. drx-onDurationTimer, the drx-InactivityTimer, the drx-RetransmissionTimerDL, and the drx-RetransmissionTimerUL may be configured as, for example, time, the number of subframes, the number of slots, or the like. ra-ContentionResolutionTimer is a parameter for monitoring the PDCCH in a random access procedure.

An inactive time 610 is a time configured to not monitor the PDCCH or a time configured to not receive the PDCCH during the DRX operation, and other time than the active time 605 in the total time of the DRX operation may be the inactive time 610. If the UE does not monitor the PDCCH for the active time 605, it may enter a sleep or inactive state to reduce power consumption.

The DRX cycle indicates a cycle for the UE to wake up and monitor the PDCCH. That is, it indicates a time interval from the PDCCH monitoring to next PDCCH monitoring of the UE or an on-duration cycle. The DRX cycle includes two types of a short DRX cycle and a long DRX cycle. The short DRX cycle may be optionally applied.

A long DRX cycle 625 is a long cycle of the two DRX cycles configured in the UE. While operating in the long DRX cycle, the UE restarts the drx-onDurationTimer 615 after the long DRX cycle 625 elapses from a start point (e.g., a start symbol) of the drx-onDurationTimer 615. If operating in the long DRX cycle 625, the UE may start the drx-onDurationTimer 615 in a slot after drx-SlotOffset in a subframe satisfying the following Equation (2.) Herein, drx-SlotOffset indicates delay before the drx-onDurationTimer 615 starts. drx-SlotOffset may be configured as, for example, time, the number of slots, or the like.

$$[(SFN \times 10)+\text{subframe number}] \text{modulo}(drx\text{-Long-Cycle}) = drx\text{-StartOffset} \quad (2)$$

drx-LongCycleStartOffset and drx-StartOffset may be used to define a subframe for starting the long DRX cycle 625. drx-LongCycleStartOffset may be configured as, for example, time, the number of subframes, the number of slots, or the like.

Figure 7:
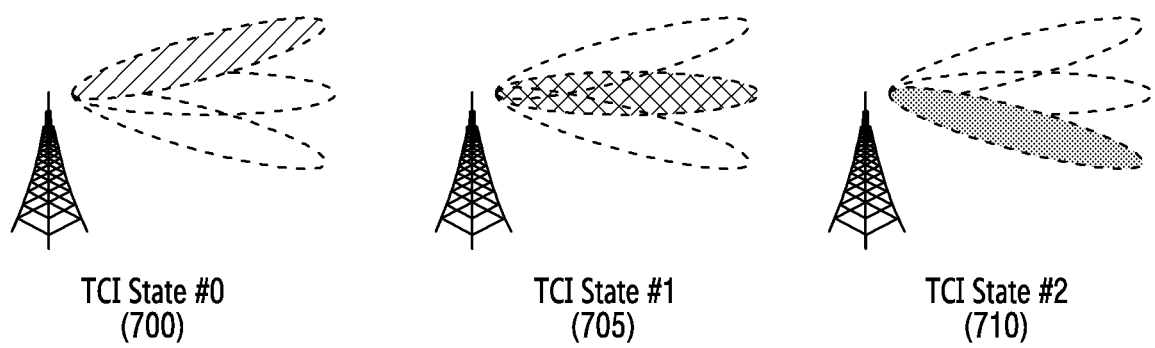
FIG. 7 illustrates base station beam allocation according to transmission configuration indication (TCI) state configuration in a wireless communication system according to an embodiment.

FIG. 7 illustrates a base station beam allocation according to TCI state configuration in a wireless communication system according to an embodiment.

Referring to FIG. 7, the base station may transmit information of N-ary different beams to the UE through N-ary different TCI states. For example, if N=3 as shown in FIG. 7, the base station may associate a parameter qcl-Type2 included in three TCI states 700, 705, and 710 with CSI-RSs or synchronization signal blocks (SSBs) corresponding to different beams, configure as a QCL type D and thus notify that antenna ports referring to the different TCI states 700, 705, and 710 are associated with different spatial Rx parameters, (for example, different beams).

The following Tables 20 through 24 show valid TCI state configurations based on target antenna port types.

Table 20 shows valid TCI state configurations if the target antenna port is the CSI-RS for tracking, that is, a tracking reference signal (TRS). The TRS indicates a non-zero-power (NZP) CSI-RS in which the repetition parameter is not configured and TRS information trs-Info is set to TRUE (or '1') in the CSI-RS. The third configuration in Table 20 may be used for aperiodic TRS.

TABLE 20

| Valid TCI state configuration | DL RS 1 | qcl-Type1 | DL RS 2 (if configured) | qcl-Type 2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 21 shows valid TCI state configurations if the target antenna port is the CSI-RS for CSI. The CSI-RS for CSI indicates an NZP CSI-RS in which a parameter indicating the repetition (e.g., a repetition parameter) is not configured and the TRS information trs-Info is not configured as TRUE (or '1') in the CSI-RS.

TABLE 21

| Valid TCI state configuration | DL RS 1 | qcl-Type1 | DL RS 2 (if configured) | qcl-Type 2 (if configured) |
|---|---|---|---|---|
| 1 | TRS | QCL-TypeA | SSB | QCL-TypeD |
| 2 | TRS | QCL-TypeA | CSI-RS (BM) | QCL-TypeD |
| 3 | TRS | QCL-TypeA | TRS (same as DL RS 1) | QCL-TypeD |
| 4 | TRS | QCL-TypeB | | |

Table 22 shows valid TCI state configurations if the target antenna port is a CSI-RS for BM (for example, the same meaning as CST-RS for L1 RSRP reporting). The CSI-RS for BM indicates an NZP CSI-RS in which the repetition parameter is configured to have a value of On or Off and the TRS information trs-Info is not configured to TRUE (or '1') in the CSI-RS.

TABLE 22

| Valid TCI state configuration | DL RS 1 | qcl-Type1 | DL RS 2 (if configured) | qcl-Type 2 (if configured) |
|---|---|---|---|---|
| 1 | TRS | QCL-TypeA | SSB | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 23 shows valid TCI state configurations if the target antenna port is a PDCCH DMRS.

TABLE 23

| Valid TCI state configuration | DL RS 1 | qcl-Type1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 24 shows valid TCI state configurations if the target antenna port is a PDSCH DMRS.

TABLE 24

| Valid TCI state configuration | DL RS 1 | qcl-Type1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI | QCL-TypeA | CSI-RS (CSI) | QCL-TypeD |

A representative QCL configuration method based on the above Tables 20 through 24 is to configure and operate the target antenna port and the reference antenna port per step as "SSB"→"TRS"→"CSI-RS for CSI", "CSI-RS for BM", "PDCCH DMRS", or "PDSCH DMRS". Thus, statistical characteristics measurable from the SSB and the TRS may be associated with the antenna ports respectively, thus assisting the reception operation of the UE.

PDCCH: TCI States

Specifically, TCI state combinations applicable to the PDCCH DMRS antenna port are shown in the following Table 25. A fourth row in Table 25 is a combination assumed by the UE before RRC configuration, and may not be configured after the RRC.

TABLE 25

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
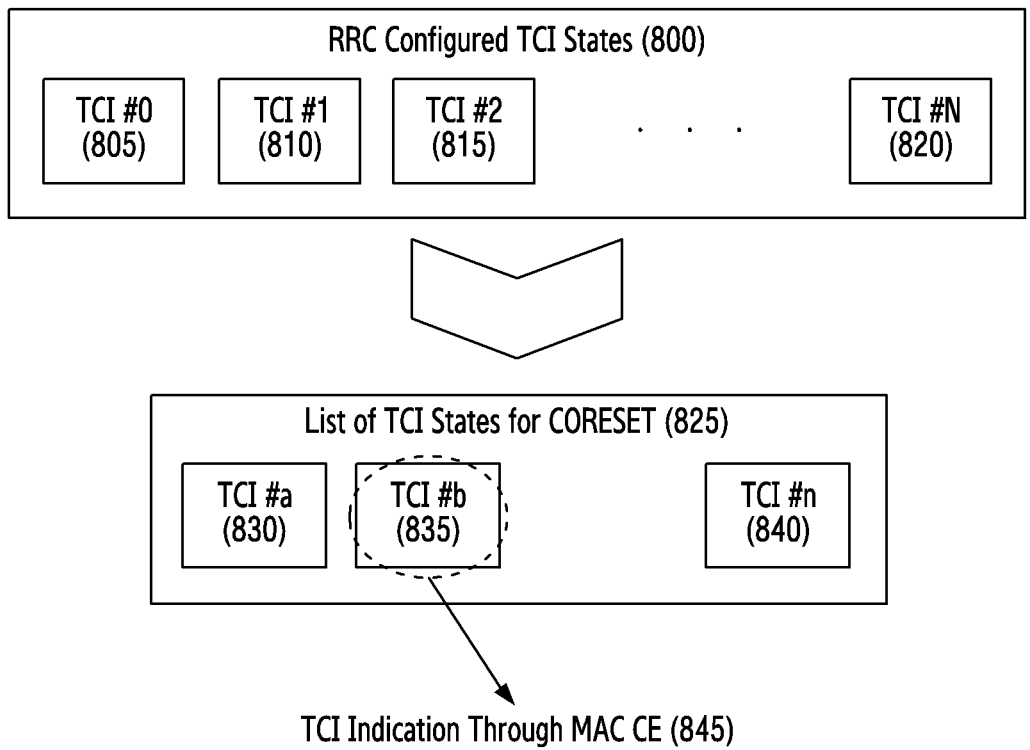
FIG. 8 illustrates a TCI state allocation method for a PDCCH in a wireless communication system according to an embodiment.

FIG. 8 illustrates a TCI state allocation method for a PDCCH in a wireless communication system according to an embodiment. Specifically, FIG. 8 supports a hierarchical signaling method as shown in FIG. 8 for PDCCH beam dynamic allocation in NR.

Referring to FIG. 8, the base station may configure N-ary TCI states 805, 810, 815, . . . , 820 for the UE through RRC signaling 800, and some of them may be configured to TCI states for CORESET 825. Next, the base station may indicate one of the TCI states 830, 835, and 840 for CORESET to the UE through MAC CE signaling 845. Next, the UE receives the PDCCH, based on beam information included in the TCI state indicated by the MAC CE signaling.

Figure 9:
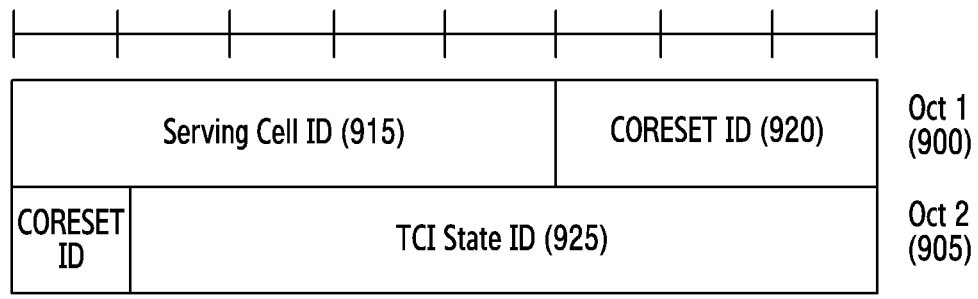
FIG. 9 illustrates a TCI indication medium access control (MAC)-control element (CE) signaling structure for a PDCCH demodulation reference signal (DMRS) in a wireless communication system according to an embodiment.

FIG. 9 illustrates a TCI indication MAC CE signaling structure for a PDCCH DMRS in a wireless communication system according to an embodiment.

Referring to FIG. 9, the TCI indication MAC CE signaling for the PDCCH DMRS includes 2 bytes (16 bits) and includes a 5-bit serving cell ID 915, a 4-bit CORESET ID 920, and a 7-bit TCI state ID 925.

Figure 10:
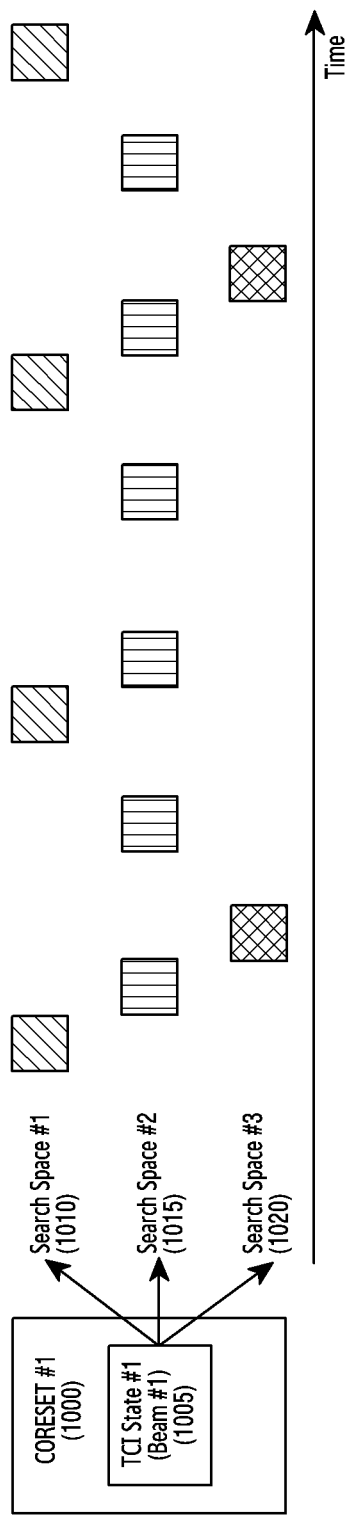
FIG. 10 illustrates a control resource set and a search space beam configuration in a wireless communication system according to an embodiment.

FIG. 10 illustrates a control resource set (CORESET) and search space beam configuration in a wireless communication system according to an embodiment. Specifically, FIG. 10 illustrates the CORESET and the search space beam configuration according to the description below.

Referring to FIG. 10, the base station may indicate one TCI state 1005 in a TCI state list included in the configuration of CORESET 1000 through MAC CE signaling. Next, until another TCI state is indicated to the corresponding CORESET through another MAC CE signaling, the UE considers that the same QCL information (beam #1, 1005) is applied to one or more search spaces 1010, 1015, and 1020 connected to the CORESET. The above-described PDCCH beam allocation method has difficulty in indicating faster beam change than the MAC CE signaling delay and performing flexible PDCCH beam management because it collectively applies the same beam to all CORESETs regardless of search space characteristics. Hereafter, a more flexible PDCCH beam configuration and management method is described. Hereafter, although several distinct examples will be provided to describe embodiments of the disclosure for ease of description, these are not mutually exclusive and may be applied by appropriately combining with each other according to circumstances.

The base station may configure one or more TCI states for the UE with respect to a specific CORESET, and may activate one of the configured TCI states through a MAC CE activation command. For example, {TCI state #0, TCI state #1, TCI state #2} is configured as the TCI states in a CORESET #1, and the base station may transmit to the UE a command for activation assuming TCI state #0 as the TCI state for the CORESET #1 through a MAC CE. Based on the TCI state activation command received through the MAC CE, the UE may correctly receive a DMRS of the corresponding CORESET based on QCL information of the activated TCI state.

With respect to the CORESET having the index 0 (CORESET #0), if the UE does not receive the MAC CE activation command for the TCI state of the CORESET #0, the UE may assume that the DMRS transmitted in the CORESET #0 is QCLed with an SS/PBCH block identified in the initial access procedure or in the non-contention based random access procedure not triggered by a PDCCH command.

With respect to the CORESET having other index than 0 (CORESET #X), if the UE does not receive TCI state configuration for CORESET #X, or receives configuration of one or more TCI states but does not receive a MAC CE activation command for activating one of them, the UE may assume that the DMRS transmitted in the CORESET #X is QCLed with the SS/PBCH block identified in the initial access process.

PDCCH: QCL Prioritization Rule

Hereafter, QCL prioritization for the PDCCH shall be described in detail.

If the UE operates as carrier aggregation (CA) in a single cell or band, and a plurality of CORESETs existing in an activated BWP of a single or multiple cells has the same or different QCL-TypeD characteristics in a specific PDCCH monitoring period and overlaps in time, the UE may select a specific CORESET according to the QCL prioritization, and monitor CORESETs having the same QCL-TypeD characteristic as the corresponding CORESET. That is, if a plurality of CORESETs overlaps in time, only one QCL-TypeD characteristic may be received. In this case, criteria for the QCL prioritization may be as follows:

Criterion 1. The CORESET connected to a common search space of the lowest index, in a cell corresponding to the lowest index among the cells including common search spaces Criterion 2. The CORESET connected to a UE-specific search space of the lowest index, in a cell corresponding to the lowest index among the cells including UE-specific search spaces As above, if the corresponding criterion is not satisfied, the above criteria each applies the following criterion. For example, if CORESETs overlap on time in a specific PDCCH monitoring period, and if all CORESETs are connected to the UE-specific search space instead of the common search space, that is, if Criterion 1 is not satisfied, the UE may omit applying Criterion 1 and apply Criterion 2.

If selecting CORESETs based on the above-mentioned criteria, the UE may further consider the following two items with respect to QCL information configured in the CORESET. First, if a CORESET #1 has a CSI-RS 1 as the reference signal having the QCL-TypeD relationship, the reference signal with which the CSI-RS 1 has the QCL-TypeD relationship is SSB 1, and a reference signal with which a CORESET #2 has the QCL-TypeD relationship is SSB 1, the UE may consider that the two CORESETs #1 and #2 have different QCL-TypeD characteristics. Second, if the CORESET #1 has CSI-RS 1 configured in a cell 1 as the reference signal having the QCL-TypeD relationship, the reference signal with which CSI-RS 1 has the QCL-TypeD relationship is SSB 1, the CORESET #2 has CSI-RS 2 configured in a cell 2 as the reference signal having the QCL-TypeD relationship, and the reference signal with which the CSI-RS 2 has the QCL-TypeD relationship is SSB 1, the UE may consider that the two CORESETs have the same QCL-TypeD characteristic.

Figure 12:
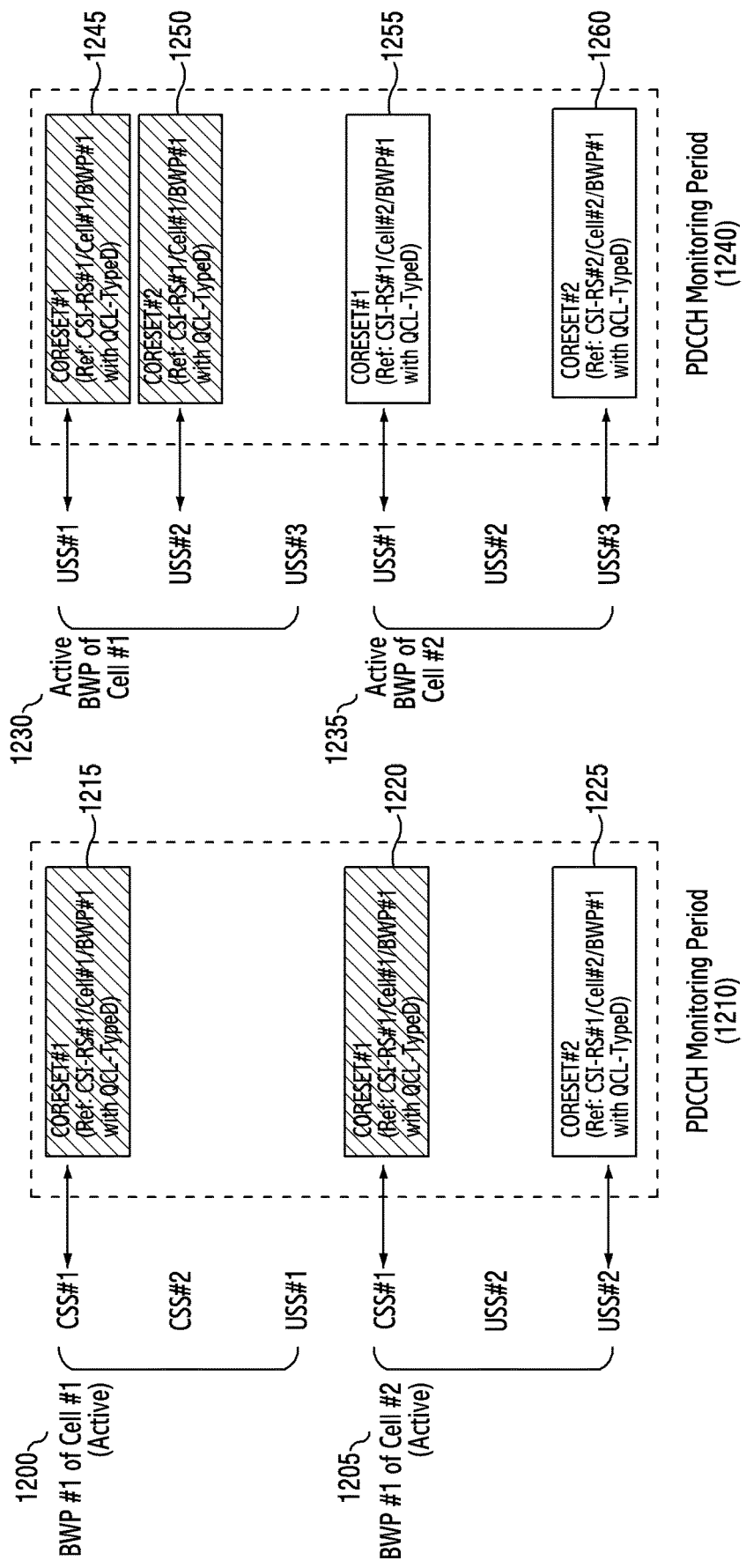
FIG. 12 illustrates a method of a terminal for selecting a receivable control resource set by considering a priority if receiving a downlink control channel in a wireless communication system according to an embodiment.

FIG. 12 illustrates a method for a UE to select a receivable CORESET in consideration of priority if receiving a downlink control channel in a wireless communication system according to an embodiment.

For example, the UE may be configured to receive a plurality of CORESETs overlapping on time in a specific PDCCH monitoring period 1210, and the plurality of the CORESETs may be connected to common search spaces or UE-specific search spaces in a plurality of cells. In the corresponding PDCCH monitoring period, a first CORESET 1215 connected to a first common search space may be included in a first BWP 1200 of a first cell, and a first CORESET 1220 connected to the first common search space and a second CORESET 1225 connected to a second UE-specific search space may be included in a first BWP 1205 of a second cell. The CORESETs 1215 and 1220 may have the QCL-TypeD relationship with a first CSI-RS resource configured in the first BWP of the first cell, and the CORESET 1225 may have the QCL-TypeD relationship with a first CSI-RS resource configured in the first BPW of the second cell. Hence, if Criterion 1 is applied to the corresponding PDCCH monitoring period 1210, all other CORESETs having the same QCL-TypeD reference signal as the first CORESET 1215 may be received. Thus, the UE may receive the CORESETs 1215 and 1220 in the corresponding PDCCH monitoring period 1210. As another example, the UE may be configured to receive a plurality of CORESETs overlapping on time in a specific PDCCH monitoring period 1240, and the plurality of the CORESETs may be connected to common search spaces or UE-specific search spaces in a plurality of cells. In the corresponding PDCCH monitoring period 1240, a first CORESET 1245 connected to a first UE-specific search space and a second CORESET 1250 connected to a second UE-specific search space may exist in a first BWP 1230 of a first cell, and a first CORESET 1255 connected to a first UE-specific search space and a second CORESET 1260 connected to a third UE-specific search space may exist in a first BWP 1235 of a second cell. The CORESETs 1245 and 1250 may have the QCL-TypeD relationship with a first CSI-RS resource configured in the first BWP of the first cell, the CORESET 1255 may have the QCL-TypeD relationship with a first CSI-RS resource configured in the first BWP of the second cell, and the CORESET 1260 may have the QCL-TypeD relationship with a second CSI-RS resource configured in the first BWP of the second cell. However, if Criterion 1 is applied to the corresponding PDCCH monitoring period 1240, there is no common search space and accordingly the next Criterion 2 may be applied. If Criterion 2 is applied to the corresponding PDCCH monitoring period 1240, all other CORESETs having the same QCL-TypeD reference signal as the CORESET 1245 may be received. Hence, the UE may receive the CORESETs 1245 and 1250 in the corresponding PDCCH monitoring period 1240.

Rate Matching/Puncturing

Hereafter, rate matching and puncturing shall be described in detail.

If time and frequency resources A to transmit an arbitrary symbol sequence A overlap arbitrary time and frequency resources B, the rate matching or the puncturing may be considered as transmission and reception of a channel A in consideration of a resource C where the resources A and the resources B overlap. Detailed operations thereof may be as follows:

Rate Matching

The base station may map and transmit the channel A only to other resource areas than the resource C corresponding to the overlapping area of the resources B among all the resources A for transmitting the symbol sequence A to the UE. For example, if the symbol sequence A includes {symbol #1, symbol #2, symbol #3, symbol #4}, the resources A are {resource #1, resource #2, resource #3, resource #4}, and the resources B are {resource #3, resource #5}, the base station may transmit the symbol sequence A by sequentially mapping it to the remaining resources {resource #1, resource #2, resource #4} excluding {resource #3} corresponding to the resource C among the resources A. As a result, the base station may map and transmit the symbol sequence {symbol #1, symbol #2, symbol #3} to {resource #1, resource #2, resource #4} respectively.

The UE may determine the resources A and the resources B from scheduling information of the symbol sequence A from the base station, and thus determine the resource C which is the overlapping area of the resources A and the resources B. The UE may receive the symbol sequence A, assuming that the symbol sequence A is mapped and transmitted in the remaining areas excluding the resource C among all the resources A. For example, if the symbol sequence A includes {symbol #1, symbol #2, symbol #3, symbol #4}, the resources A are {resource #1, resource #2, resource #3, resource #4}, and the resources B are {resource #3, resource #5}, the UE may receive the symbol sequence A, assuming that the symbol sequence A is sequentially mapped to the remaining resources {resource #1, resource #2, resource #4} excluding {resource #3} corresponding to the resource C among the resources A. As a result, the UE may perform a series of subsequent reception operations, assuming that the symbol sequence {symbol #1, symbol #2, symbol #3} is mapped to the resources {resource #1, resource #2, resource #4} and transmitted.

Puncturing

If all the resources A for transmitting the symbol sequence A to the UE include the resource C corresponding to the overlapping area of the resources B, the base station may map the symbol sequence A to all the resources A but may transmit only in other resource areas than the resource C among the resources A, without transmitting the resource area corresponding to the resource C. For example, if the symbol sequence A includes {symbol #1, symbol #2, symbol #3, symbol #4}, the resources A are {resource #1, resource #2, resource #3, resource #4), and the resources B are {resource #3, resource #5}, the base station may map the symbol sequence A (symbol #1, symbol #2, symbol #3, symbol #4} to the resources A {resource #1, resource #2, resource #3, resource #4} respectively, may transmit only a symbol sequence {symbol #1, symbol #2, symbol #4} corresponding to {resource #1, resource #2, resource #4} which are the remaining resources excluding {resource #3} corresponding to the resource C among the resources A, and may not transmit {symbol #3} mapped to {resource #3} corresponding to the resource C. As a result, the base station may map and transmit the symbol sequence {symbol #1, symbol #2, symbol #4} to {resource #1, resource #2, resource #4} respectively.

The UE may determine the resources A and the resources B from scheduling information of the symbol sequence A from the base station, and accordingly determine the resource C which is the overlapping area of the resources A and the resources B. The UE may receive the symbol sequence A, assuming that the symbol sequence A is mapped to the whole resources A but transmitted only in the remaining areas excluding the resource C among the resource areas A. For example, if the symbol sequence A includes {symbol #1, symbol #2, symbol #3, symbol #4}, the resources A are {resource #1, resource #2, resource #3, resource #4}, and the resources B are {resource #3, resource #5}, the UE may receive the symbol sequence A, assuming that the symbol sequence A {symbol #1, symbol #2, symbol #3, symbol #4} is mapped to the resources A {resource #1, resource #2, resource #3, resource #4} respectively, but {symbol #3} mapped to {resource #3} corresponding to the resource C is not transmitted, and assuming that a symbol sequence {symbol #1, symbol #2, symbol #4} corresponding to the remaining resources {resource #1, resource #2, resource #4} excluding {resource #3} corresponding to the resource C among the resources A is mapped and transmitted. As a result, the UE may perform a series of subsequent reception operations, assuming that the symbol sequence {symbol #1, symbol #2, symbol #4} is mapped to the resources {resource #1, resource #2, resource #4} respectively and transmitted.

Hereafter, a method of configuring a rate matching resource for the sake of the rate matching in the 5G communication system will be described. The rate matching indicates adjusting a signal magnitude in consideration of a resource amount for transmitting the signal. For example, rate matching of a data channel may indicate adjusting a data size by not mapping and transmitting the data channel for a specific time and frequency resource area.

Figure 11:
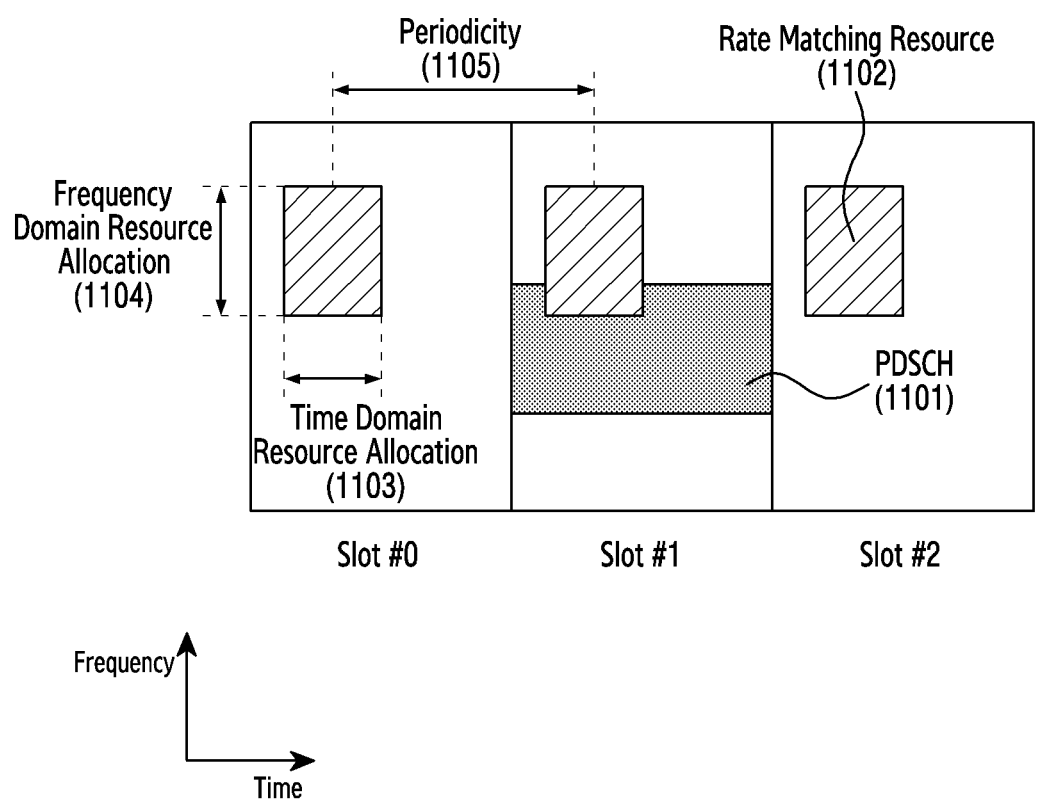
FIG. 11 illustrates a method of a base station and a terminal for transmitting and receiving data by considering a downlink control channel and a rate matching resource in a wireless communication system according to an embodiment.

FIG. 11 illustrates a method of a base station and a terminal for transmitting and receiving data by considering a downlink control channel and a rate matching resource in a wireless communication system according to an embodiment.

Referring now to FIG. 11, FIG. 11 shows a downlink data channel (PDSCH) 1101 and a rate matching resource (RMR) 1102. The base station may configure one or more rate matching resources 1102 for the UE through higher layer signaling (e.g., RRC signaling). Configuration information of the rate matching resource 1102 may include time axis (or domain) resource allocation information 1103, frequency axis (or domain) resource allocation information 1104, and periodicity information 1105. In the following, a bitmap corresponding to the frequency domain resource allocation information 1104 is referred to as a "first bitmap", a bitmap corresponding to the time domain resource allocation information 1103 is referred to as a "second bitmap", and a bitmap corresponding to the periodicity information 1105 is referred to as a "third bitmap". If all or some of the time and frequency resources of the scheduled data channel 1101 overlap the configured rate matching resources 1102, the base station may rate-match and transmit the data channel 1101 in the rate matching resource 1102, and the UE may perform reception and decoding, after assuming that the data channel 1101 is rate-matched in the rate matching resource 1102.

The base station may dynamically notify the UE through DCI of whether to rate-match the data channel in the configured rate matching resource through additional configuration (corresponding to a "rate matching indicator" in the DCI format described above). Specifically, the base station may select some of the configured rate matching resources to group them into a rate matching resource group (RMG), and indicate whether to rate-match the data channel for each rate matching resource group to the UE through the DCI using a bitmap. For example, if four rate matching resources RMR #1, RMR #2, RMR #3, and RMR #4 are configured, the base station may configure RMG #1={RMR #1, RMR #2} and RMG #2={RMR #3, RMR #4} as rate matching groups, and indicate to the UE whether to rate-match in RMG #1 and RMG #2 respectively, using a bitmap, with 2 bits in a DCI field. For example, "1" (or "TRUE") may be indicated to perform the rate-matching, and "0" (or "FALSE") may be indicated not to perform the rate-matching.

5G supports granularity of an "RB symbol level" and an "RE level" as the method for configuring the above-described rate matching resource for the UE. More specifically, the following configuration method may be provided:

RB Symbol Level

The UE may be configured with up to four RateMatchPatterns per BWP through higher layer signaling, and one RateMatchPattern may include the following:

As a reserved resource in the BWP, a resource in which time and frequency resource areas of the corresponding reserved resource are configured with a combination of an RB level bitmap and a symbol level bitmap in the frequency axis may be included. The reserved resource may be spanned over one or two slots. A time domain pattern periodicityAndPattern in which time and frequency domains including a pair of RB level and symbol level bitmaps are repeated may be further configured.

Time and frequency domain resource areas configured as a CORESET in the BWP and a resource area corresponding to a time domain pattern configured as the corresponding resource areas repeated by a search space may be included.

RE Level

The UE may be configured as below through higher layer signaling.

RE configuration information lte-CRS-ToMatchAround corresponding to an LTE cell-specific reference signal or common reference signal (CRS) pattern may include the number of LTE CRS ports nrofCRS-Ports, an LTE-CRS-vshift(s) value v-shift, center subcarrier location information carrierFreqDL of an LTE carrier from a reference frequency point (e.g., a reference point A), LTE carrier bandwidth size information carrierBandwidthDL, subframe configuration information mbsfn-SubframConfigList corresponding to a multicast-broadcast single-frequency network (MBSFN), and the like. The UE may determine a CRS location in an NR slot corresponding to an LTE subframe, based on the above-described information.

Configuration information of a resource set corresponding to one or more zero power (ZP) CSI-RS in the BWP may be included.

LTE CRS Rate Match

Next, the rate matching of the above-described LTE CRS will be described in detail. For LTE-NR coexistence, the NR provides an NR UE with a function of configuring a CRS pattern of the LTE. More specifically, the CRS pattern may be provided by RRC signaling including at least one parameter in ServingCellConfig information element (IE) or ServingCellConfigCommon IE. Examples of the parameter may include lte-CRS-ToMatchAround, lte-CRS-PatternList1-r16, lte-CRS-PatternList2-r16, crs-RateMatch-PerCORESETPoolIndex-r16, and the like.

Rel-15 NR provides a function for configuring one CRS pattern per serving cell through the parameter lte-CRS-ToMatchAround. In Rel-16 NR, the function has been extended to enable configuring a plurality of CRS patterns per serving cell. More specifically, one CRS pattern per one LTE carrier may be configured in a single-transmission and reception point (TRP) configured UE, and two CRS patterns per one LTE carrier may be configured in a multi-TRP configured UE. For example, up to three CRS patterns per serving cell may be configured in the single-TRP configured UE through the parameter lte-CRS-PatternList1-r6. As another example the CR may be configured per TRP in the multi-TRP configured UE. That is, a CRS pattern for TRP1 may be configured through a parameter lte-CRS-PatternList1-r16, and a CRS pattern for TRP2 may be configured through a parameter lte-CRS-PatternList2-r16. Meanwhile, if two TRPs are configured as above, whether to apply both the CRS patterns of TRP1 and TRP2 to a specific PDSCH, or whether to apply only the CRS pattern for one TRP may be determined through a parameter crs-RateMatch-Per-CORESETPoolIndex-r16. If the parameter crs-RateMatch-PerCORESETPoolIndex-r16 is configured to be enabled, only the CRS pattern of one TRP is applied, and otherwise, the CRS patterns of both TRPs are applied.

Table 26 shows a ServingCellConfig IE including the CRS pattern, and Table 27 shows a RateMatchPatternLTE-CRS IE including at least one parameter for the CRS pattern.

TABLE 26

```
ServingCellConfig : := SEQUENCE {
  tdd-UL-DL-ConfigurationDedicated TDD-UL-DL-ConfigDedicated
OPTIONAL, -- Cond TDD
  initialDownlinkBWP BWP-DownlinkDedicated
OPTIONAL, -- Need M
  downlinkBWP-ToReleaseList SEQUENCE (SIZE (1..maxNrofBWPs) )
OF BWP-Id OPTIONAL, -- Need N
  downlinkBWP-ToAddModList SEQUENCE (SIZE (1..maxNrofBWPs) )
OF BWP-Downlink OPTIONAL, -- Need N
  firstActiveDownlinkBWP-Id BWP-Id
OPTIONAL, -- Cond SyncAndCellAdd
    bwp-InactivityTimer ENUMERATED {ms2, ms3, ms4, ms5,
ms6, ms8, ms10, ms20, ms30,
      ms40,ms50, ms60,
ms80,ms100, ms200,ms300, ms500,
      ms750, ms1280,
ms1920, ms2560, spare10, spare9, spare8,
    spare7, spare6,
spare5, spare4, spare3, spare2, spare1 } OPTIONAL, -- Need R
  defaultDownlinkBWP-Id BWP-Id
OPTIONAL, -- Need S
  uplinkConfig UplinkConfig
OPTIONAL, -- Need M
  supplementaryUplink UplinkConfig
OPTIONAL, -- Need M
  pdcch-ServingCellConfig SetupRelease { PDCCH-
ServingCellConfig } OPTIONAL, -- Need M
  pdsch-ServingCellConfig SetupRelease { PDSCH-
ServingCellConfig } OPTIONAL, -- Need M
  csi-MeasConfig SetupRelease { CSI-MeasConfig }
OPTIONAL, -- Need M
  sCellDeactivationTimer ENUMERATED {ms20, ms40, ms80,
ms160, ms200, ms240,
      ms320, ms400, ms480,
ms520, ms640, ms720,
      ms840, ms1280,
spare2,spare1} OPTIONAL, -- Cond ServingCellWithoutPUCCH
  crossCarrierSchedulingConfig CrossCarrierSchedulingConfig
OPTIONAL, -- Need M
  tag-Id TAG-Id,
  dummy ENUMERATED {enabled}
OPTIONAL, -- Need R
  pathlossReferenceLinking ENUMERATED {spCell, sCell}
OPTIONAL, -- Cond SCellOnly
  servingCellMO MeasObjectId
OPTIONAL, -- Cond MeasObject
  ...,
  [[
  lte-CRS-ToMatchAround SetupRelease { RateMatchPatternLTE-
CRS } OPTIONAL, -- Need M
  rateMatchPatternToAddModList SEQUENCE (SIZE
```

TABLE 26-continued

```
(1..maxNrofRateMatchPatterns) ) OF RateMatchPattern OPTIONAL, --
Need N
    rateMatchPatternToReleaseList SEQUENCE (SIZE
(1..maxNrofRateMatchPatterns) ) OF RateMatchPatternId OPTIONAL, --
Need N
    downlinkChannelBW-PerSCS-List SEQUENCE (SIZE (1..maxSCSs) ) OF
SCS-SpecificCarrier OPTIONAL -- Need S
    ]],
    [[
    supplementaryUplinkRelease ENUMERATED {true}
OPTIONAL, -- Need N
    tdd-UL-DL-ConfigurationDedicated-IAB-MT-r16 TDD-UL-DL-
ConfigDedicated-IAB-MT-r16 OPTIONAL, -- Cond
TDD_IAB
    dormantBWP-Config-r16 SetupRelease { DormantBWP-Config-
r16 } OPTIONAL, -- Need M
    ca-SlotOffset-r16 CHOICE {
        refSCS15kHz INTEGER (-2..2),
        refSCS30KHz INTEGER (-5..5),
        refSCS60KHz INTEGER (-10..10),
        refSCS120KHz INTEGER (-20..20)
    }
OPTIONAL, -- Cond AsyncCA
    channelAccessConfig-r16 SetupRelease { ChannelAccessConfig-
r16 } OPTIONAL, -- Need M
    intraCellGuardBandsDL-List-r16 SEQUENCE (SIZE (1..maxSCSs) ) OF
IntraCellGuardBandsPerSCS-r16 OPTIONAL, -- Need S
    intraCellGuardBandsUL-List-r16 SEQUENCE (SIZE (1..maxSCSs) ) OF
IntraCellGuardBandsPerSCS-r16 OPTIONAL, -- Need S
    csi-RS-ValidationWith-DCI-r16 ENUMERATED {enabled}
OPTIONAL, -- Need R
    lte-CRS-PatternList1-r16 SetupRelease { LTE-CRS-PatternList-
r16 } OPTIONAL, -- Need M
    lte-CRS-PatternList2-r16 SetupRelease { LTE-CRS-PatternList-
r16 } OPTIONAL, -- Need M
    crs-RateMatch-PerCORESETPoolIndex-r16 ENUMERATED {enabled}
OPTIONAL, -- Need R
    enableTwoDefaultTCI-States-r16 ENUMERATED {enabled}
OPTIONAL, -- Need R
    enableDefaultTCI-StatePerCoresetPoolIndex-r16 ENUMERATED {enabled}
OPTIONAL, -- Need R
    enableBeamSwitchTiming-r16 ENUMERATED {true}
OPTIONAL, -- Need R
    cbg-TxDiffTBsProcessingType1-r16 ENUMERATED {enabled}
OPTIONAL, -- Need R
    cbg-TxDiffTBsProcessingType2-r16 ENUMERATED {enabled}
OPTIONAL -- Need R
    ]]
}
```

TABLE 27

- RateMatchPatternLTE-CRS

The IE RateMatchPatternLTE-CRS is used to configure a pattern to rate match around LTE CRS. See TS 38.214 [19], clause 5.1.4.2.
    RateMatchPatternLTE-CRS information element

```
-- ASN1START
-- TAG-RATEMATCHPATTERNLTE-CRS-START
RateMatchPatternLTE-CRS : :=        SEQUENCE {
    carrierFreqDL                   INTEGER (0..16383),
    carrierBandwidthDL              ENUMERATED {n6, n15, n25, n50,
n75, n100, spare2, spare1},
    mbsfn-SubframeConfigList        EUTRA-MBSFN-SubframeConfigList
OPTIONAL, -- Need M
    nrofCRS-Ports                   ENUMERATED {n1, n2, n4},
    v-Shift                         ENUMERATED {n0, n1, n2, n3, n4,
n5}
}
LTE-CRS-PatternList-r16 : :=        SEQUENCE (SIZE (1..maxLTE-CRS-
Patterns-r16) ) OF RateMatchPatternLTE-CRS
-- TAG-RATEMATCHPATTERNLTE-CRS-STOP
-- ASN1STOP
    RateMatchPatternLTE-CRS field descriptions
    carrierBandwidthDL
    BW of the LTE carrier in number of PRBs (see TS 38.214 [19], clause 5.1.4.2).
```

TABLE 27-continued

| - RateMatchPatternLTE-CRS |
|---|
| carrierFreqDL |
| Center of the LTE carrier (see TS 38.214 [19], clause 5.1.4.2). |
| mbsfn-SubframeConfigList |
| LTE MBSFN subframe configuration (see TS 38.214 [19], clause 5.1.4.2). |
| nrofCRS-Ports |
| Number of LTE CRS antenna port to rate-match around (see TS 38.214 [19], clause 5.1.4.2). |
| v-Shift |
| Shifting value v-shift in LTE to rate match around LTE CRS (see TS 38.214 [19], clause 5.1.4.2). |

PDSCH: Frequency Resource Assignment

Figure 13:
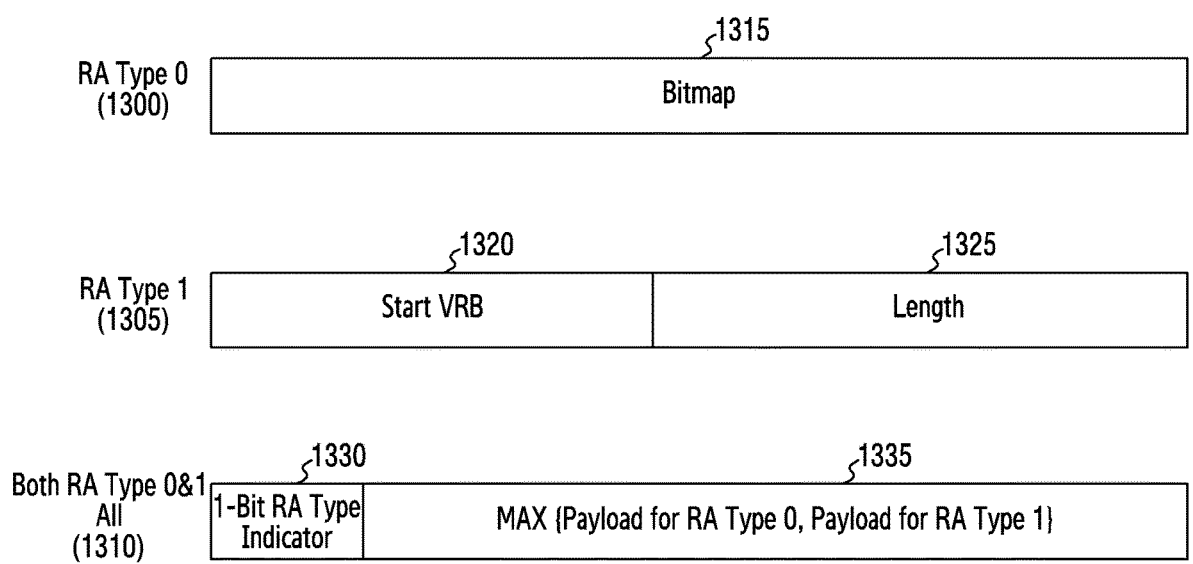
FIG. 13 illustrates a frequency axis resource assignment example of a physical downlink shared channel (PDSCH) in a wireless communication system according to an embodiment.

FIG. 13 illustrates a frequency axis resource assignment example of a PDSCH in a wireless communication system according to an embodiment.

FIG. 13 illustrates three frequency axis resource assignment methods of a type 0 1300, a type 1 1305, and a dynamic switch 1310 which may be configured through a higher layer in an NR wireless communication system.

Referring to FIG. 13, if the UE is configured to use only the resource type 0 1300 through higher layer signaling, some DCI for allocating the PDSCH to the corresponding UE includes a bitmap including NRBG-ary bits. A condition for this shall be described. In this case, NRBG denotes the number of resource block groups (RBGs) determined as shown in Table 28 according to a BWP size allocated by a BWP indicator and a higher layer parameter rbg-Size, and data is transmitted in the RBG indicated as 1 by the bitmap.

TABLE 28

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only the resource type 1 1305 through higher layer signaling, some DCI for allocating the PDSCH to the corresponding UE includes frequency domain resource assignment information including $\lceil \log_2 (N_{RB}^{DL,BWP}(N_{RB}^{DL,BWP}+1)/2) \rceil$-ary bits. A condition for this shall be described. Thus, the base station may configure a starting virtual resource block (VRB) 1320 and a length 1325 of the frequency axis resource assignment consecutively allocated.

If the UE is configured to use both 1310 of the resource type 0 and the resource type 1 through higher layer signaling, some DCI for allocating the PDSCH to the corresponding UE includes frequency domain resource assignment information including bits of greater values 1335 among a payload 1315 for configuring the resource type 0 and payloads 1320 and 1325 for configuring the resource type 1. A condition for this shall be described. In this case, one bit may be added to a most significant bit (MSB) of the frequency axis resource assignment information in the DCI, the corresponding bit of the value '0' may indicate to use the resource type 0, and the bit of the value 1 may indicate to use the resource type 1.

PDSCH/PUSCH: Time Resource Assignment

Now, a time axis (or domain) resource assignment method for a data channel in a next-generation mobile communication system (5G or NR system) is described.

The base station may configure a table of time domain resource assignment information of a downlink data channel (PDSCH) and an uplink data channel (PUSCH) for the UE, using higher layer signaling (e.g., RRC signaling). A table including up to maxNrofDL-Allocations=16 entries may be configured for the PDSCH, and a table including up to maxNrofUL-Allocations=16 entries may be configured for the PUSCH. In an embodiment, the time domain resource assignment information may include PDCCH-to-PDSCH slot timing (corresponding to a slot-level time interval unit between receiving the PDCCH and transmitting the PDSCH scheduled by the received PDCCH, and denoted by K0). PDCCH-to-PUSCH slot timing (corresponding to a slot-level time interval between receiving the PDCCH and transmitting the PUSCH scheduled by the received PDCCH, and denoted by K2), position and length information of a start symbol in which the PDSCH or PUSCH is scheduled in the slot, a PDSCH or PUSCH mapping type, and so on. For example, information shown in Table 29 or Table 30 below may be transmitted from the base station to the UE.

TABLE 29

| PDSCH-TimeDomainResourceAllocationList information element |
|---|
| -- ASN1START |
| -- TAG-PDSCH-TIMEDOMAINRESOURCEALLOCATIONLIST-START |
| PDSCH-TimeDomainResourceAllocationList ::= SEQUENCE |
| (SIZE(1..maxNrofDL-Allocations) ) OF PDSCH-TimeDomainResourceAllocation |
| PDSCH-TimeDomainResourceAllocation ::= SEQUENCE { |
|   k0                                                     INTEGER(0..32) |
| OPTIONAL, -- Need S |
|   mappingType                       ENUMERATED {typeA, typeB}, |
|   startSymbolAndLength        INTEGER (0..127) |
| } |

TABLE 30

PUSCH-TimeDomainResourceAllocation information element

-- ASN1START
-- TAG-PUSCH-TIMEDOMAINRESOURCEALLOCATIONLIST-START
PUSCH-TimeDomainResourceAllocationList : := SEQUENCE
(SIZE(1..maxNrofUL-Allocations) ) OF PUSCH-TimeDomainResourceAllocation
PUSCH-TimeDomainResourceAllocation : := SEQUENCE {
  k2                                          INTEGER(0..32)
OPTIONAL, -- Need S
  mappingType                         ENUMERATED {typeA, typeB},
  startSymbolAndLength        INTEGER (0..127)
}

The base station may notify the UE of one of the entries of the time domain resource assignment information table described above, through L1 signaling (e.g., DCI) (e.g., may be indicated by a field 'time domain resource assignment' of the DCI). The UE may obtain the time domain resource assignment information of the PDSCH or the PUSCH, based on the DCI received from the base station.

Figure 14:
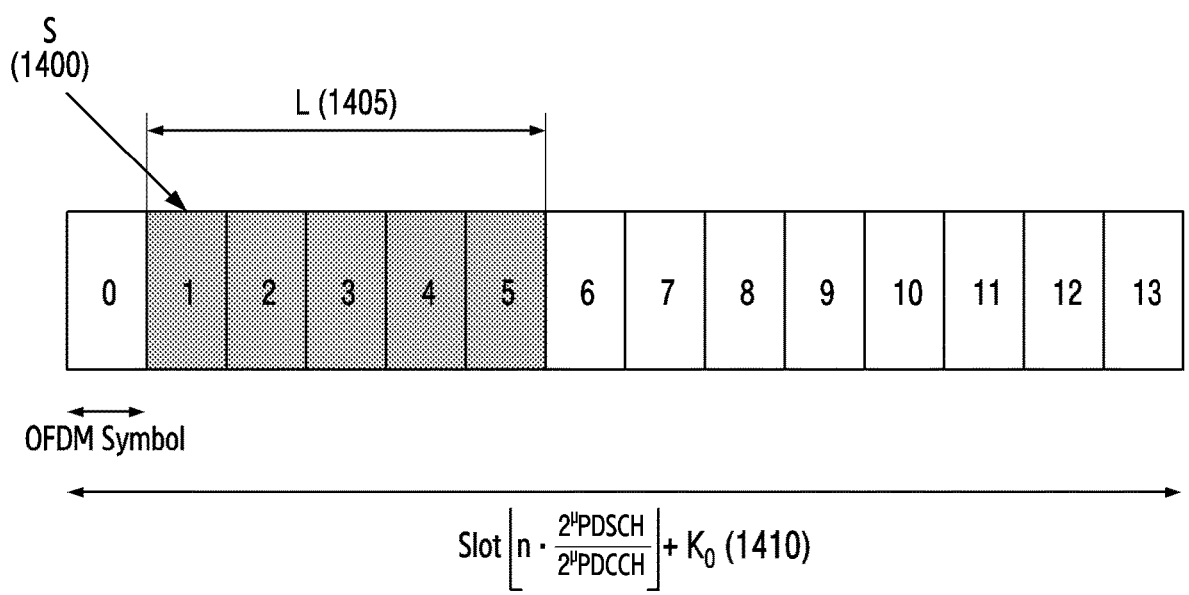
FIG. 14 is a diagram illustrating a time axis resource assignment example of a PDSCH in a wireless communication system according to various embodiments of the disclosure.

FIG. 14 illustrates a time axis resource assignment of a PDSCH in a wireless communication system according to an embodiment.

Referring to FIG. 14, the base station may indicate a time axis location of a PDSCH resource according to a subcarrier spacing (SCS) $\mu_{PDSCH}$ and $\mu_{PDCCH}$ of a data channel and a control channel configured using a higher layer, a scheduling offset value K0, and OFDM symbol starting position 1400 and length 1405 within one slot dynamically indicated through DCI.

Figure 15:
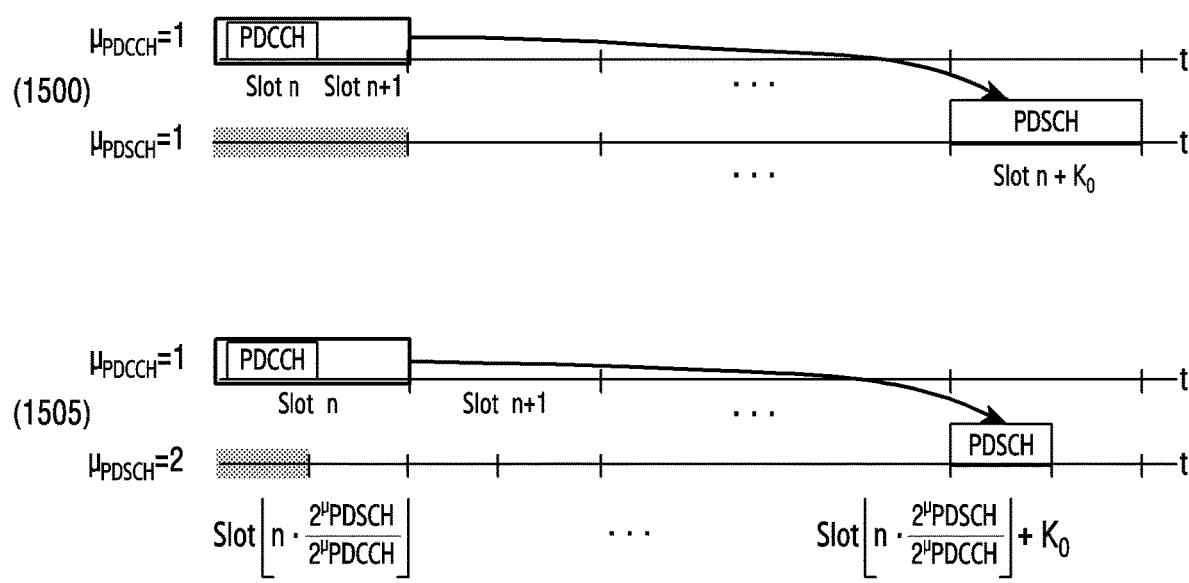
FIG. 15 illustrates a time axis resource assignment based on subcarrier spacings of a data control and a control channel in a wireless communication system according to an embodiment.

FIG. 15 illustrates a time axis resource assignment depending on SCSs of a data channel and a control channel in a wireless communication system according to an embodiment.

Referring to FIG. 15, at 1500, if the SCSs of the data channel and the control channel are identical $\mu_{PDSCH}=\mu_{PDCCH}$, slot numbers for the data and the control are the same, and accordingly the base station and the UE may generate a scheduling offset, according to the predefined slot offset K0. By contrast, at 1505, if the SCSs of the data channel of the control channel are different $\mu_{PDSCH}\neq\mu_{PDCCH}$, the slot numbers for the data and the control differ from each other, and accordingly the base station and the UE may generate a scheduling offset according to the predefined slot offset K0, based on the SCS of the PDCCH.

PDSCH: Processing Procedure Time

Next, a PDSCH processing procedure time is described. If the base station schedules to transmit the PDSCH using the DCI format 1_0, 1_1, or 1_2, to the UE, the UE may require the PDSCH processing procedure time to receive the PDSCH by applying a transmission method indicated through DCI (modulation and coding scheme (MCS) indication index, DMRS related information, time and frequency resource assignment information, etc.). The NR has defined the PDSCH processing procedure time in consideration thereof. The PDSCH processing procedure time of the UE may follow Equation (3) below:

$$T_{proc.1}=(N_1+d_{1,1}+d_2)(2048+144)k2^{-\mu}T_c+T_{ext} \quad (3)$$

Each variable in $T_{proc.1}$ described in Equation (3) may have the following definition.

$N_1$: The number of symbols determined according to the UE processing capability 1 or 2 based on the UE capability and the numerology p. This may have values of Table 31 if the UE processing capability 1 is reported according to the UE capability report, and may have values of Table 32 if the UE processing capability 2 is reported and the UE processing capability 2 is configured to be available through higher layer signaling. The numerology μ may correspond to a minimum value of $\mu_{PDCCH}$, $\mu_{PDSCH}$, and $\mu_{UL}$ to maximize $T_{proc.1}$, and $\mu_{PDCCH}$, $\mu_{PDSCH}$, and $\mu_{UL}$ may indicate numerology of the PDCCH scheduling the PDSCH, numerology of the scheduled PDSCH, and numerology of an uplink channel for transmitting HARQ-acknowledge (ACK) respectively.

The following Table 31 shows the PDSCH processing procedure time for the PDSCH processing capability 1.

TABLE 31

| | PDSCH decoding time $N_1$ [symbols] | |
|---|---|---|
| μ | Both of PDSCH mapping type A and B are dmrs-AdditionalPosition = pos0 included in high layer signaling DMRS-DownlinkConfig | Both of PDSCH mapping type A and B are not dmrs-AdditionalPosition = pos0 included in high layer signaling DMRS-DownlinkConfig or high layer parameter is not configured |
| 0 | 8 | $N_{1,0}$ |
| 1 | 10 | 13 |
| 2 | 17 | 20 |
| 3 | 20 | 24 |

The following Table 32 shows the PDSCH processing procedure time for the PDSCH processing capability 2.

TABLE 32

| μ | PDSCH decoding time $N_1$ [symbols] Both of PDSCH mapping type A and B are dmrs-AdditionalPosition = pos0 included in high layer signaling DMRS-DownlinkConfig |
|---|---|
| 0 | 3 |
| 1 | 4.5 |
| 2 | 9 for frequency range 1 | k: 64

$T_{ext}$: If the UE uses a shared spectrum channel access scheme, the UE may calculate and apply $T_{ext}$ to the PDSCH processing procedure time. Otherwise, $T_{ext}$ is assumed to be 0.

If $l_1$ indicating the PDSCH DMRS position value is 12, $N_{1,0}$ of Table 31 has the value of 14, and otherwise, the value of 13.

For the PDSCH mapping type A, the last symbol of the PDSCH is an i-th symbol in the slot transmitting the PDSCH, $d_{1,1}$ if i<7, and $d_{1,1}$ is 0 otherwise.

d$_2$: If the PUCCH having a high priority index and the PUCCH or the PUSCH having a low priority index overlap in time, d$_2$ of the PUCCH having the high priority index may be configured as a value reported by the UE. Otherwise, d$_2$ is 0.

If the PDSCH mapping type B is used for the UE processing capability 1, the value d$_{1,1}$ may be determined according to the number of the symbols L of the scheduled PDSCH and the number of overlapping symbols d between the PDCCH scheduling the PDSCH and the scheduled PDSCH as:

If L≥7, d$_{1,1}$=0.
If L≥4 and L≤6, d$_{1,1}$=7−L.
If L=3, d$_{1,1}$=min(d, 1).
If L=2, d$_{1,1}$=3+d.

If the PDSCH mapping type B is used for the UE processing capability 2, the value d$_{1,1}$ may be determined according to the number of the symbols L of the scheduled PDSCH and the number of the overlapping symbols d between the PDCCH scheduling the PDSCH and the scheduled PDSCH as:

If L≥7, d$_{1,1}$=0.
If L≥4 and L≤6, d$_{1,1}$=7−L.
If L=2,
IF the scheduling PDCCH exists in a CORESET including three symbols and the corresponding CORESET and the scheduled PDSCH have the same start symbol, d$_{1,1}$=3.
Otherwise, d$_{1,1}$=d.

A UE supporting the capability 2 in a given serving cell may apply the PDSCH processing procedure time according to the UE processing capability 2 if processingType2Enabled which is higher layer signaling is configured to be enabled for the cell.

If a position of a first uplink transmission symbol of a PUCCH including HARQ-ACK information (the corresponding position may consider K$_1$ defined as a HARQ-ACK transmission time, a PUCCH resource used for the HARQ-ACK transmission, and a timing advance effect) does precede a first uplink transmission symbol after the time of T$_{proc,1}$ from the last symbol of the PDSCH, the UE must transmit a valid HARQ-ACK message. That is, the UE must transmit the PUCCH including the HARQ-ACK only if the PDSCH processing procedure time is sufficient. Otherwise, the UE may not provide the base station with valid HARQ-ACK information corresponding to the scheduled PDSCH. T$_{proc,1}$ may be used for both normal and extended cyclic prefix (CP). If the PDSCH includes two PDSCH transmission positions in one slot, d$_{1,1}$ is calculated based on the first PDSCH transmission position of the corresponding slot.

PDSCH: Reception Preparation Time for Cross-Carrier Scheduling

The following will describe a PDSCH reception preparation time N$_{pdsch}$ of the UE defined for the time interval between the PDCCH and the PDSCH, in cross-carrier scheduling where the numerology μ$_{PDCCH}$ transmitting the scheduling PDCCH is different from the numerology μ$_{PDSCH}$ transmitting the PDSCH scheduled through the corresponding PDCCH.

If μ$_{PDCCH}$<μ$_{PDSCH}$, the scheduled PDSCH may not be transmitted before a first symbol of a slot following N$_{pdsch}$ symbols from the last symbol of the PDCCH scheduling the corresponding PDSCH. A transmission symbol of the corresponding PDSCH may include a DMRS.

If μ$_{PDCCH}$>μ$_{PDSCH}$, the scheduled PDSCH may be transmitted after N$_{pdsch}$ symbols from the last symbol of the PDCCH scheduling the corresponding PDSCH. A transmission symbol of the corresponding PDSCH may include a DMRS.

The following Table 33 relates to N$_{pdsch}$ based on the scheduled PDCCH SCS.

TABLE 33

| μ$_{PDCCH}$ | N$_{pdsch}$ [symbols] |
|---|---|
| 0 | 4 |
| 1 | 5 |
| 2 | 10 |
| 3 | 14 |

PDSCH: TCI State Activation MAC-CE

Figure 16:
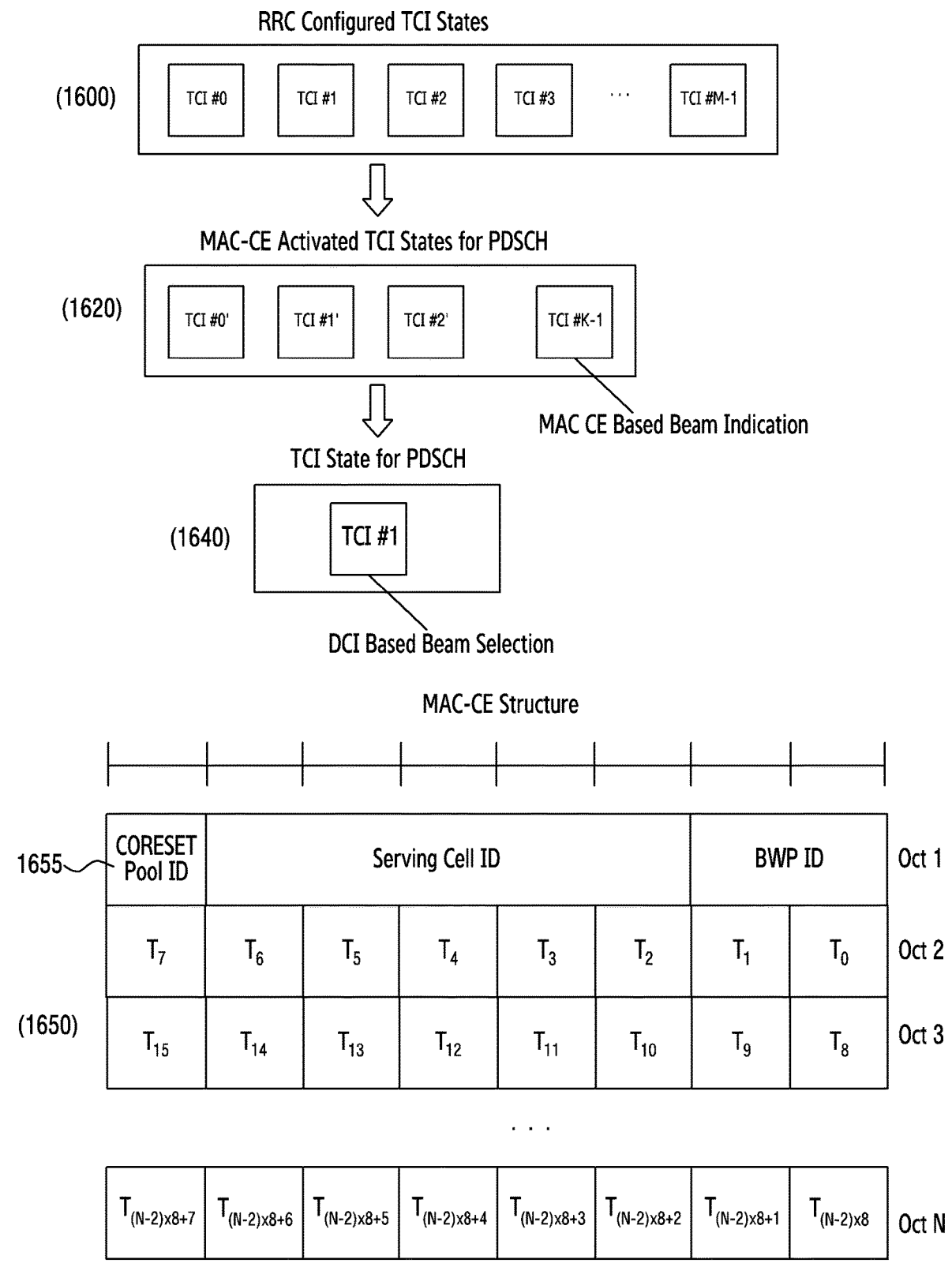
FIG. 16 illustrates a process for configuring and activating a beam of a PDSCH according to an embodiment.

Next, a beam configuration method for the PDSCH will be described. FIG. 16 illustrates a procedure for beam configuration and activation of the PDSCH. A TCI state list for the PDSCH may be indicated through a higher layer list such as RRC 1600. The TCI state list may be indicated by, for example, tci-StatesToAddModList and/or tci-StatesToReleaseList in a PDSCH-Config IE per BWP. Next, some in the TCI state list may be activated through a MAC-CE 1620. The maximum number of activated TCI states may be determined according to the capability reported by the UE. Reference numeral 1650 shows an example of a MAC-CE structure for PDSCH TCI state activation/deactivation.

A definition of each field in the MAC-CE and an available value for each field are as follows:

- Serving Cell ID : This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
- BWP ID : This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;
- T$_i$ (TCI state indentifier): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field
set to 1, i.e. the first TCI State with T$_i$ field set to 1 shall be mapped to the codepoint value 0, second TCI State with Ti field set to 1 shall be mapped to the codepoint value 1 and so on. The maximum number of activated TCI states is 8;

- CORESET Pool ID : This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORESET Pool ID field shall be ignored when receiving the MAC CE.

SRS

Next, an uplink channel estimation method using sounding reference signal (SRS) transmission of the UE is described. The base station may configure at least one SRS configuration for each uplink BWP to transmit configuration information for SRS transmission to the UE, and also configure at least one SRS resource set for each SRS configuration. For example, the base station and the UE may exchange the following higher layer signaling information to transmit SRS resource set information:

- srs-ResourceSetId: SRS resource set index
- srs-ResourceIdList: a set of SRS resource indexes referenced in the SRS resource set
- resourceType: This is a time axis transmission configuration of the SRS resource referenced in the SRS resource set, and may be configured to one of 'periodic', 'semi-persistent', and 'aperiodic'. If it is configured as 'periodic' or 'semi-persistent', associated CSI-RS information may be provided depending on usage of the SRS resource set. If 'aperiodic' is configured, an aperiodic SRS resource trigger list and slot offset information may be provided, and associated CSI-RS information may be provided depending on the usage of the SRS resource set.
- usage: This is configuration for the usage of the SRS resource referenced in the SRS resource set, and may be configured as one of 'beamManagement', 'codebook', 'nonCodebook', and 'antennaSwitching'.
- alpha, p0, pathlossReferenceRS, and srs-PowerControl-AdjustmentStates: These provide parameter configurations for transmission power control of the SRS resource referenced in the SRS resource set.

The UE may understand that the SRS resources included in the SRS resource index set referenced in the SRS resource set follow the information configured in the SRS resource set.

In addition, the base station and the UE may transmit and receive higher layer signaling information to transmit individual configuration information of the SRS resources. For example, the individual configuration information of the SRS resources may include time-frequency axis mapping information in the slot of the SRS resource, which may include information of intra-slot or inter-slot frequency hopping of the SRS resource. In addition, the individual configuration information of the SRS resource may include a time axis transmission configuration of the SRS resource, and may be configured as one of 'periodic', 'semi-persistent', and 'aperiodic'. This may be limited to have the same time axis transmission configuration as the SRS resource set including the SRS resource. If the time axis transmission configuration of the SRS resource is configured as 'periodic' or 'semi-persistent', an SRS resource transmission period and a slot offset (e.g., periodicityAndOffset) may be further included in the time axis transmission configuration.

The base station may activate, deactivate, or trigger SRS transmission to the UE through higher layer signaling including RRC signaling or MAC CE signaling, or L signaling (e.g., DCI). For example, the base station may activate or deactivate periodic SRS transmission to the UE through higher layer signaling. The base station may instruct to activate an SRS resource set in which resourceType is configured as periodic through higher layer signaling, and the UE may transmit an SRS resource referenced in the activated SRS resource set. The time-frequency axis resource mapping of the transmitted SRS resource in the slot follows the resource mapping information configured in the SRS resource, and the slot mapping including the transmission period and the slot offset follows periodicityAndOffset configured in the SRS resource. In addition, a spatial domain transmission filter applied to the transmitted SRS resource may refer to spatial relation information configured in the SRS resource, or may refer to associated CSI-RS information configured in the SRS resource set including the SRS resource. The UE may transmit the SRS resource within the uplink BWP activated for the periodic SRS resource activated through the higher layer signaling.

For example, the base station may activate or deactivate semi-persistent SRS transmission to the UE through higher layer signaling. The base station may instruct to activate the SRS resource set through MAC CE signaling, and the UE may transmit the SRS resource referenced in the activated SRS resource set. The SRS resource set activated through the MAC CE signaling may be limited to the SRS resource in which resourceType is configured as semi-persistent. The time-frequency axis resource mapping of the SRS resource to transmit in the slot follows the resource mapping information configured in the SRS resource, and the slot mapping including the transmission period and the slot offset follows periodicityAndOffset configured in the SRS resource. In addition, the spatial domain transmission filter applied to the SRS resource to transmit may refer to spatial relation information configured in the SRS resource, or refer to associated CSI-RS information configured in the SRS resource set including the SRS resource. If spatial relation information is configured in the SRS resource, rather than following it, the spatial domain transmission filter may be determined by referring to configuration information of the spatial relation information transmitted through the MAC CE signaling which activates the semi-persistent SRS transmission. The UE may transmit the SRS resource within the uplink BWP activated for the semi-persistent SRS resource activated through the higher layer signaling.

For example, the base station may trigger aperiodic SRS transmission to the UE through DCI. The base station may indicate one of aperiodic SRS resource triggers aperiodicSRS-ResourceTrigger through an SRS request field of the DCI. The UE may understand that the SRS resource set including the aperiodic SRS resource trigger indicated through the DCI in the aperiodic SRS resource trigger list, among the configuration information of the SRS resource set, is triggered. The UE may transmit the SRS resource referenced in the triggered SRS resource set. Time-frequency axis resource mapping of the transmitted SRS resource in the slot follows the resource mapping information configured in the SRS resource. In addition, the slot mapping of the transmitted SRS resource may be determined through a slot offset between the PDCCH including the DCI and the SRS resource, which may refer to value(s) included in the slot offset set configured in the SRS resource set. Specifically, as the slot offset between the PDCCH including the DCI and the SRS resource, a value indicated in the time domain resource assignment field of the DCI, among the offset value(s) included in the slot offset set configured in the SRS resource set, may be applied. In addition, the spatial domain transmission filter applied to the transmitted SRS resource may refer to spatial relation information configured in the SRS resource, or refer to associated CSI-RS information configured in the SRS resource set including the SRS resource. The UE may transmit the SRS resource within the uplink BWP activated for the aperiodic SRS resource triggered through the DCI.

If the base station triggers the aperiodic SRS transmission to the UE through the DCI, the UE may require a minimum time interval between the PDCCH including the DCI triggering the aperiodic SRS transmission and the transmitted SRS, to transmit the SRS by applying SRS resource configuration information. The time interval for the SRS transmission of the UE may be defined as the number of symbols between the last symbol of the PDCCH including the DCI triggering the aperiodic SRS transmission and a first symbol to which the SRS resource transmitted first, among the transmitted SRS resource(s), is mapped. The minimum time interval may be determined by referring to the PUSCH preparation procedure time required for the UE to prepare for PUSCH transmission. In addition, the minimum time interval may have different values depending on the usage of the SRS resource set including the transmitted SRS resource. For example, the minimum time interval may be determined as N2 symbols defined in consideration of the UE processing capability according to the UE capability with reference to the PUSCH preparation procedure time of the UE. In addition, in consideration of the usage of the SRS resource set including the transmitted SRS resource, if the usage of the SRS resource set is configured as 'codebook' or 'antennaSwitching', the minimum time interval may be determined as N2 symbols, and if the usage of the SRS resource set is configured as 'nonCodebook' or 'beamManagement', the minimum time interval may be determined as N2+14 symbols. If the time interval for the aperiodic SRS transmission is greater than or equal to the minimum time interval, the UE may transmit the aperiodic SRS, and if the time interval for the aperiodic SRS transmission is less than the minimum time interval, the UE may ignore the DCI triggering the aperiodic SRS.

TABLE 34

| | |
|---|---|
| SRS-Resource : := | SEQUENCE { |
| srs-ResourceId | SRS-ResourceId, |
| nrofSRS--Ports ports4}, | ENUMERATED {port1, ports2, |
| ptrs-PortIndex OPTIONAL, -- Need R | ENUMERATED {n0, n1 } |
| transmissionComb | CHOICE { |
| n2 | SEQUENCE { |
| combOffset-n2 | INTEGER (0..1), |
| cyclicShift-n2 | INTEGER (0..7) |
| }, | |
| n4 | SEQUENCE { |
| combOffset-n4 | INTEGER (0..3), |
| cyclicShift-n4 | INTEGER (0..11) |
| } | |
| }, | |
| resourceMapping | SEQUENCE { |
| startPosition | INTEGER (0..5), |
| nrofSymbols | ENUMERATED {n1, n2, n4}, |
| repetitionFactor | ENUMERATED {n1, n2, n4} |
| }, | |
| freqDomainPosition | INTEGER (0..67), |
| freqDomainShift | INTEGER (0..268), |
| freqHopping | SEQUENCE { |
| c-SRS | INTEGER (0..63), |
| b-SRS | INTEGER (0..3), |
| b-hop | INTEGER (0..3) |
| }, | |
| groupOrSequenceHopping groupHopping, sequenceHopping }, | ENUMERATED { neither, |
| resourceType | CHOICE { |
| aperiodic | SEQUENCE { |
| ... | |
| }, | |
| semi-persistent | SEQUENCE { |
| periodicityAndOffset-sp PeriodicityAndOffset, | SRS- |
| ... | |
| }, | |
| periodic | SEQUENCE { |
| periodicityAndOffset-p PeriodicityAndOffset, | SRS- |
| ... | |
| } | |

TABLE 34-continued

```
},
  sequenceId                  INTEGER (0..1023),
  spatialRelationInfo         SRS-SpatialRelationInfo
OPTIONAL, -- Need R
  ...
}
``` spatialRelationInfo configuration information of Table 34 is to apply beam information of the corresponding reference signal to the beam used in the corresponding SRS transmission with reference to one reference signal. For example, the configuration spatialRelationInfo may include the following information shown in Table 35.

TABLE 35

```
SRS-SpatialRelationInfo ::=    SEQUENCE {
  servingCellId                  ServCellIndex OPTIONAL,
-- Need S
  referenceSignal                CHOICE {
    ssb-Index                      SSB-Index,
    csi-RS-Index                   NZP-CSI-RS-ResourceId,
    srs                            SEQUENCE {
      resourceId                     SRS-ResourceId,
      uplinkBWP                      BWP-Id
    }
  }
}
```

Referring to the spatialRelationInfo configuration, an index of a reference signal to be referenced to use beam information of a specific reference signal, that is, an SS/PBCH block index, a CSI-RS index or an SRS index may be configured. The higher layer signaling referenceSignal is configuration information indicating which reference signal beam information is to be referenced for the corresponding SRS transmission, ssb-Index indicates the index of the SS/PBCH block, csi-RS-Index indicates the index of the CSI-RS, and srs indicates the index of the SRS. If the higher layer signaling referenceSignal value is configured as 'ssb-Index', the UE may apply the receive beam used in receiving the SS/PBCH block corresponding to ssb-Index as a transmit beam of the corresponding SRS transmission. If the higher layer signaling referenceSignal value is configured as 'csi-RS-Index', the UE may apply the receive beam used in receiving the CSI-RS corresponding to csi-RS-Index as a transmit beam of the corresponding SRS transmission. If the higher layer signaling referenceSignal value is configured as 'srs', the UE may apply the transmit beam used in transmitting the SRS corresponding to srs as a transmit beam of the corresponding SRS transmission.

PUSCH: Transmission Scheme

Next, a scheduling scheme of PUSCH transmission is described. The PUSCH transmission may be dynamically scheduled by a UL grant in DCI, or may be operated by configured grant Type 1 or Type 2. Dynamic scheduling indication of the PUSCH transmission may be enabled with DCI format 0_0 or 0_1.

The configured grant Type 1 PUSCH transmission may be semi-statically configured by receiving configuredGrant-Config including rrc-ConfiguredUplinkGrant of Table 36 using higher layer signaling, without receiving the UL grant of the DCI. The configured grant Type 2 PUSCH transmission may be semi-persistently scheduled by the UL grant of the DCI, after receiving configuredGrantConfig not including rrc-ConfiguredUplinkGrant of Table 36 through higher layer signaling. If the PUSCH transmission is operated by the configured grant, parameters applied to the PUSCH transmission are applied through the higher layer signaling configuredGrantConfig of Table 36 excluding dataScramblingIdentityPUSCH, txConfig, codebookSubset, maxRank, and scaling of UCI-OnPUSCH provided through the higher layer signaling pusch-Config of Table 37. If the UE receives transformPrecoder in the higher layer signaling configuredGrantConfig of Table 36, the UE applies tp-pi2BPSK of pusch-Config of Table 37 to the PUSCH transmission operated by the configured grant.

TABLE 36

```
ConfiguredGrantConfig ::=           SEQUENCE {
  frequencyHopping                    ENUMERATED {intraSlot, interSlot}
OPTIONAL, -- Need S,
  cg-DMRS-Configuration               DMRS-UplinkConfig,
  mcs-Table                           ENUMERATED {qam256, gam64LowSE}
OPTIONAL, -- Need S
  mcs-TableTransformPrecoder          ENUMERATED {qam256, qam64LowSE}
OPTIONAL, -- Need S
  uci-OnPUSCH                         SetupRelease { CG-UCI-OnPUSCH }
OPTIONAL, -- Need M
  resourceAllocation                                           ENUMERATED
{ resourceAllocationType0, resourceAllocationType1, dynamicSwitch },
  rbg-Size                            ENUMERATED {config2}
OPTIONAL, -- Need S
  powerControlLoopToUse               ENUMERATED {n0, n1},
  p0-PUSCH-Alpha                      P0-PUSCH-AlphaSetId,
  transformPrecoder                   ENUMERATED {enabled, disabled}
OPTIONAL, -- Need S
  nrofHARQ-Processes                  INTEGER(1..16),
  repK                                ENUMERATED {n1, n2, n4, n8},
  repK-RV                             ENUMERATED [s1-0231, s2-0303, s3-
0000}                                 OPTIONAL, -- Need R
```

TABLE 36-continued

```
    periodicity                            ENUMERATED {
                                             sym2, sym7, sym1x14,
sym2x14, sym4x14, sym5x14, sym8x14, sym10x14, sym16x14, sym20x14,
                                             sym32x14, sym40x14,
sym64x14, sym80x14, sym128x14, sym160x14, sym256x14, sym320x14,
sym512x14,
                                             sym640x14, sym1024x14,
sym1280x14, sym2560x14, sym5120x14,
                                             sym6, sym1x12, sym2x12,
sym4x12, sym5x12, sym8x12, sym10x12, sym16x12, sym20x12, sym32x12,
                                             sym40x12, sym64x12,
sym80x12, sym128x12, sym160x12, sym256x12, sym320x12, sym512x12,
sym640x12,
                                             sym1280x12, sym2560x12
    },
    configuredGrantTimer                   INTEGER (1..64)
OPTIONAL, -- Need R
    rrc-ConfiguredUplinkGrant              SEQUENCE {
      timeDomainOffset                     INTEGER (0..5119),
      timeDomainAllocation                 INTEGER (0..15),
      frequencyDomainAllocation            BIT STRING (SIZE(18) ),
      antennaPort                          INTEGER (0..31),
      dmrs-SeqInitialization                    INTEGER (0..1)
OPTIONAL, -- Need R
      precodingAndNumberOfLayers           INTEGER (0..63),
      srs-ResourceIndicator                     INTEGER (0..15)
OPTIONAL, -- Need R
      mcsAndTBS                            INTEGER (0..31),
      frequencyHoppingOffset                    INTEGER (1..
maxNrofPhysicalResourceBlocks-1)           OPTIONAL, -- Need R
      pathlossReferenceIndex               INTEGER (0..maxNrofPUSCH-
PathlossReferenceRSs-1),
      ...
    }
OPTIONAL, -- Need R
    ...
}
```

Next, a PUSCH transmission method will be described. A DMRS antenna port for PUSCH transmission is the same as an antenna port for SRS transmission. The PUSCH transmission may follow a codebook-based transmission method or a non-codebook-based transmission method depending on whether the value txConfig in the higher layer signaling pusch-Config of Table 37 is 'codebook' or 'nonCodebook'.

As above, the PUSCH transmission may be dynamically scheduled through the DCI format 0_0 or 0_1, and may be semi-statically configured by the configured grant. If the UE is indicated to schedule the PUSCH transmission through the DCI format 0_0, the UE performs beam configuration for the PUSCH transmission using pucch-spatialRelationInfoID corresponding to a UE-specific PUCCH resource corresponding to a minimum ID within the uplink BWP activated in the serving cell, wherein the PUSCH transmission is based on a single antenna port. The UE does not expect the PUSCH transmission scheduling through the DCI format 0_0, within the BWP in which the PUCCH resource including pucch-spatialRelationInfo is not configured. If the UE is not configured with txConfig of pusch-Config of Table 37, the UE does not expect scheduling through DCI format 0_1.

TABLE 37

```
PUSCH-Config : :=                          SEQUENCE {
    dataScramblingIdentityPUSCH                INTEGER (0..1023)
OPTIONAL, -- Need S
    txConfig                                   ENUMERATED {codebook,
nonCodebook}                               OPTIONAL, -- Need S
    dmrs-UplinkForPUSCH-MappingTypeA           SetupRelease { DMRS-
UplinkConfig }                             OPTIONAL, -- Need M
    dmrs-UplinkForPUSCH-MappingTypeB           SetupRelease { DMRS-
UplinkConfig }                             OPTIONAL, -- Need M
    pusch-PowerControl                         PUSCH-PowerControl
OPTIONAL, -- Need M
    frequencyHopping                           ENUMERATED {intraSlot,
interSlot}                                 OPTIONAL, -- Need S
    frequencyHoppingOffsetLists                SEQUENCE (SIZE (1..4) ) OF
INTEGER (1.. maxNrofPhysicalResourceBlocks-1)
OPTIONAL, -- Need M
    resourceAllocation                                        ENUMERATED
{ resourceAllocationType0, resourceAllocationType1, dynamicSwitch},
    pusch-TimeDomainAllocationList             SetupRelease { PUSCH-
TimeDomainResourceAllocationList }         OPTIONAL, -- Need M
    pusch-AggregationFactor                    ENUMERATED { n2, n4, n8 }
OPTIONAL, -- Need S
    mcs-Table                                  ENUMERATED {qam256, gam64LowSE}
```

TABLE 37-continued

```
OPTIONAL, -- Need S
    mcs-TableTransformPrecoder          ENUMERATED {qam256, qam64LowSE}
OPTIONAL, -- Need S
    transformPrecoder                   ENUMERATED {enabled, disabled}
OPTIONAL, -- Need S
    codebookSubset                                                ENUMERATED
{fullyAndPartialAndNonCoherent, partialAndNonCoherent,nonCoherent}
OPTIONAL, -- Cond codebookBased
    maxRank                                              INTEGER (1..4)
OPTIONAL, -- Cond codebookBased
    rbg-Size                            ENUMERATED { config2}
OPTIONAL, -- Need S
    uci-OnPUSCH                         SetupRelease { UCI-OnPUSCH}
OPTIONAL, -- Need M
    tp-pi2BPSK                                    ENUMERATED {enabled}
OPTIONAL, -- Need S
    ...
}
```

Next, the codebook-based PUSCH transmission is described. The codebook-based PUSCH transmission may be dynamically scheduled through the DCI format 0_0 or 0_1, and may be operated semi-statically by the configured grant. If the codebook-based PUSCH is dynamically scheduled by the DCI format 0_1 or semi-statically configured by the configured grant, the UE determines a precoder for the PUSCH transmission based on an SRS resource indicator (SRI), a transmission precoding matrix indicator (TPMI), and a transmission rank (the number of PUSCH transmission layers).

At this time, the SRI may be given through a field SRS resource indicator of the DCI or configured through higher layer signaling srs-ResourceIndicator. At least one SRS resource may be configured for the UE in the codebook-based PUSCH transmission, and up to two SRS resources may be configured. If the UE receives the SRI through the DCI, the SRS resource indicated by the corresponding SRI indicates an SRS resource corresponding to the SRI, among the SRS resources transmitted prior to the PDCCH including the corresponding SRI. In addition, the TPMI and the transmission rank may be given through field precoding information and the number of layers of the DCI, or may be configured through higher layer signaling precodingAndNumberOfLayers. The TPMI is used to indicate the precoder applied to the PUSCH transmission. If one SRS resource is configured for the UE, the TPMI is used to indicate the precoder to be applied in the configured one SRS resource. If a plurality of SRS resources is configured for the UE, the TPMI is used to indicate the precoder to be applied in the SRS resource indicated through the SRI.

The precoder to be used in the PUSCH transmission is selected from an uplink codebook having the same number of antenna ports as the value nrofSRS-Ports of the higher layer signaling SRS-Config. In the codebook-based PUSCH transmission, the UE determines a codebook subset, based on the TPMI and codebookSubset in the higher layer signaling pusch-Config. CodebookSubset in the higher layer signaling pusch-Config may be configured as one of 'fullyAndPartialAndNonCoherent', 'partialAndNonCoherent', or 'noncoherent', based on the UE capability reported by the UE to the base station. If the UE reports 'partialAndNonCoherent' as the UE capability, the UE does not expect that the higher layer signaling value codebookSubset is configured as 'fullyAndPartialAndNonCoherent'. If the UE reports 'noncoherent' as the UE capability, the UE does not expect that the higher layer signaling signal codebookSubset is configured as 'fullyAndPartialAndNonCoherent' or 'partialAndNonCoherent'. If nrofSRS-Ports in the higher layer signaling SRS-ResourceSet indicates two SRS antenna ports, the UE does not expect that the higher layer signaling value codebookSubset is configured as 'partialAndNonCoherent'.

The UE may be configured with one SRS resource set in which the usage value of the higher layer signaling SRS-ResourceSet is configured as 'codebook', and one SRS resource may be indicated through the SRI in the corresponding SRS resource set. If several SRS resources are configured in the SRS resource in which the usage value of the higher layer signaling SRS-ResourceSet is configured as 'codebook, the UE expects that the value nrofSRS-Ports of the higher layer signaling SRS-Resource has the same value with respect to all the SRS resources.

The UE transmits to the base station one or more SRS resources included in the SRS resource set in which the usage value is configured as 'codebook' according to higher layer signaling, and the base station selects one of the SRS resources transmitted by the UE and indicates the UE to perform the PUSCH transmission using transmit beam information of the corresponding SRS resource. In this case, in the codebook-based PUSCH transmission, the SRI is used as information for selecting one SRS resource index and is included in the DCI. Additionally, the base station includes information indicating the TPMI and the rank to be used by the UE for the PUSCH transmission in the DCI. Using the SRS resource indicated by the SRI, the UE performs the PUSCH transmission by applying the precoder indicated by the rank and TPMI indicated based on the transmit beam of the SRS resource.

Next, the non-codebook-based PUSCH transmission is described. The non-codebook-based PUSCH transmission may be dynamically scheduled through the DCI format 0_0 or 0_1, and may be semi-statically operated by the configured grant. If at least one SRS resource is configured in the SRS resource set in which the usage value of the higher layer signaling SRS-ResourceSet is configured as 'nonCodebook', the UE may be scheduled with the non-codebook-based PUSCH transmission through the DCI format 0_1.

For the SRS resource set in which the usage value of the higher layer signaling SRS-ResourceSet is configured as 'nonCodebook', the UE may be configured with one connected NZP CSI-RS resource. The UE may calculate the precoder for the SRS transmission by measuring the NZP CSI-RS resource connected to the SRS resource set. If a difference between the last reception symbol of the aperiodic NZP CSI-RS resource connected to the SRS resource set and the first symbol of the aperiodic SRS transmission in the UE is less than 42 symbols, the UE does not expect that precoder information for the SRS transmission is updated.

If the value resourceType in the higher layer signaling SRS-ResourceSet is configured as 'aperiodic', the connected NZP CSI-RS is indicated by a field SRS request in the DCI format 0_1 or 1_1. At this time, if the connected NZP CSI-RS resource is an aperiodic NZP CSI-RS resource, it indicates presence of the connected NZP CSI-RS if a value of the field SRS request of the DCI format 0_1 or 1_1 is not '00'. In so doing, the corresponding DCI must not indicate cross carrier or cross BWP scheduling. If the SRS request value indicates the presence of the NZP CSI-RS, the corresponding NZP CSI-RS is positioned in a slot transmitting a PDCCH including the SRS request field. In this case, the TCI states configured in the scheduled subcarrier are not configured as QCL-TypeD.

If the periodic or semi-persistent SRS resource set is configured, the connected NZP CSI-RS may be indicated through associatedCSI-RS of the higher layer signaling SRS-ResourceSet. For the non-codebook-based transmission, the UE does not expect that associatedCSI-RS in both the higher layer signaling spatialRelationInfo and the higher layer signaling SRS-ResourceSet for the SRS resource is configured.

If a plurality of SRS resources is configured, the UE may determine the precoder and the transmission rank to be applied to the PUSCH transmission, based on the SRI indicated by the base station. In this case, the SRI may be indicated through a field SRS resource indicator of the DCI or may be configured through higher laver signaling srs-ResourceIndicator. Like the above-mentioned codebook-based PUSCH transmission, if the UE receives the SRI through the DCI, the SRS resource indicated by the SRI indicates the SRS resource corresponding to the SRI, among the SRS resources transmitted prior to the PDCCH including the corresponding SRI. The UE may use one or more SRS resources for SRS transmission, and the maximum number of SRS resources and the maximum number of SRS resources simultaneously transmittable in the same symbol of one SRS resource set are determined by the UE capability reported by the UE to the base station. At this time, the SRS resources simultaneously transmitted by the UE occupy the same RB. The UE configures one SRS port per SRS resource. Only one SRS resource set in which the usage value of the higher layer signaling SRS-ResourceSet is configured as nonCodebook may be configured, and up to four SRS resources may be configured for the non-codebook-based PUSCH transmission.

The base station transmits one NZP-CSI-RS connected to the SRS resource set to the UE, and the UE calculates the precoder to be used for transmitting one or more SRS resources of the corresponding SRS resource set, based on a measurement result if receiving the corresponding NZP-CSI-RS. The UE applies the calculated precoder in transmitting to the base station one or more SRS resources of the SRS resource set in which the usage is configured as 'nonCodebook', and the base station selects one or more of the received one or more SRS resources. In the non-codebook-based PUSCH transmission, the SRI indicates the index for representing one or more SRS resource combinations, and the SRI is included in the DCI. The number of the SRS resources indicated by the SRI transmitted by the base station may be the number of the PUSCH transmission layers, and the UE transmits the PUSCH by applying the precoder applied to the SRS resource transmission to each layer.

PUSCH: Preparation Procedure Time

Next, a PUSCH preparation procedure time is described. If the base station schedules the UE to transmit a PUSCH using the DCI format 0_0, 0_1, or 0_2, the UE may require the PUSCH preparation procedure time for transmitting the PUSCH by applying the transmission method indicated through the DCI (the SRS resource transmission precoding method, the number of the transmission layers, and the spatial domain transmission filter). The NR defines the PUSCH preparation procedure time in consideration of this. The PUSCH preparation procedure time of the UE may follow Equation (4).

$$T_{proc.2} = \max((N_2 + d_{2,1} + d_2)(2048 + 144)k2^{-\mu}T_c + T_{ext} + T_{switch}, d_{2,2}) \quad (4)$$

Each variable in $T_{proc.2}$ described in Equation (4) may have the following definition.

$N_2$: The number of symbols determined according to the UE processing capability 1 or 2 based on the UE capability and the numerology $\mu$. This may have values of Table 38 if the UE processing capability 1 is reported according to the UE capability report, and may have values of Table 39 if the UE processing capability 2 is reported and the UE processing capability 2 is configured to be available through higher layer signaling.

TABLE 38

| $\mu$ | PUSCH preparation time $N_2$ [symbols] |
|---|---|
| 0 | 10 |
| 1 | 12 |
| 2 | 23 |
| 3 | 36 |

TABLE 39

| $\mu$ | PUSCH preparation time $N_2$ [symbols] |
|---|---|
| 0 | 5 |
| 1 | 5.5 |
| 2 | 11 for frequency range 1 |

$d_{2,1}$: The number of symbols configured as 0 if all resource elements of a first OFDM symbol of the PUSCH transmission are configured with only DM-RSs, and otherwise configured as 1.

k: 64

$\mu$: This follows a value which more increases $T_{proc.2}$, among $\mu_{DL}$ or $\mu_{UL}$. $\mu_{DL}$ indicates the numerology of the downlink transmitting the PDCCH including the DCI for scheduling the PUSCH, and $\mu_{UL}$ indicates the numerology of the uplink transmitting the PUSCH.

$T_c$: This has $1/(\Delta f_{max} \cdot N_f)$, $\Delta f_{max} = 480 \cdot 10^3$ Hz, $N_f = 4096$.

$d_{2,2}$: This follows a BWP switching time if the DCI scheduling the PUSCH indicates BWP switching, and otherwise has "0".

$d_2$: If OFDM symbols of a PUCCH, a PUSCH having a high priority index, and a PUCCH having a low priority index overlap in time, $d_2$ of the PUCCH having the high priority index is used. Otherwise, $d_2$ is 0.

$T_{ext}$: If the UE uses the shared spectrum channel access scheme, the UE may calculate and apply $T_{ext}$ to the PDSCH processing procedure time. Otherwise, $T_{ext}$ is assumed to be 0.

$T_{switch}$: If an uplink switching interval is triggered, $T_{switch}$ is assumed to be a switching interval time. Otherwise, it is assumed to be 0.

Considering the influence of the timing advance between time domain resource mapping information of the PUSCH scheduled through the DCI and the uplink-downlink, if the first symbol of the PUSCH starts earlier than the first uplink symbol starting the CP after $T_{proc,2}$ from the last symbol of the PDCCH including the DCI scheduling the PUSCH, the base station and the UE determine that the PUSCH preparation procedure time is not sufficient. Otherwise, the base station and the UE determine that the PUSCH preparation procedure time is sufficient. The UE may transmit the PUSCH only if the PUSCH preparation procedure time is sufficient, and ignore the DCI scheduling the PUSCH if the PUSCH preparation procedure time is not sufficient.

PUSCH: Repetitive Transmission

Hereafter, repetitive transmission of an uplink data channel in the 5G system is described in detail. The 5G system supports two repetitive transmission methods of the uplink data channel, a repetitive PUSCH transmission type A and a repetitive PUSCH transmission type B. One of the repetitive PUSCH transmission type A or B may be configured for the UE through higher layer signaling.

PUSCH Repetitive Transmission Type A

As mentioned above, the symbol length and the start symbol position of the uplink data channel may be determined by the time domain resource assignment method in one slot, and the base station may notify the UE of the number of repetitive transmissions through higher layer signaling (e.g., RRC signaling) or L1 signaling (e.g., DCI).

The UE may repetitively transmit an uplink data channel having the same length and start symbol of the configured uplink data channel, based on the number of the repetitive transmissions received from the base station in continuous slots. In so doing, if at least one or more symbols of the slot configured as the downlink for the UE by the base station or the symbols of the uplink data channel configured for the UE is configured as downlink, the UE omits uplink data channel transmission but counts the number of repetitive transmissions of the uplink data channel.

PUSCH Repetitive Transmission Type B

As described above, the start symbol and the length of the uplink data channel may be determined by the time domain resource assignment method in one slot, and the base station may notify the UE of the number of repetitive transmissions numberofrepetitions through higher layer signaling (e.g., RRC signaling) or L1 signaling (e.g., DCI).

Based on the start symbol and the length of the configured uplink data channel, a nominal repetition of the uplink data channel is determined as below. A slot where the n-th nominal repetition starts is given by $$K_s + \left\lfloor \frac{S + n \cdot L}{N_{symb}^{slot}} \right\rfloor$$

and a symbol starting from that slot is given by $\mathrm{mod}(S+n \cdot L, N_{symb}^{slot})$. A slot where the n-th nominal repetition ends is given by $$K_s + \left\lfloor \frac{S + (n+1) \cdot L - 1}{N_{symb}^{slot}} \right\rfloor$$

and an ending symbol of the slot is given by $\mathrm{mod}(S+(n+1) \cdot L-1, N_{symb}^{slot})$. Herein, n=0, . . . , numberofrepetitions−1, S denotes the start symbol of the configured uplink data channel, and L denotes the symbol length of the configured uplink data channel. $K_s$ denotes the slot starting the PUSCH transmission, and $N_{symb}^{slot}$ denotes the number of symbols per slot.

The UE determines an invalid symbol for the PUSCH repetitive transmission type B. The symbol configured as the downlink by tdd-UL-DL-ConfigurationCommon or tdd-UL-DL-ConfigurationDedicated is determined as the invalid symbol for the PUSCH repetitive transmission type B. Additionally, the invalid symbol may be configured in a higher layer parameter (e.g., InvalidSymbolPattern). The higher layer parameter (e.g., InvalidSymbolPattern) may provide a symbol level bitmap over one slot or two slots, thus configuring the invalid symbol. In the bitmap, 1 represents the invalid symbol. Additionally, the period and the pattern of the bitmap may be configured through a higher layer parameter (e.g., periodicityAndPattern). If the higher layer parameter (e.g., InvalidSymbolPattern) is configured and a parameter InvalidSymbolPatternIndicator-ForDCIFormat0_1 or InvalidSymbolPatternIndicator-ForDCIFormat0_2 indicates 1, the UE applies an invalid symbol pattern, and if the parameter indicates 0, the UE does not apply the invalid symbol pattern. If the higher layer parameter (e.g., InvalidSymbolPattern) is configured and the parameter InvalidSymbolPatternIndicator-ForDCIFormat0_1 or InvalidSymbolPatternIndicator-ForDCIFormat0_2 is not configured, the UE applies the invalid symbol pattern. After the invalid symbol is determined, the UE may consider symbols other than the invalid symbol as valid symbols for each nominal repetition. If one or more valid symbols are included in each nominal repetition, the nominal repetition may include one or more actual repetitions. Herein, each actual repetition includes a set of consecutive valid symbols available for the PUSCH repetitive transmission type B in one slot.

Figure 17:
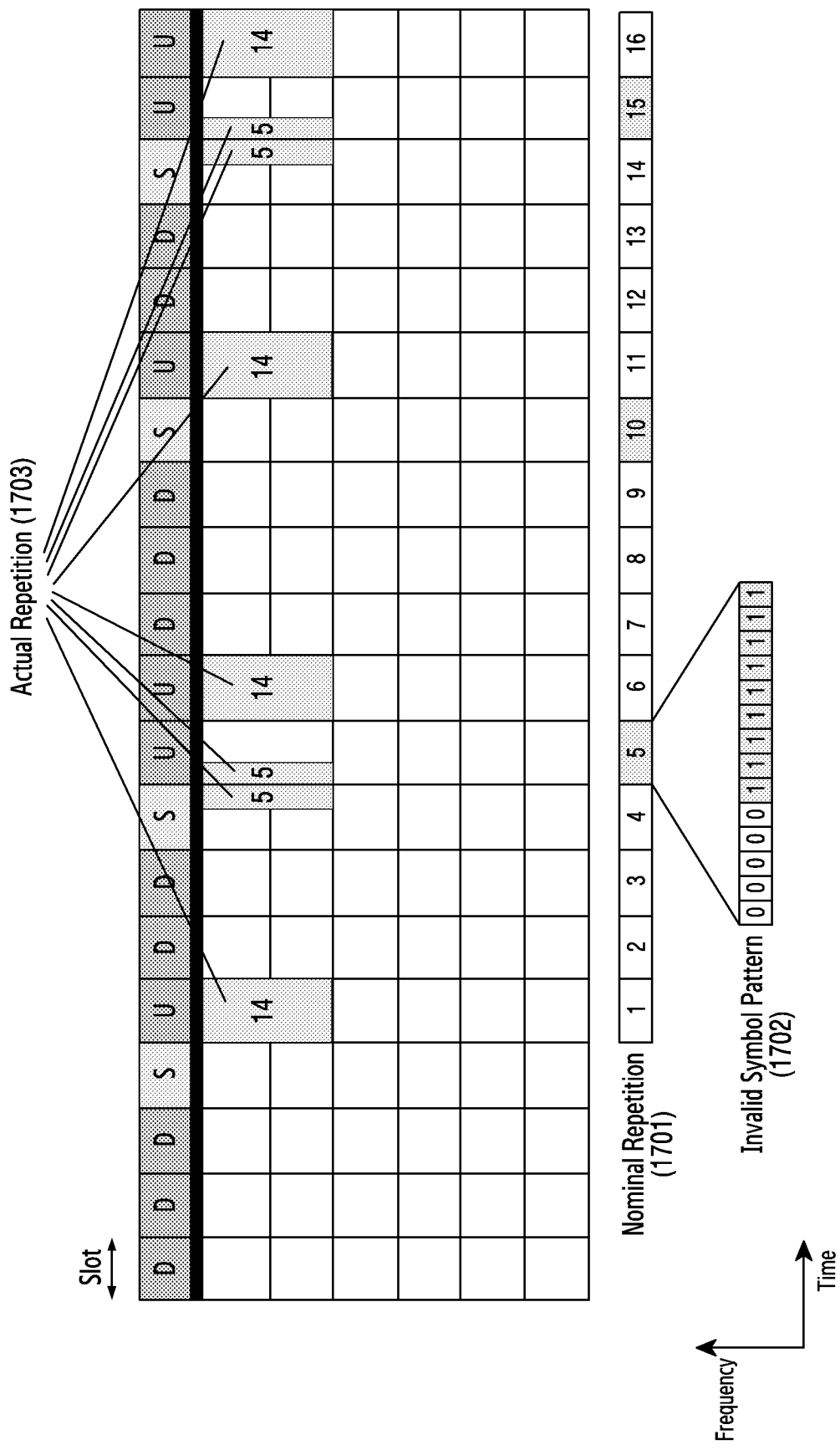
FIG. 17 illustrates a physical uplink shared channel (PUSCH) repetitive transmission type B in a wireless communication system according to an embodiment.

FIG. 17 illustrates PUSCH repetitive transmission type B in a wireless communication system according to an embodiment.

The UE may be configured with a start symbol S of an uplink data channel as 0, the length L of the uplink data channel as 14, and the number of repetitive transmissions as 16. In this case, nominal repetition 1701 is shown in 16 consecutive slots. Next, the UE may determine the symbol configured as a downlink symbol as the invalid symbol in each nominal repetition 1701. In addition, the UE determines symbols configured as 1 as invalid symbols in an invalid symbol pattern 1702. In each nominal repetition, if the valid symbols other than the invalid symbols include one or more consecutive symbols in one slot, the actual repetition 1703 is configured and transmitted.

In addition, for the PUSCH repetitive transmission, NR Rel. 16 may define the following additional methods for UL grant based PUSCH transmission and the configured grant based PUSCH transmission beyond the slot boundary.

Method 1 (mini-slot level repetition): Two or more PUSCH repetitive transmissions are scheduled within one slot or beyond a boundary of consecutive slots, through one UL grant. In addition, for Method 1, the time domain resource assignment information in the DCI indicates a first repetitive transmission resource. In addition, time domain resource information of other repetitive transmissions may be determined according to the time domain resource information of the first repetitive transmission, and the uplink or downlink direction determined for each symbol of each slot. Each repetitive transmission occupies consecutive symbols.

Method 2 (multi-segment transmission): Two or more PUSCH repetitive transmissions are scheduled in consecutive slots through one UL grant. In this case, one transmission is designated for each slot, and the starting point or the repetition length may differ for each respective transmission. In addition, in Method 2, the time domain resource assignment information in the DCI indicates the starting points and the repetition lengths of all repetitive transmissions. In addition, if repetitive transmission is performed within a single slot using Method 2, and multiple bundles of consecutive uplink symbols exist in the corresponding slot, each repetitive transmission is conducted for each uplink symbol bundle. If a single bundle of consecutive uplink symbols exists in the slot, one PUSCH repetitive transmission is performed according to the method of NR Rel. 15.

Method 3: Two or more repetitive PUSCH transmissions are scheduled in consecutive slots through two or more UL grants. In this case, one transmission is designated for each slot, and an n-th UL grant may be received before PUSCH transmission scheduled by an (n−1)-th UL grant is finished.

Method 4: One or more PUSCH repetitive transmissions in a single slot, or two or more PUSCH repetitive transmissions across boundaries of consecutive slots may be supported, by one UL grant or one configured grant. The number of repetitions indicated by the base station to the UE is merely a nominal value, and the number of PUSCH repetitive transmissions actually performed by the UE may be greater than the nominal number of repetitions. The time domain resource assignment information of the DCI or the configured grant indicates a first repetitive transmission resource indicated by the base station. The time domain resource information of other repetitive transmissions may be determined with reference to at least first repetitive transmission resource information and uplink or downlink directions of symbols. If the time domain resource information of the repetitive transmission indicated by the base station covers the slot boundary or includes an uplink/downlink switching point, the corresponding repetitive transmission may be divided into a plurality of repetitive transmissions. At this time, one repetitive transmission may be included for each uplink period in one slot.

PUSCH: Frequency Hopping

Hereafter, frequency hopping of the uplink data channel (PUSCH) in the 5G system is described in detail.

5G supports two methods for each repetitive PUSCH transmission type, as the frequency hopping method of the uplink data channel. First, the PUSCH repetitive transmission type A supports intra-slot frequency hopping and inter-slot frequency hopping, and the PUSCH repetitive transmission type B supports inter-repetition frequency hopping and inter-slot frequency hopping.

The intra-slot frequency hopping method supported in the PUSCH repetitive transmission type A is a method in which the UE changes and transmits the allocated resource of the frequency domain by a configured frequency offset in two hops within one slot. A start RB of each hop in the intra-slot frequency hopping may be expressed by Equation (5).

$$RB_{start} = \begin{cases} RB_{start} & i=0 \\ (RB_{start} + RB_{offset}) \bmod N_{BWP}^{size} & i=1 \end{cases} \quad (5)$$

In Equation (5), i=0 and i=1 denote the first hop and the second hop respectively, and $RB_{start}$ denotes a start RB in the UL BWP and is calculated from the frequency resource allocation method. $RB_{offset}$ denotes a frequency offset between the two hops through the higher layer parameter. The number of symbols of the first hop may be expressed as $\lfloor N_{symb}^{PUSCH,s}/2 \rfloor$, and the number of symbols of the second hop may be expressed as $N_{symb}^{PUSCH,s} - \lfloor N_{symb}^{PUSCH,s}/2 \rfloor$. $N_{symb}^{PUSCH,s}$ is the PUSCH transmission length in one slot, and is represented by the number of OFDM symbols.

Next, the inter-slot frequency hopping method supported in the PUSCH repetitive transmission types A and B is a method in which the UE changes and transmits the allocated resource of the frequency domain by a frequency offset configured for each slot. A start RB during $n_s^\mu$ slots in the inter-slot frequency hopping may be expressed as Equation (6).

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad (6)$$

In Equation (6), $n_s^\mu$ denotes a current slot number in the multi-slot PUSCH transmission, and $RB_{start}$ denotes the start RB in the UL BWP and is calculated from the frequency resource allocation method. $RB_{offset}$ denotes the frequency offset between two hops through the higher layer parameter.

Next, the inter-repetition frequency hopping method supported in the PUSCH repetitive transmission type B is to shift and transmit the allocated resource in the frequency domain for one or more actual repetitions of each nominal repetition, by a configured frequency offset. $RB_{start}(n)$ which is the index of the start RB in the frequency domain for one or more actual repetitions within the n-th nominal repetition may follow Equation (7) below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad (7)$$

In Equation (7), n denotes a nominal repetition index, and $RB_{offset}$ denotes the RB offset between two hops through the higher layer parameter.

UE Capability Report

In LTE and NR, the UE may perform a procedure of reporting capability supported by the UE to a corresponding base station while being connected to the serving base station. This is referred to as UE capability report in the following description.

The base station may transmit a UE capability enquiry message requesting the capability report to the UE of the connected state. The message may include a UE capability request per radio access technology (RAT) type of the base station. The request per RAT type may include supported frequency band combination information. In addition, the UE capability enquiry message may request UE capability for a plurality of RAT types through a single RRC message container transmitted by the base station, or the base station may transmit to the UE a message including a plurality of UE capability enquiries including the UE capability request per RAT type. That is, the UE capability enquiry may be repeated multiple times in a single message, and the UE may configure a UE capability information message corresponding thereto and report the same multiple times. The next-generation mobile communication system may request the UE capability with respect to multi-RAT dual connectivity (MR-DC) as well as NR, LTE, and E-UTRA-NR dual connectivity (EN-DC). In addition, the UE capability enquiry message is generally transmitted in the initial stage after the UE is connected to the base station, but the base station may request the UE capability under any condition if necessary.

In the above step, the UE receiving the UE capability report request from the base station configures UE capability according to the RAT type and the band information requested from the base station. A method for configuring the UE capability at the UE in the NR system will be summarized below:

1. If the UE receives an LTE and/or NR band list from the base station at the UE capability request, the UE configures a band combination (BC) for the EN-DC and NR standalone (SA). That is, the UE configures a BC candidate list for the EN-DC and the NR SA, based on the bands requested by the base station using FreqBandList. In addition, the bands have priority in order as described in FreqBandList.
2. If the base station requests the UE capability report by configuring a "eutra-nr-only" flag or a "eutra" flag, the UE completely removes the NR SA BCs from the configured BC candidate list. This operation may be performed only if the LTE base station (eNB) requests "eutra" capability.
3. Next, the UE removes fallback BCs from the BC candidate list configured in the above step. Herein, the fallback BC indicates a BC which may be obtained by removing a band corresponding to at least one SCell from a specific BC, and may be omitted because the BC before removing the band corresponding to at least one SCell may cover the fallback BC. This step is also applied to the MR-DC, that is, to the LTE bands. After this step, the remaining BCs create a final "candidate BC list".
4. The UE selects BCs to be reported by selecting the BCs conforming to the requested RAT type from the final "candidate BC list". In this step, the UE configures supportedBandCombinationList in a designated order. In other words, the UE configures the BC and the UE capability to report according to a preset rat-Type order (nr-eutra-nr-eutra). In addition, the UE configures featureSetCombination for the configured supportedBandCombinationList, and configures a list of "candidate feature set combinations" from the candidate BC list from which the list of fallback BCs (including capabilities of the equal or lower level) is removed. The "candidate feature set combination" may include every feature set combination of NR and EUTRA-NR BC, and may be obtained from the feature set combination of UE-NR-Capabilities and UE-MRDC-Capabilities" containers.
5. In addition, if the requested rat Type is "eutra-nr" and exerts influence, featureSetCombinations is included in both containers of UE-MRDC-Capabilities and UE-NR-Capabilities. However, the feature set of the NR is included only in UE-NR-Capabilities.

After the UE capability is configured, the UE transmits a UE capability information message including the UE capability to the base station. The base station performs appropriate scheduling and transmission and reception management for the corresponding UE, based on the UE capability received from the UE.

CA/DC

Figure 18:
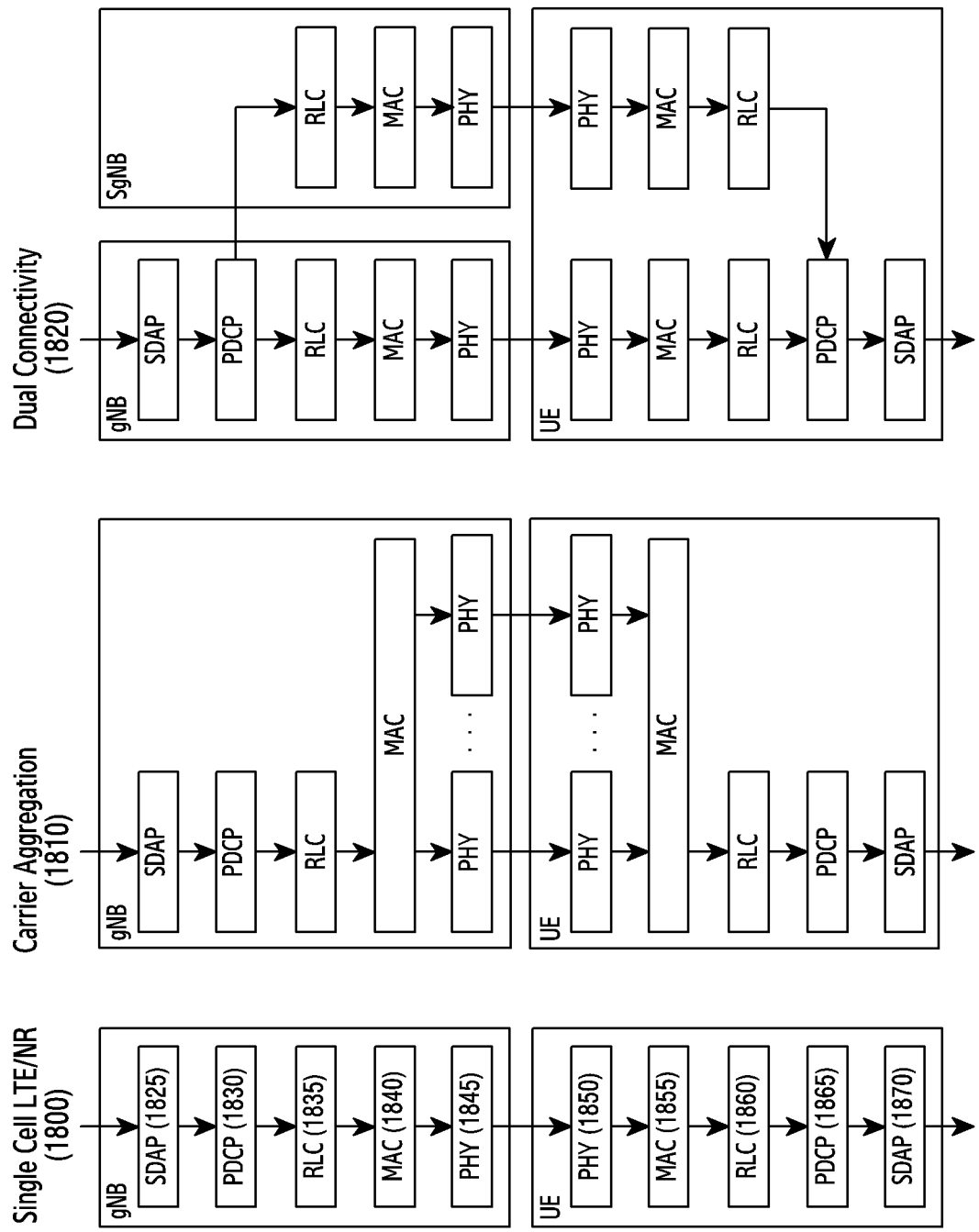
FIG. 18 illustrates a wireless protocol architecture of a base station and a terminal with a single cell, carrier aggregation, and dual connectivity in a wireless communication system according to an embodiment.

FIG. 18 illustrates a radio protocol structure of a base station and a UE in a single cell, carrier aggregation, and dual connectivity according to an embodiment.

Referring to FIG. 18, the radio protocol of the next-generation mobile communication system includes NR service data adaption protocol (SDAP) 1825 and 1870, NR packet data convergence protocol (PDCP) 1830 and 1865, NR radio link control (RLC) 1835 and 1860, and NR MAC 1840 and 1855 in the UE and the gNB respectively.

Primary functions of the NR SDAP 1825 or 1870 may include some of the following functions.

Transfer of user plane data
Mapping between QoS flow and data radio bearer (DRB) for both DL and UL
Marking QoS flow ID in both DL and UL packets
Mapping reflective QoS flow to DRB for UL SDAP PDUs For the SDAP layer device, the UE may be configured with whether to use a header of the SDAP layer device or whether to use functions of the SDAP layer device for each PDCP layer device, for each bearer, or for each logical channel through an RRC message, and if the SDAP header is configured, a 1-bit NAS reflective quality of service (QoS) configuration indicator and a 1-bit AS reflective QoS configuration indicator of the SDAP header may indicate the UE to update or reconfigure mapping information of QoS flows and data bearers in the uplink and downlink. The SDAP header may include QoS flow ID information indicating QoS. The QoS information may be used as data processing priority, scheduling information, or the like to support seamless services.

Primary functions of the NR PDCP 1830 or 1865 may include some of the following functions:

Header compression and decompression (robust header compression (ROHC) only)
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering of the NR PDCP layer device indicates a function of reordering PDCP PDUs received from a lower layer, based on a PDCP sequence number (SN), and may include a function of transmitting data to a higher layer in the reordered order. Alternatively, the reordering of the NR PDCP layer device may include a function of directly transmitting data without considering the order, a function of reordering the sequence and recording lost PDCP PDUs, a function of transmitting a status report of the lost PDCP PDUs to a transmitting side, and a function of requesting to retransmit the lost PDCP PDUs.

Primary functions of the NR RLC 1835 or 1860 may include some of the following functions:

Transfer of upper layer PDUs
In-sequence delivery of upper layer PDUs
Out-of-sequence delivery of upper layer PDUs
Error correction through ARQ
Concatenation, segmentation, and reassembly of RLC SDUs
Re-segmentation of RLC data PDUs
Reordering of RLC data PDUs Duplicate detection
Protocol error detection
RLC SDU discard
RLC re-establishment The in-sequence delivery of the NR RLC layer device indicates a function of transferring RLC SDUs received from a lower layer to a higher layer in sequence. The in-sequence delivery of the NR RLC layer device may include, if one original RLC SDU is divided into a plurality of RLC SDUs and received, reassembling and transmitting them, reordering the received RLC PDUs based on an RLC SN or a PDCP SN, reordering and recording lost RLC PDUs, transmitting a status report of the lost RLC PDUs to the transmitting side, and requesting to retransmit the lost RLC PDUs. The in-sequence delivery the NR RLC layer device may include, if there is a lost RLC SDU, transmitting only the RLC SDUs prior to the lost RLC SDU to a higher layer in sequence, or may include, if there is a lost RLC SDU but a designated timer expires, transmitting all RLC SDUs received before the timer starts to the higher layer in sequence. Alternatively, the in-sequence delivery of the NR RLC layer device may include, if there is a lost RLC SDU but a designated timer expires, transmitting all RLC SDUs received so far to a higher layer in sequence. In addition, the RLC PDUs may be processed in their reception order (in order of arrival, regardless of the serial number or the SN), and transmitted to the PDCP layer device out-of-sequence delivery. Segments stored in a buffer or to be received may be received and reconfigured into one complete RLC PDU, and then processed and transmitted to the PDCP layer device. The NR RLC layer may not include a concatenation function, and this function may be performed in the NR MAC layer or replaced with a multiplexing function of the NR MAC layer.

The out-of-sequence delivery of the NR RLC layer device indicates directly transmitting RLC SDUs received from a lower layer to a higher layer regardless of the sequence, and may include, if one original RLC SDU is divided into a plurality of RLC SDUs and received, reassembling and transmitting them. Also, the out-of-sequence delivery of the NR RLC layer device may include storing and ordering RLC SNs or PDCP SNs of the received RLC PDUs and thus recording lost RLC PDUs.

The NR MAC 1840 or 1855 may be connected to several NR RLC layer devices configured in a single UE, and primary functions of the NR MAC may include some of the following functions:

Mapping between logical channels and transport channels
Multiplexing/demultiplexing of MAC SDUs
Scheduling information reporting
error correction through HARQ
Priority handling between logical channels of one UE
Priority handling between UEs by means of dynamic scheduling
multimedia broadcast multicast services (MBMS) service identification
Transport format selection
Padding The NR PHY layer 1845 or 1850 may channel-code and modulate higher layer data into OFDM symbols, and generate and transmit them over a radio channel, or demodulate and channel-decode OFDM symbols received over the radio channel and transmit them to a higher layer.

The radio protocol structure may be variously changed in its detailed structure depending on a carrier (or cell) operating scheme. For example, if the base station transmits data to the UE based on a single carrier (or cell), the base station and the UE use a protocol structure 1800 having a single structure for each layer. By contrast, if the base station transmits data to the UE based on the CA using multiple carriers in a single TRP, the base station and the UE use a protocol structure 1810 which has a single structure up to the RLC layer and multiplexes the PHY layer with the MAC layer. As yet another example, if the base station transmits data to the UE based on DC using multiple carriers in multiple TRPs, the base station and the UE use a protocol structure 1820 which has a single structure up to the RLC layer and multiplexes the PHY layer with the MAC layer.

Referring to the above descriptions on the PDCCH and the beam configuration, current Rel-15 and Rel-16 NR do not support the PDCCH repetitive transmission and hardly achieve the required reliability in a scenario requiring high reliability such as URLLC. The disclosure provides a PDCCH repetitive transmission method through multiple TRPs to improve PDCCH reception reliability of the UE. Details thereof shall be described in the following embodiments.

Hereafter, embodiments of the disclosure are described in detail with reference to the accompanying drawings. The disclosure is applicable to FDD and TDD systems. Hereafter, the higher signaling (or higher layer signaling) in the disclosure may be a signal delivery method in which the base station transmits a signal to the UE using the downlink data channel of the physical layer, or the UE transmits a signal to the base station using the uplink data channel of the physical layer. In addition, the higher signaling (or higher layer signaling) may be referred to as RRC signaling, PDCP signaling, or MAC CE.

Hereafter, the UE may determine whether to apply cooperative communication using various methods such as a case where PDCCH(s) allocating the PDSCH to which the cooperative communication is applied has a specific format, a case where PDCCH(s) allocating the PDSCH to which the cooperative communication is applied includes a specific indicator indicating whether to apply the cooperative communication, a case where PDCCH(s) allocating the PDSCH to which the cooperative communication is applied is scrambled with a specific RNTI, or a case where applying the cooperative communication is assumed in a specific section indicated by the higher layer. Hereafter, receiving at the UE the PDSCH to which the cooperative communication is applied based on the above similar conditions will be referred to as a non-coherent joint transmission (NC-JT) case for ease of description.

Hereafter, determining the priority between A and B in the disclosure may be variously mentioned such as selecting one having the higher priority according to a predefined priority rule and performing a corresponding operation or omitting or dropping an operation on the other having the lower priority.

Examples shall be described through a plurality of embodiments but are not independent, and one or more embodiments may be applied simultaneously or in combination.

NC-JT

According to an embodiment, non-coherent joint transmission (NC-JT) may be used for the UE to receive PDSCHs from multiple TRPs.

Unlike the related art, the 5G wireless communication system may support a service having very short transmission delay and a service requiring high connection density as well as a service requiring a high transmission rate. In a wireless communication network including a plurality of cells, TRPs, and/or beams, and coordinated transmission between cells, may satisfy various service requirements by increasing a received signal strength of the UE or efficiently controlling interference between the cells, the TRPs, and/or the beams.

The joint transmission (JT) is a representative transmission technology for the above-mentioned coordinated communication, for increasing the strength or the throughput of the signal received at the UE by transmitting signals to one UE through a plurality of different cells, TRPs. and/or beams. At this time, channels between each cell, TRP, or beam and the UE may be significantly different in characteristic, and particularly, the NC-JT supporting non-coherent precoding between the cells, the TRPs, and/or the beams may require individual precoding, MCS, resource allocation, TCI indication, and so on, depending on the channel characteristics of each link between each cell, TRP, and/or beam and the UE.

The above-described NC-JT may be applied to at least one channel of the downlink data channel (PDSCH), the downlink control channel (PDCCH), the uplink data channel (PUSCH), and the uplink control channel (PUCCH). Transmission information such as precoding, MCS, resource allocation, and TCI is indicated by DL DCI in PDSCH transmission, and the transmission information must be independently indicated for each cell, TRP, and/or beam for the NC-JT transmission. This is a major factor which increases a payload required for the DL DCI transmission, which may adversely affect reception performance of the PDCCH transmitting the DCI. Hence, it is necessary to carefully design a tradeoff between the DCI information amount and the control information reception performance to support the PDSCH JT.

Figure 19:
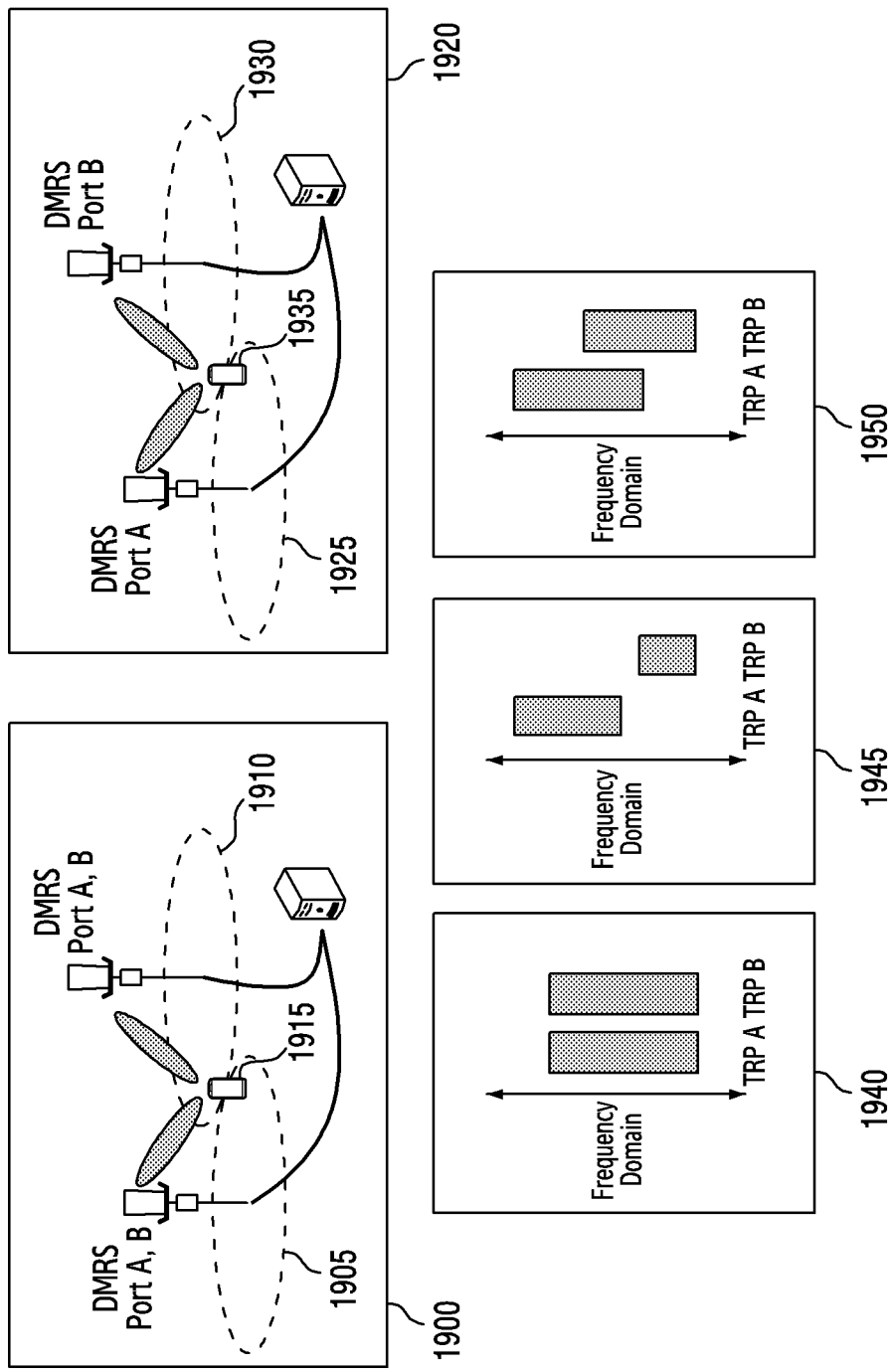
FIG. 19 illustrates an antenna port configuration and a resource assignment example for cooperative communication in a wireless communication system according to an embodiment.

FIG. 19 illustrates an antenna port configuration and resource assignment for cooperative communication in a wireless communication system according to embodiment.

Referring to FIG. 19, an example of the PDSCH transmission is described based on each JT technique, and examples of allocating radio resources per TRP are shown.

In addition, an example 1900 of coherent joint transmission (C-JT) supporting coherent precoding between cells, TRPs and/or beams is depicted.

In the C-JT, a TRP A 1905 and a TRP B 1910 may transmit single data (PDSCH) to a UE 1915, and a plurality of TRPs may perform joint precoding. This may include transmitting DMRS through the same DMRS ports such that the TRP A 1905 and the TRP B 1910 transmit the same PDSCH. For example, the TRP A 1905 and the TRP B 1910 may transmit the DRMS to the UE through a DMRS port A and a DMRS port B respectively. In this case, the UE may receive one DCI information for receiving one PDSCH demodulated based on the DMRS transmitted through the DMRS port A and the DMRS port B.

FIG. 19 shows an example 1920 of the NC-JT supporting the non-coherent precoding between cells, TRPs, and/or beams for the PDSCH transmission.

The NC-JT transmits the PDSCH to a UE 1935 for each cell, TRP, and/or beam, and apply individual precoding to each PDSCH. Each cell, TRP, and/or beam may transmit a different PDSCH or a different PDSCH layer to the UE, thus improving throughput compared to single cell. TRP, and/or beam transmission. In addition, each cell, TRP, and/or beam may improve reliability compared to the single cell, TRP, and/or beam transmission by repeatedly transmitting the same PDSCH to the UE. For convenience of description, the cell, the TRP, and/or the beam shall be now collectively referred to as a TRP.

In so doing, various radio resource assignments may be considered such as a case 1940 where the frequency and time resources used by a plurality of TRPs for the PDSCH transmission are all the same, a case 1945 where the frequency and time resources used by a plurality of TRPs do not overlap at all, and a case 1950 where the frequency and time resources used by a plurality of TRPs partially overlap.

For the NC-JT support, DCI of various types, structures, and relationships may be considered to allocate a plurality of PDSCHs to one UE at the same time.

Figure 20:
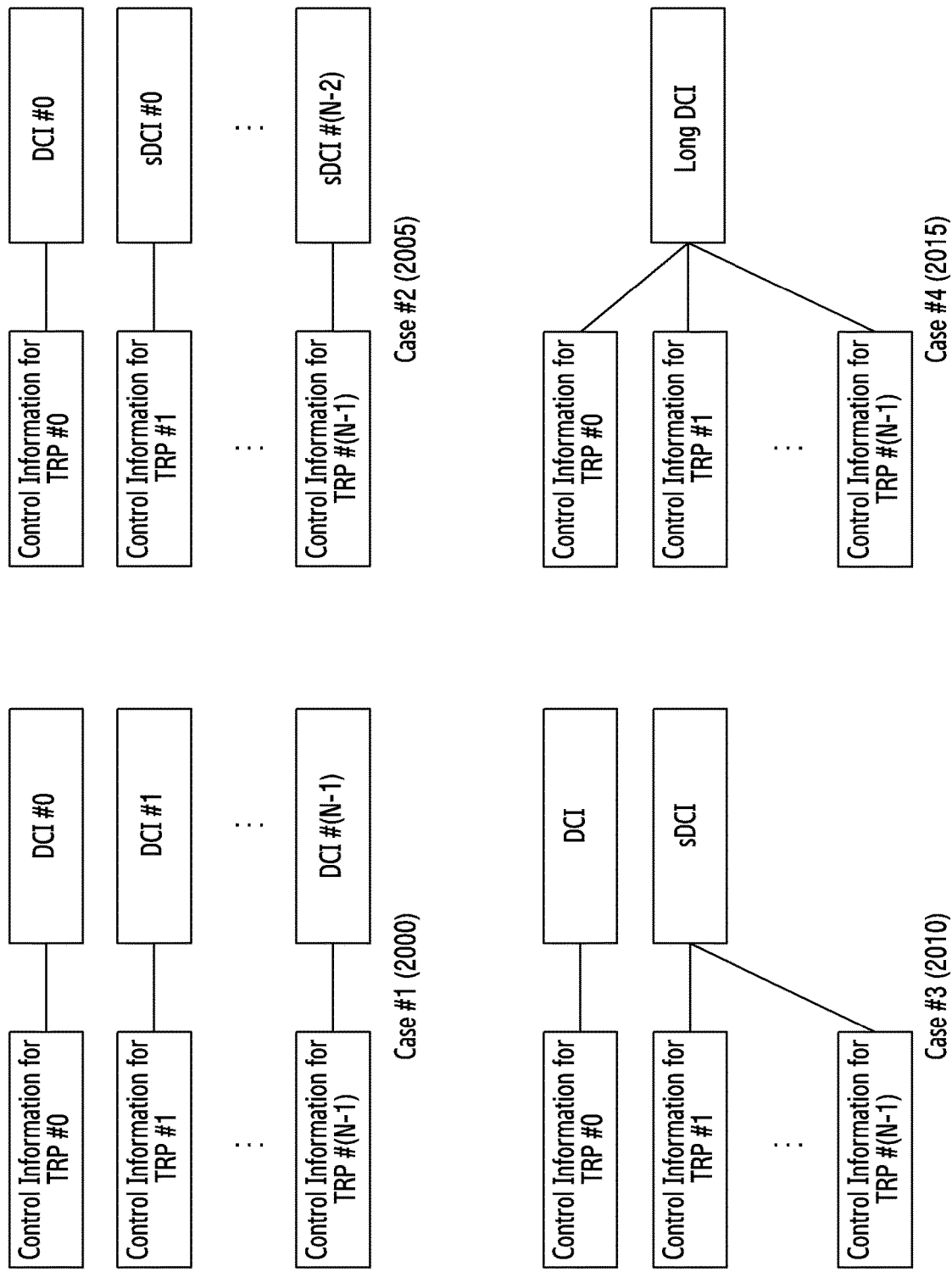
FIG. 20 illustrates a downlink control information (DCI) configuration example for cooperative communication in a wireless communication system according to an embodiment.

FIG. 20 illustrates a DCI configuration example for cooperative communication in a wireless communication system according to an embodiment. Specifically, the DCI configuration example for the NC-JT in which each TRP transmits a different PDSCH or a different PDSCH layer to the UE in the wireless communication system is explained.

Referring to FIG. 20, a case #1 2000 is an example in which (N−1)-ary different PDSCHs are transmitted from (N−1)-ary additional TRPs (for example, TRP #1 through TRP #(N−1)) in addition to a serving TRP TRP #0 used in single PDSCH transmission, and control information of the PDSCHs transmitted by the (N−1)-ary additional TRPs is transmitted independently of control information of the PDSCH transmitted from the serving TRP. That is, the UE may obtain control information of the PDSCHs transmitted from different TRPs (for example, TRP #0 through TRP #(N−1)) through independent DCI (for example, DCI #0 through DCI #(N−1)). The formats of the independent DCI may be identical or different, and the payloads of the DCI may also be identical or different. Case #1 described above may completely guarantee PDSCH control or allocation freedom, but may degrade the reception performance due to a coverage difference between the DCI if each DCI is transmitted from the different TRP.

A case #2 2005 shows an example in which (N−1)-ary different PDSCHs are transmitted from (N−1)-ary additional TRPs (for example, TRP #1 through TRP #(N−1)) in addition to the serving TRP TRP #0 used in the single PDSCH transmission, DCI of the PDSCHs of the (N−1)-ary additional TRPs is transmitted respectively and their DCI is dependent on control information of the PDSCH transmitted from the serving TRP.

For example, control information DCI #0 of the PDSCH transmitted from the serving TRP TRP #0 includes all IEs of DCI format 1_0, DCI format 1_1, and DCI format 1_2, but shortened DCI (hereafter, sDCI) (for example, sDCI #0 through sDCI #(N−2)) which is the control information of the PDSCHs transmitted from the cooperative TRPs (for example, TRP #1 through TRP #(N−1)) may include only some of the IEs of DCI format 1_0. DCI format 1_1, and DCI format 1_2. Hence, the sDCI transmitting the control information of the PDSCHs transmitted from the cooperative TRPs has a smaller payload than normal DCI (nDCI) transmitting the control information related to the PDSCH transmitted from the serving TRP and accordingly may include reserved bits compared to nDCI.

Case #2 described above may restrict the control or allocation freedom of each PDSCH depending on content of the IE included in the sDCI, but the reception performance of the sDCI is better than the nDCI and thus coverage difference per DCI is less likely to occur.

A case #3 2010 shows an example in which (N−1)-ary different PDSCHs are transmitted from (N−1)-ary additional (for example, TRPs TRP #1 through TRP #(N−1)) in addition to the serving TRP TRP #0 used in the single PDSCH transmission, one control information of the PDSCHs of the (N−1)-ary additional TRPs is transmitted, and their DCI is dependent on control information of the PDSCH transmitted from the serving TRP.

For example, DCI #0 which is control information of the PDSCH transmitted from the serving TRP TRP #0 may include all IEs of DCI format 1_0, DCI format 1_1, and DCI format 1_2, and control information of the PDSCHs transmitted from the cooperative TRPs (for example, TRP #1 through TRP #(N−1)) may collect and transmit only some of the IEs of DCI format 1_0. DCI format 1_1, and DCI format 1_2 in one secondary DCI. For example, the sDCI may include at least one of HARQ related information such as frequency domain resource assignment, time domain resource assignment, and MCS of the cooperative TRPs. Besides, information not included in the sDCI, such as a BWP indicator or a carrier indicator, may follow DCI (for example, DCI #0, nDCI) of the serving TRP.

Case #3 2010 may restrict each PDSCH control or allocation freedom depending on the content of the IEs included in sDCI, but the reception performance of sDCI may be controlled and DCI blind decoding complexity of the UE may be reduced compared to case #1 2000 or case #2 2005.

A case #4 2015 shows an example in which (N−1)-ary different PDSCHs are transmitted from (N−1)-ary additional TRPs (for example, TRP #1 through TRP #(N−1)) in addition to the serving TRP TRP #0 used in the single PDSCH transmission, and control information of the PDSCHs transmitted from the (N−1)-ary additional TRPs are transmitted in the same DCI (long DCI) as control information of the PDSCH transmitted from the serving TRP. That is, the UE may obtain the control information of the PDSCHs transmitted from the different TRPs (for example, TRP #0 through TRP #(N−1)) through the single DCI. In case #4 2015, the DCI blind decoding complexity of the UE may not increase, but the PDSCH control or allocation freedom may be lowered such as limiting the number of cooperative TRPs according to long DCI payload restriction.

In the following description and embodiments, the sDCI may indicate various auxiliary DCIs such as shortened DCI, secondary DCI, or normal DCI (for example, DCI formats 1_0 through 1_1 described above) including the PDSCH control information transmitted from the cooperative TRP, and the corresponding description may be applied to various auxiliary DCIs in a similar manner unless a specific restriction is specified.

In the following description and embodiments, the aforementioned case #1 2000, case #2 2005, and case #3 2010 which use one or more DCI (PDCCHs) to the support the NC-JT may be distinguished with the multiple PDCCH based NC-JT, and the aforementioned case #4 2015 which uses one DCI (PDCCH) to support the NC-JT may be distinguished with the single PDCCH based NC-JT. In the multiple PDCCH based PDSCH transmission may distinguish a CORESET scheduling the DCI of the serving TRP TRP #0 and a CORESET scheduling the DCI of the cooperative TRPs (for example, TRP #1 through TRP #(N−1)). As a method of distinguishing the CORESETs, a method of distinguishing the CORESETs using a higher layer indicator per CORESET, a method of distinguishing the CORESETs using beam configuration per CORESET, and the like may be provided. In addition, in the single PDCCH based NC-JT, the single DCI may schedule the single PDSCH having a plurality of layers, instead of scheduling a plurality of PDSCHs, and the plurality of the layers mentioned above may be transmitted from a plurality of TRPs. A connection relationship between the layer and the TRP transmitting the corresponding layer may be indicated through a transmission configuration indicator (TCI) for the layer.

The "cooperative TRP" described herein may be replaced by various terms such as a "cooperative panel" or a "cooperative beam" in actual application.

Also, "applying the NC-JT" may be variously construed depending on a situation, such as "a case where the UE simultaneously receives one or more PDSCHs in one BWP", "a case where the UE simultaneously receives PDSCHs based on two or more TCIs in one BWP", "a case where the PDSCH received at the UE is associated with one or more DMRS port groups", but one expression is used for convenience.

In the disclosure, the wireless protocol structure for the NC-JT may be used in various manners according to a TRP deployment scenario. For example, if there is no or small backhaul delay between the cooperative TRPs, a method using the structure based on MAC layer multiplexing (a CA-like method) similar to 1810 of FIG. 18 is possible. By contrast, if the backhaul delay between the cooperative TRPs is too considerable to ignore (e.g., if information exchange such as CSI, scheduling, HARQ-ACK between the cooperative TRPs requires a time over 2 ms), a method of securing characteristics robust to delay using an independent structure per TRP from the RLC layer (a DC-like method), similar to 1820 of FIG. 18 is possible.

The UE supporting the C-JT/NC-JT may receive C-JT/NC-JT-related parameters or setting values from the higher layer configuration, and accordingly set RRC parameters of the UE. For the higher layer configuration, the UE may utilize a UE capability parameter, for example, tci-StatePDSCH. Herein, the UE capability parameter, for example, tci-StatePDSCH may define the TCI states for the sake of the PDSCH transmission, the number of TCI states may be configured as 4, 8, 16, 32, 64, and 128 in FR1 and as 64 and 128 in FR2, and up to 8 states indicated with 3 bits of the TCI field of the DCI through the MAC CE message may be configured among the configured numbers. The maximum value 128 indicates a value indicated by maxNumberConfiguredTCIstatesPerCC in the parameter tci-StatePDSCH included in UE capability signaling. As such, the series of the configuration procedures from the higher layer configuration to the MAC CE configuration may be applied to beamforming indication or beamforming switching command for at least one PDSCH in one TRP.

Multi-DCI Based Multi-TRP

In an embodiment, a multi-DCI based multi-TRP transmission method is described. The multi-DCI based multi-TRP transmission method may configure a downlink control channel for NC-JT transmission based on multiple PDCCHs.

The NC-JT based on the multiple PDCCHs may have CORESETs or search spaces divided for each TRP, if transmitting DCI for scheduling PDSCHs of the respective TRPs. The CORESET or the search space per TRP may be configured as at least one of the following cases:

Higher layer index configuration per CORESET: CORESET configuration information configured by a higher layer may include an index value, and the TRP transmitting the PDCCH in the corresponding CORESET may be distinguished by the index value configured for each CORESET. That is, a set of CORESETs having the same higher layer index value may be considered that the same TRP transmits the PDCCH or the PDCCH scheduling the PDSCH of the same TRP is transmitted. The index value per CORESET described above may be named as CORESETPoolIndex, and CORESETs configured with the same value CORESETPoolIndex may be regarded as transmitting the PDCCH from the same TRP. The CORESET not configured with the value CORESETPoolIndex may be considered that a default value of CORESETPoolIndex is configured, and the default value may be 0.

If the number of CORESETPoolIndex types of the plurality of the CORESETs included in the higher layer signaling PDCCH-Config exceeds one, that is, if each CORESET has a different CORESETPoolIndex, the UE may consider that the base station may use the multi-DCI based multi-TRP transmission method.

By contrast, if the plurality of the CORESETs included in the higher layer signaling PDCCH-Config each includes one CORESETPoolIndex type, that is, if every CORESET has the same CORESETPoolIndex of 0 or 1, the UE may consider that the base station performs transmission using the single TRP, without using the multi-DCI based multi-TRP transmission method.

Multi-PDCCH-Config configuration: A plurality of PDCCH-Configs may be configured in one BWP, and each PDCCH-Config may include PDCCH configuration per TRP. That is, a CORESET list per TRP and/or a search space list per TRP may be configured in one PDCCH-Config, and one or more CORESETs and one or more search spaces included in one PDCCH-Config may be regarded as corresponding to a specific TRP CORESET beam/beam group configuration: A TRP corresponding to the corresponding CORESET may be distinguished using a beam or a beam group configured per CORESET. For example, if the same TCI state is configured in a plurality of CORESETs, it may be regarded that the corresponding CORESETs are transmitted through the same TRP, or the PDCCH scheduling the PDSCH of the same TRP is transmitted from the corresponding CORESET.

Search space beam/beam group configuration: A beam or a beam group may be configured for each search space, and thus TRPs may be distinguished for the respective search spaces. For example, if the same beam/beam group or TCI state is configured in a plurality of search spaces, it may be considered that the same TRP transmits the PDCCH in the corresponding search space or that the PDCCH scheduling the PDSCH of the same TRP is transmitted in the corresponding search space.

By distinguishing the CORESETs or the search spaces per TRP as described above, PDSCHs and HARQ-ACK information may be classified for each TRP, thus achieving independent HARQ-ACK codebook generation and independent PUCCH resource use per TRP.

The above configuration may be independent for each cell or each BWP. For example, two different CORESETPoolIndex values may be configured in the PCell, whereas the CORESETPoolIndexvalue may not be configured in a specific SCell. In this case, it may be considered that the NC-JT transmission is configured in the PCell, and the NC-JT transmission is not configured in the SCell with the CORESETPoolIndex value not configured.

A PDSCH TCI state activation/deactivation MAC-CE applicable to the multi-DCI based multi-TRP transmission method may follow FIG. 16. If the UE is not configured with CORESETPoolIndex in each of all CORESETs in the higher layer signaling PDCCH-Config, the UE may ignore a CORESET Pool ID field 1655 in a corresponding MAC-CE structure 1650. If the UE may support the multi-DCI based multi-TRP transmission method, that is, if the UE has different CORESETPoolIndex values for the respective CORESETs in the higher layer signaling PDCCH-Config, the UE may activate the TCI state in the DCI included in the PDCCHs transmitted from the CORESETs having the same CORESETPoolIndex value as the CORESET Pool ID field value 1655 of the corresponding MAC-CE structure 1650. For example, if the CORESET Pool ID field value 1655 of the corresponding MAC-CE structure 1650 is 0, the TCI state of the DCI included in the PDCCHs transmitted from the CORESETs having the CORESETPoolIndex value of 0 may follow activation information of the corresponding MAC-CE.

If the UE is configured from the base station to use the multi-DCI based multi-TRP transmission method, that is, if the number of CORESETPoolIndex types of the plurality of the CORESETs included in the higher layer signaling PDCCH-Config exceeds one or if each CORESET has a different CORESETPoolIndex value, the UE may obtain the following restrictions, with respect to PDSCHs scheduled from the PDCCHs in the respective CORESETs having two different CORESETPoolIndex values.

1) If the PDSCHs indicated by the PDCCHs in the respective CORESETs having two different CORESETPoolIndex values entirely or partially overlap, the UE may apply the TCI states indicated by the respective PDCCHs to different code division multiplexing (CDM) groups. That is, two or more TCI states may not be applied to one CDM group.

2) If the PDSCHs indicated by the PDCCHs in the respective CORESETs having two different CORESETPoolIndex values entirely or partially overlap, the UE may expect that the actual number of front loaded DMRS symbols, the actual number of additional DMRS symbols, the actual DMRS symbol positions, and the DMRS types of the PDSCHs are not different from each other.

3) The UE may expect the same BWPs indicated from the PDCCHs of the respective CORESETs having two different CORESETPoolIndex values and the same SCSs.

4) The UE may expect that the respective PDCCHs completely include information of the PDSCHs scheduled from the PDCCHs in the respective CORESETs having two different CORESETPoolIndex values.

Single-DCI Based Multi-TRP

In an embodiment, a single-DCI based multi-TRP transmission method is explained. The single-DCI based multi-TRP transmission method may configure a downlink control channel for NC-JT transmission, based on a single PDCCH.

The single-DCI based multi-TRP transmission method may schedule PDSCHs transmitted by a plurality of TRPs with one DCI. In so doing, the number of TCI states may be used as a method for indicating the number of TRPs transmitting the corresponding PDSCH. That is, if the number of the TCI states indicated in the DCI scheduling the PDSCH is two, it may be regarded as the single-PDCCH based NC-JT transmission, and if the number of the TCI states is one, it may be regarded as the single-TRP transmission. The TCI states indicated in the DCI may correspond to one or two TCI states among the TCI states activated by a MAC-CE. If the TCI states of the DCI correspond to two TCI states activated by the MAC-CE, a corresponding relationship between the TCI codepoint indicated in the DCI and the TCI states activated by the MAC-CE may be established, corresponding to the two TCI states activated by the MAC-CE, which correspond to the TCI codepoint.

As another example, if at least one codepoint of all codepoints of a TCI state field in the DCI indicates two TCI states, the UE may consider that the base station may perform transmission based on the single-DCI based multi-TRP method. In this case, at least one codepoint indicating two TCI states in the TCI state field may be activated through an enhanced PDSCH TCI state activation/deactivation MAC-CE.

Figure 21:
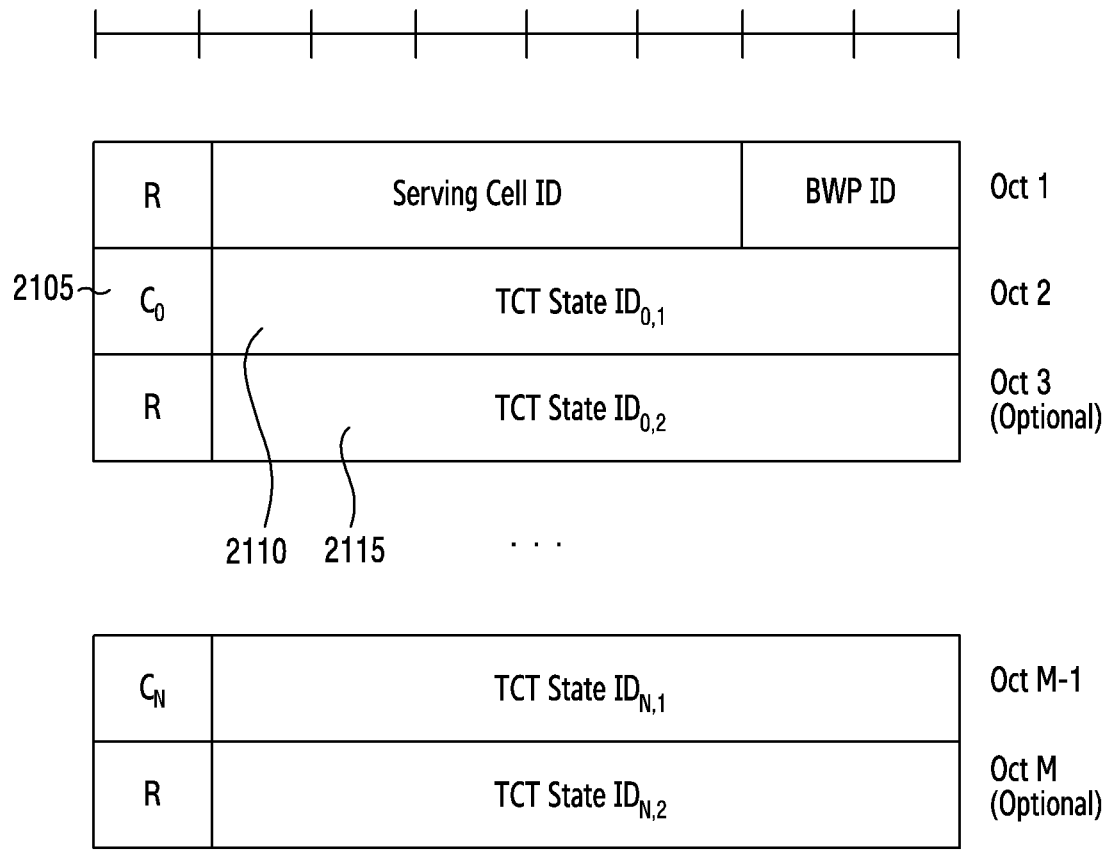
FIG. 21 illustrates an enhanced PDSCH TCI state activation/deactivation MAC-CE structure in a wireless communication system according to an embodiment.

FIG. 21 illustrates an enhanced PDSCH TCI state activation/deactivation MAC-CE structure in a wireless communication system according to an embodiment. Definitions of fields in corresponding MAC CEs and available values for the fields respectively are as follows:

- Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
- BWP ID: This field indicates a DL BWP for which the MAC CE applies as the codepoint of the DCI bandwidth part indicator field as specified in TS 38.212 [9]. The length of the BWP ID field is 2 bits;
- $C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;
- TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{i,2}$ is optional based on the indication of the Ci field. The maximum number of activated TCI codepoint is 8 and the maximum number of TCI states mapped to a TCI codepoint is 2.
R: Reserved bit, set to "0".

In FIG. 21, if a value of a $C_0$ field 2105 is 1, the corresponding MAC-CE may include a TCI state $ID_{0,2}$ field 2115 in addition to a TCI state $ID_{0,1}$ field 2110. This may indicate that TCI state $ID_{0,1}$ and TCI state $ID_{0,2}$ are activated for a 0-th codepoint of the TCI state field included in the DCI. If the base station indicates the corresponding codepoint to the UE, the UE may be indicated with two TCI states. If the value of the $C_0$ field 2105 is 0, the corresponding MAC-CE may not include the TCI state $ID_{0,2}$ field 2115, which indicates that one TCI state corresponding to TCI state $ID_{0,1}$ is activated for the 0-th codepoint of the TCI state field included in the DCI.

The above configuration may be independent for each cell or each BWP. For example, the PCell may include up to two activated TCI states corresponding to one TCI codepoint, whereas a specific SCell may include up to one activated TCI state corresponding to one TCI codepoint. In this case, it may be considered that NC-JT transmission is configured in the PCell, whereas NC-JT transmission is not configured in the SCell described above.

Distinguishing Single-DCI Based Multi-TRP PDSCH Repetitive Transmission Schemes (TDM/FDM/SDM)

Next, a method for distinguishing single-DCI based multi-TRP PDSCH repetitive transmission schemes is described. The UE may be indicated with a different single-DCI based multi-TRP PDSCH repetitive transmission scheme (e.g., time division multiplexing (TDM), FDM, spatial division multiplexing (SDM)), according to the value indicated by the DCI field from the base station and higher layer signaling configuration. Table 40 below shows the method for distinguishing the single- or multi-TRP based schemes indicated to the UE according to a specific DCI field value and the higher layer signaling configuration.

TABLE 40

| Combination | # of TCI state | # of CDM group | repetitionNumber configuration and condition for indication | repetitionScheme configure | transmission scheme indicated to the UE |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 2 | Condition 3 | Configured | Multi-TRP FDM scheme A/FDM scheme B/TDM scheme A |
| 9 | 2 | 2 | Condition 1 | Not configured | Multi-TRP SDM scheme B |

In Table 40, each column may be explained as below.
Number of TCI states (second column): indicates the number of TCI states indicated by the TCI state field of the DCI, and may be 1 or 2.
Number of CDM groups (third column): indicates the number of different CDM groups of DMRS ports indicated by the antenna port field of the DCI. The number of the CDM groups may be 1, 2 or 3.
repetitionNumber configuration and indication condition (fourth column): may have three conditions described below, depending on whether repetitionNumber of every time domain resource allocation (TDRA) entry indicated by a TDRA field of the DCI is configured and whether the actually indicated TDRA entry has repetitionNumber configuration.
  Condition 1: if at least one of the TDRA entries indicated by the TDRA field includes repetitionNumber configuration, and the TDRA entry indicated by the TDRA field of the DCI includes repetitionNumber configuration greater than 1.

Condition 2: if at least one of the TDRA entries indicated by the TDRA field includes repetitionNumber configuration, and the TDRA entry indicated by the TDRA field of the DCI does not include repetitionNumber configuration.

Condition 3: if every TDRA entry indicated by the TDRA field includes repetitionNumber configuration does not include repetitionNumber configuration.

repetitionScheme configuration (fifth column): indicates whether higher layer signaling repetitionScheme is configured. The higher layer signaling repetitionScheme may be configured as one of 'tdmSchemeA', 'fdmSchemeA', or 'fdmSchemeB'.

transmission scheme indicated to the UE (sixth column): indicates the single- or multi-TRP schemes indicated by combinations (first column) represented in Table 40.

single-TRP: indicates the single-TRP based PDSCH transmission. If the UE is configured with pdsch-AggegationFactor of higher layer signaling PDSCH-config, the UE may be scheduled with single-TRP based PDSCH repetitive transmissions corresponding to the configured number of times. Otherwise, the UE may be scheduled with single-TRP based PDSCH single transmission.

single-TRP TDM scheme B: indicates a single-TRP based inter-slot TDRA based PDSCH repetitive transmission. According to the above repetitionNumber related Condition 1, the UE repeatedly transmits the PDSCH on the time domain as many as slots of repetitionNumber count greater than 1 configured in the TDRA entry indicated by the TDRA field. At this time, the same start symbol and symbol length of the TDSCH indicated by the TDRA entry is applied to each slot corresponding to repetitionNumber count, and the same TCI state is applied in each PDSCH repetitive transmission. The corresponding scheme is similar to a slot aggregation scheme in that the inter-slot PDSCH repetitive transmission is conducted on the time resource, but is different from the slot aggregation in that whether to indicate the repetitive transmission may be dynamically determined based on the TDRA field of the DCI.

multi-TRP SDM scheme: indicates a multi-TRP based SDM PDSCH transmission scheme. This is a method for dividing and receiving the layer from each TRP, which is not the repetitive transmission scheme but may increase PDSCH transmission reliability by increasing the number of layers and lowering the coding rate. The UE may receive the PDSCH by applying two TCI states indicated by the TCI state field of the DCI, to two CDM groups respectively indicated from the base station.

multi-TRP FDM scheme A: indicates a multi-TRP based FDM PDSCH transmission scheme, and is a scheme for transmitting with high reliability by increasing frequency resources and lowering the coding rate, which is not the repetitive transmission like the multi-TRP SDM, with one PDSCH transmission occasion. The multi-TRP FDM scheme A may apply two TCI states indicated by the TCI state field of the DCI to frequency resources respectively not overlapping. If a PRB bundling size is determined as wideband and the number of RBs indicated by a frequency domain resource allocation field is N, the UE receives first cell (N/2)-ary RBs by applying the first TCI state, and receives remaining floor(N/2)-ary RBs by applying the second TCI state. Herein, ceil(.) and floor(.) are operators denoting round-up and round-down to one decimal place. If the PRB bundling size is determined to be 2 or 4, even-numbered PRGs are received by applying the first TCI state, and odd-numbered PRGs are received by applying the second TCI state.

multi-TRP FDM scheme B: indicates a multi-TRP based FDM PDSCH repetitive transmission scheme, and has two PDSCH transmission occasions to repeatedly transmit the PDSCH at each occasion. In the same manner as the multi-TRP FDM scheme A, the multi-TRP FDM scheme B may apply two TCI states indicated by the TCI state field of the DCI to frequency resources respectively not overlapping. If the PRB bundling size is determined as the wideband and the number of the RBs indicated by the frequency domain resource allocation field is N, the UE receives first cell (N/2)-ary RBs by applying the first TCI state, and receives remaining floor(N/2)-ary RBs by applying the second TCI state. Herein, ceil(.) and floor(.) are the operators indicating round-up and round-down to one decimal place. If the PRB bundling size is determined to be 2 or 4, even-numbered PRGs are received by applying the first TCI state, and odd-numbered PRGs are received by applying the second TCI state.

multi-TRP TDM scheme A: indicates a multi-TRP based TDM intra-slot PDSCH repetitive transmission scheme. The UE has two PDSCH transmission occasions within one slot, and a first reception occasion may be determined based on the start symbol and the symbol length of the PDSCH indicated by the TDRA field of the DCI. A start symbol of a second reception occasion of the PDSCH may be an occasion applying a symbol offset by higher layer signaling StartingSymbolOffsetK from the last symbol of the first transmission occasion, and thus the transmission occasion may be determined by the indicated symbol length. If the higher layer signaling StartingSymbolOffsetK is not configured, the symbol offset may be regarded as 0.

multi-TRP TDM scheme B: indicates a multi-TRP based TDM inter-slot PDSCH repetitive transmission scheme. The UE has one PDSCH transmission occasion within one slot, and may receive repetitive transmission based on the same start symbol and symbol length of the PDSCH in slots corresponding to repetitionNumber indicated by the TDRA field of the DCI. If repetitionNumber is 2, the UE may receive PDSCH repetitive transmission of first and second slots by applying first and second TCI states respectively. If repetitionNumber is greater than 2, the UE may use a different TCI state application scheme, depending on which high layer signal tciMapping is configured as. If tciMapping is configured as cyclicMapping, the first and second TCI states are applied to the first and second PDSCH transmission occasions respectively, and this TCI state application is identically applied to other PDSCH transmission occasion. If tciMapping is configured as sequenticalMapping, the first TCI state is applied to the first and second PDSCH transmission occasions, the second TCI state is applied to third and fourth PDSCH transmission occasions, and this TCI state application is identically applied to other PDSCH transmission occasion.

RLM RS

Next, a method for selecting or determining a radio link monitoring (RLM) RS if the RLM RS is configured or not configured is described. The UE may be configured from the base station with a set of RLM RSs through RadioLinkMonitoringRS of higher layer signaling RadioLinkMonitoringConfig with respect to each downlink BWP of SpCell and a detailed higher layer signaling structure may follow Table 41 below:

TABLE 41

```
RadioLinkMonitoringConfig : := SEQUENCE {
   failureDetectionResourcesToAddModlist SEQUENCE
(SIZE(1..maxNrofFailureDetectionResources) ) OF RadioLinkMonitoringRS
OPTIONAL, -- Need N
   failureDetectionResourcesToReleaseList SEQUENCE
(SIZE(1..maxNrofFailureDetectionResources) ) OF RadioLinkMonitoringRS-Id
OPTIONAL, -- Need N
   beamFailureInstanceMaxCount ENUMERATED {n1, n2, n3, n4, n5, n6, n8,
n10} OPTIONAL, -- Need R
   beamFailureDetectionTimer ENUMERATED {pbfd1, pbfd2, pbfd3, pbfd4,
pbfd5, pbfd6, pbfd8, pbfd10} OPTIONAL, -- Need R
...
}
RadioLinkMonitoringRS : := SEQUENCE {
   radioLinkMonitoringRS-Id RadioLinkMonitorigRS-Id,
   purpose ENUMERATED {beamFailure, rlf, both},
   detectionResource CHOICE {
      ssb-Index SSB-Index,
      csi-RS-Index NZP-CSI-RS-ResourceId
   },
...
}
```

The following Table 42 may show the number of RLM RS configurations or selections for specific purposes according to the maximum number of SSBs $L_{max}$ per half frame. As shown in the following Table 42. $N_{LR\text{-}RLM}$-ary RSs may be used for link recovery or radio link monitoring according to the value $L_{max}$, and $N_{RLM}$ out of $N_{LR\text{-}RLM}$-ary RSs may be used for the radio link monitoring.

TABLE 41

```
RadioLinkMonitoringConfig ::= SEQUENCE {
   failureDetectionResourcesToAddModList                SEQUENCE
(SIZE(1..maxNrofFailureDetectionResources)) OF RadioLinkMonitoringRS
OPTIONAL, -- Need N
   failureDetectionResourcesToReleaseList               SEQUENCE
(SIZE(1..maxNrofFailureDetectionResources)) OF RadioLinkMonitoringRS-Id
OPTIONAL, -- Need N
   beamFailureInstanceMaxCount ENUMERATED {n1, n2, n3, n4, n5, n6, n8,
n10}                                                    OPTIONAL, -- Need R
   beamFailureDetectionTimer        ENUMERATED {pbfd1, pbfd2, pbfd3, pbfd4,
pbfd5, pbfd6, pbfd8, pbfd10}         OPTIONAL, -- Need R
...
}
RadioLinkMonitoringRS ::= SEQUENCE {
   radioLinkMonitoringRS-Id RadioLinkMonitoringRS-Id,
   purpose            ENUMERATED {beamFailure, rlf, both},
   detectionResource          CHOICE {
      ssb-Index            SSB-Index,
      csi-RS-Index         NZP-CSI-RS-ResourceId
   },
...
}
```

If the UE is not configured with the higher layer signaling RadioLinkMonitornngRS, the UE is configured with the TCI state for receiving the PDCCH in the CORESET and a corresponding TCI state includes at least one CSI-RS, the RLM RS may be selected based on the following RLM RS selection methods:

RLM RS selection Method 1) If the activated TCI state to be used for the PDCCH reception has one reference RS (i.e., if the activated one TCI state has only one of QCL-TypeA, B, or C), the UE may select a reference RS of the activated TCI state to be used for the PDCCH reception as the RLM RS.

RLM RS selection Method 2) If the activated TCI state to be used for the PDCCH reception has two reference RSs (i.e., if the activated one TCI state has one of QCL-TypeA, B, or C and additionally has QCL-TypeD), the UE may select a reference RS of QCL-TypeD as the RLM RS. The UE does not expect to configure two QCL-TypeD in the one activated TCI state.

RLM RS selection Method 3) The UE does not expect to select an aperiodic or semi-persistent RS as the RLM RS.

RLM RS selection Method 4) If $L_{max}=4$, the UE may select $N_{RLM}$-ary RSs (since $L_{max}$ is 4, two may be selected). The RLM RS is selected from the reference RS of the TCI state configured in the CORESET for the PDCCH reception, based on the above RLM RS selection Methods 1, 2 and 3, a short period of the search space connected to the CORESET is determined with a high priority, and the RLM RS is selected from the reference RS of the TCI state configured in the CORESET connected to the search space of the shortest period. If a plurality of CORESETs is connected to a plurality of search spaces having the same periodicity, the RLM RS is selected from a reference RS of a TCI state configured at a high CORESET index.

Figure 22:
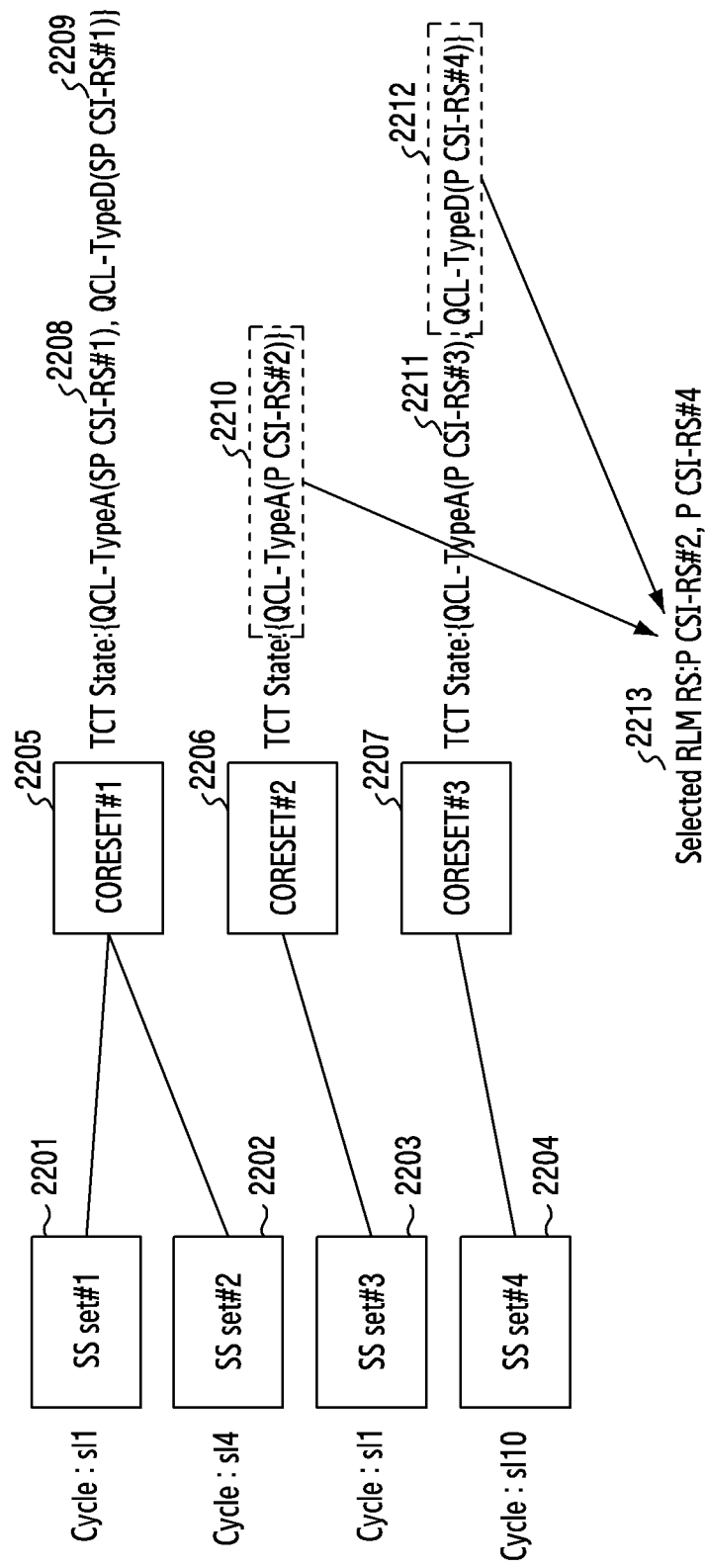
FIG. 22 illustrates radio link monitoring (RLM) reference signal (RS) selection according to an embodiment.

FIG. 22 illustrates RLM RS selection according to an embodiment.

Specifically, FIG. 22 shows a CORESET #1 2205 through a CORESET #3 2207 connected to a search space #1 2201 through a search space #4 2204 having different periods in an activate downlink BWP, and a reference RS of a TCI state configured in each CORESET. Based on the aforementioned RLM RS selection Method 4, the RLM RS selection uses the TCI state configured in the CORESET connected to the search space of the shortest period, but since the periods of the search space #1 2201 and the search space #3 2203 are the same, the reference RS of the TCI state configured in the CORESET #2 having a higher index among the CORESET #1 2205 and the CORESET #2 2206 connected to their search space may be used with the highest priority in the RLM RS selection. In addition, the TCI state configured in the CORESET #2 has only QCL-TypeA, the corresponding reference RS is a periodic RS, and accordingly P CSI-RS #2 2210 may be selected first as the RLM RS according to the RLM RS selection Methods 1 and 3 described above. The reference RS of QCL-TypeD may be a candidate for the selection according to the above RLM RS selection Method 2 among reference RSs of the TCI state configured in the CORESET #1 having the next priority but the corresponding RS, which is a semi-persistent RS 2209, is not selected as the RLM RS according to the above RLM RS selection Method 3. Hence, the reference RSs of the TCI state configured in the CORESET #3 may be considered with a next priority, the reference RS of QCL-TypeD may be a candidate for the selection according to the above RLM RS selection Method 2, and since the corresponding RS is a periodic RS, P CSI-RS #4 2212 may be selected secondly as the RLM RS according to the above RLM RS selection Method 3. Thus, the RLM RSs 2213 finally selected may include P CSI-RS #2 and P CSI-RS #4.

In the following description, for ease of description, the cell, the TRP, the panel, the beam, or/and the transmission direction, and so on which may be distinguished through higher layer/L1 parameters such as TCI state or spatial relation information, or indicators such as a cell ID, a TRP ID, a panel ID may be described as the TRP, the beam, or the TCI state in a unified manner. Accordingly, the TRP, the beam, or the TCI state may be appropriately replaced by one of the above terms in actual application.

Hereafter, the UE may determine whether to apply the cooperative communication using various methods if the PDCCH(s) for allocating a PDSCH to which the cooperative communication is applied has a specific format, if the PDCCH(s) for allocating a PDSCH to which the cooperative communication is applied includes a specific indicator indicating whether the cooperative communication is applied, if the PDCCH(s) for allocating a PDSCH to which the cooperative communication is applied is scrambled with a specific RNTI, or if the cooperative communication application is assumed in a specific interval indicated by a higher layer in the disclosure. Next, receiving at the UE the PDSCH to which the cooperative communication is applied based on the above similar conditions will be referred to as an NC-JT case of ease of description.

Hereafter, in an embodiment, the base station, which is an entity performing the resource allocation of the terminal, may be at least one of a gNode B, a gNB, an eNode B, a Node B, a BS, a radio access unit, a base station controller, or a node on the network. The terminal may include a UE, an MS, a cellular phone, a smartphone, a computer, or a multimedia system for executing a communication function. Although an embodiment is described below based on the 5G system by way of example, the embodiment may also be applied to other communication system having a similar technical background or channel type. For example, LTE or LTE-A mobile communications and mobile communication technology developed after 5G may be included therein. Hence, the embodiments described herein may be applied to other communication system through some modifications without significantly departing from the scope of the disclosure as determined by those skilled in the art. The description of the disclosure may be applied to FDD and TDD systems.

Hereafter, in describing the disclosure, the higher layer signaling may be signaling corresponding to at least one of the following signalings or a combination of one or more of them:
MIB
SIB or SIB X (X=1, 2, . . . )
RRC
MAC CE In addition, the L1 signaling may be signaling corresponding to at least one of the signaling methods using the following physical layer channels or signaling, or a combination of one or more of them:
PDCCH
DCI
UE-specific DCI
Group common DCI
Common DCI
Scheduling DCI (e.g., DCI used for the purpose of scheduling downlink or uplink data)
Non-scheduling DCI (e.g., DCI not for the purpose of scheduling downlink or uplink data)
PUCCH
Uplink control information (UCI)

Hereafter, determining the priority between A and B in the disclosure may be variously mentioned such as selecting one having a higher priority according to a predefined priority rule and performing a corresponding operation or omitting or dropping an operation on one having a lower priority.

The term slot used in the disclosure is a general term for indicating a specific time unit corresponding to the TTI, and specifically may include the slot used in the 5G NR system, and the slot or the subframe used in the 4G LTE system.

Hereafter, the examples are described through a plurality of embodiments in the disclosure but are not independent, and one or more embodiments may be applied simultaneously or in combination.

First Embodiment: Single TCI State Activation and Indication Method Based on a Unified TCI Scheme In an embodiment, the single TCI state indication and activation method based on the unified TCI scheme is described. The unified TCI scheme may indicate a scheme for unifying and managing the transmit and receive beam management scheme divided into the TCI state scheme used in the downlink reception and the spatial relation information used in the uplink transmission of the UE in the existing Rel-15/16, as the TCI state. Hence, if indicated from the base station based on the unified TCI scheme, the UE may perform beam management using the TCI state even for the uplink transmission. If the UE is configured with higher layer signaling TCI-State having higher layer signaling tci-stateId-r17 from the base station, the UE may perform an operation based on the unified TCI scheme using the corresponding TCI-State. TCI-State may include two types of a joint TCI state or a separate TCI state.

The first type is the joint TCI state, and the UE may be indicated from the base station with the TCI state to apply for the uplink transmission and the downlink reception through one TCI-State. If the UE is indicated with TCI-State based on the joint TCI state, the UE may be indicated with a parameter to use for downlink channel estimation using an RS corresponding to qcl-Type1 of the corresponding joint TCI state based TCI-State, and a parameter to use as a downlink receive beam or a receive filter using an RS corresponding to qcl-Type2. If the UE is indicated with TCI-State based on the joint TCI state, the UE may be indicated with a parameter to use as an uplink transmit beam or a transmit filter using the RS corresponding to qcl-Type2 of the corresponding joint DL/UL TCI state based TCI-State. In so doing, if the UE is indicated with the joint TCI state, the UE may apply the same beam to the uplink transmission and the downlink reception.

The second type is the separate TCI state, and the UE may be indicated from the base station individually with a UL TCI state to apply for the uplink transmission and a DL TCI state to apply for the downlink reception. If the UE is indicated with the UL TCI state, the UE may be indicated with a parameter to use as an uplink transmit beam or a transmit filter using a reference RS or a source RS configured in the corresponding UL TCI state. If the UE is indicated with the DL TCI state, the UE may be indicated with a parameter to use for downlink channel estimation using the RS corresponding to qcl-Type1 of the corresponding DL TCI state, and a parameter to use as a downlink receive beam or a receive filter using the RS corresponding to qcl-Type2.

If the UE is indicated with the DL TCI state and the UL TCI state together, the UE may be indicated with the parameter to use as the uplink transmit beam or the transmit filter using the reference RS or the source RS configured in the corresponding UL TCI state. In addition, if the UE is indicated with the DL TCI state and the UL TCI state together, the UE may be indicated with the parameter to use for the downlink channel estimation using the RS corresponding to qcl-Type1 of the corresponding DL TCI state, and the parameter to use as the downlink receive beam or the receive filter using the RS corresponding to qcl-Type2. At this time, if the reference RSs or the source RSs configured in the DL TCI state and the UL TCI state indicated to the UE are different, the UE may individually apply the beam to the uplink transmission and the downlink reception based on the indicated UL TCI state and DL TCI state.

The UE may be configured from the base station with up to 128 joint TCI states for each specific BWP in a specific cell through higher layer signaling. In addition, up to 64 or 128 DL TCI states of the separate TCI state may be configured for each specific BWP in a specific cell through higher layer signaling based on a UE capability report. The DL TCI state of the separate TCI state and the joint TCI state may use the same higher layer signaling structure. For example, if 128 joint TCI states are configured and 64 DL TCI states are configured in the separate TCI state, 64 DL TCI states may be included in 128 joint TCI states.

Up to 32 or 64 UL TCI states of the separate TCI state may be configured for each specific BWP in a specific cell through higher layer signaling based on a UE capability report, the UL TCI state of the separate TCI state and the joint TCI state may use the same higher layer signaling structure, like the relationship of the DL TCI state of the separate TCI state and the joint TCI state, and the UL TCI state of the separate TCI state may use a different higher layer signaling structure from the joint TCI state and the DL TCI state of the separate TCI state. As such, using the different or the same higher layer signaling structure may be defined in the standard, and may be distinguished through yet another higher layer signaling configured by the base station, based on a UE capability report containing information of whether to use one of the two types supported by the UE.

The UE may receive transmit and receive beam related indication in the unified TCI manner using one of the joint TCI state and the separate TCI state configured from the base station. The UE may be configured from the base station whether to use one of the joint TCI state and the separate TCI state through higher layer signaling.

The UE may receive the transmit and receive beam related indication using one scheme selected from the joint TCI state and the separate TCI state through higher layer signaling. In so doing, the transmit and receive beam indication method of the UE from the base station may include two methods of a MAC-CE based indication method and a MAC-CE based activation and DCI based indication method.

If the UE receives the transmit and receive beam related indication using the joint TCI state through the higher layer signaling, the UE may perform a transmit and receive beam application operation by receiving a MAC-CE indicating the joint TCI state from the base station, and the base station may schedule to the UE PDSCH reception including the corresponding MAC-CE over the PDCCH. If the MAC-CE includes one joint TCI state, the UE may determine an uplink transmit beam, a transmit filter and a downlink receive beam, or a receive filter using the joint TCI state indicated from 3 ms after PUCCH transmission including HARQ-ACK information indicating whether the PDSCH including the corresponding MAC-CE is successfully received or not. If the MAC-CE includes two or more joint TCI states, the UE may identify the plurality of the joint TCI states indicated by the MAC-CE corresponding to respective codepoints of the TCI state field of DCI format 1_1 or 1_2 and activate the indicated joint TCI state, from 3 ms after PUCCH transmission including HARQ-ACK information indicating whether the PDSCH including the corresponding MAC-CE is successfully received or not. Next, the UE may receive DCI format 1_1 or 1_2 and apply one joint TCI state indicated by the TCI state field of the corresponding DCI to the uplink transmit and downlink receive beams. In so doing, DCI format 1_1 or 1_2 may include downlink data channel scheduling information (with DL assignment), or may not include the same (without DL assignment).

If the UE receives the transmit and receive beam related indication using the separate TCI state through higher layer signaling, the UE may perform the transmit and receive beam application operation by receiving the MAC-CE indicating the separate TCI state from the base station, and the base station may schedule to the UE PDSCH reception including the corresponding MAC-CE over the PDCCH. If the MAC-CE includes one separate TCI state set, the UE may determine an uplink transmit beam, a transmit filter and a downlink receive beam, or a receive filter using the separate TCI states included in the separate TCI state set indicated from 3 ms after PUCCH transmission including HARQ-ACK information indicating whether the corresponding PDSCH is successfully received or not. At this time, the separate TCI state set may indicate one or more separate TCI states of one codepoint of the TCI state field in DCI format 1_1 or 1_2. In addition, the separate TCI state set may include one DL TCI state, one UL TCI state, or one DL TCI state and one UL TCI state. If the MAC-CE includes two or more separate TCI state sets, the UE may identify the plurality of the separate TCI state sets indicated by the MAC-CE corresponding to respective codepoints of the TCI state field of DCI format 1_1 or 1_2 and activate the indicated separate TCI state set, from 3 ms after PUCCH transmission including HARQ-ACK information indicating whether the corresponding PDSCH is successfully received or not. At this time, each codepoint of the TCI state field of DCI format 1_1 or 1_2 may indicate one DL TCI state, one UL TCI state, or one DL TCI state and one UL TCI state. The UE may receive DCI format 1_1 or 1_2 and apply the separate TCI state set indicated by the TCI state field of the corresponding DCI to the uplink transmit and downlink receive beams. In so doing, DCI format 1_1 or 1_2 may include downlink data channel scheduling information (with DL assignment), or may not include the same (without DL assignment).

The above MAC-CE used to activate or indicate the single joint TCI state and the separate TCI state may exist per joint and separate TCI state scheme, and the TCI state may be activated or indicated based on one of the joint or separate TCI state scheme using one MAC-CE. Various MAC-CE structures for activating and indicating the joint or separate TCI state may be considered, in the drawings to be described.

Figure 23:
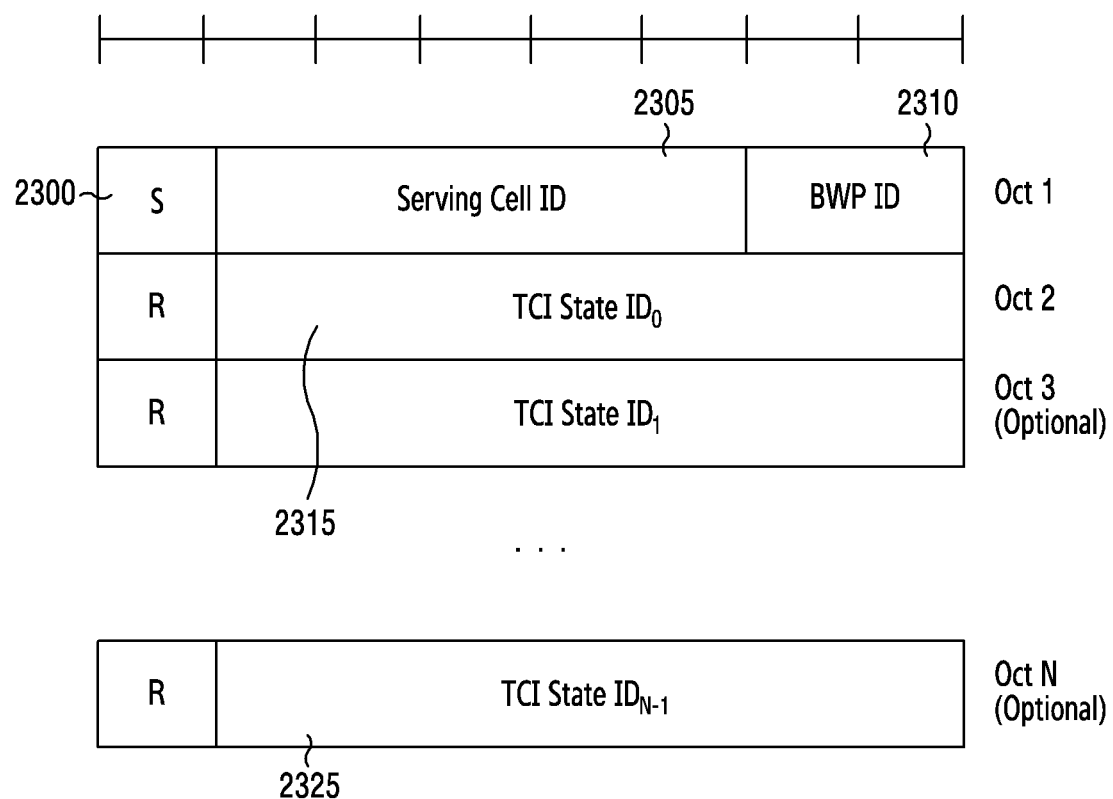
FIG. 23 illustrates a first MAC-CE structure for joint TCI state activation and indication in a wireless communication system according to an embodiment.

FIG. 23 illustrates a first MAC-CE structure for joint TCI state activation and indication in a wireless communication system according to an embodiment.

Referring to FIG. 23, if an S field value 2300 is 1, the corresponding MAC-CE may indicate one joint TCI state, and may have the length only up to a second octet. If the S field value 2300 is 0, the corresponding MAC-CE may include two or more joint TCI state information. If the S field value 2300 is 0, each joint TCI state may be activated at each codepoint of the TCI state field of DCI format 1_1 or 1_2, and up to eight joint TCI states may be activated. The TCI states indicated by a TCI state $ID_0$ field 2315 through a TCI state $ID_{N-1}$ field 2325 may correspond to 0-th through (N−1)-th codepoints respectively of the TCI state field of DCI format 1_1 or 1_2. A serving cell ID field 2305 and a BWP ID field 2310 may indicate a serving cell ID and a BWP ID respectively.

Figure 24:
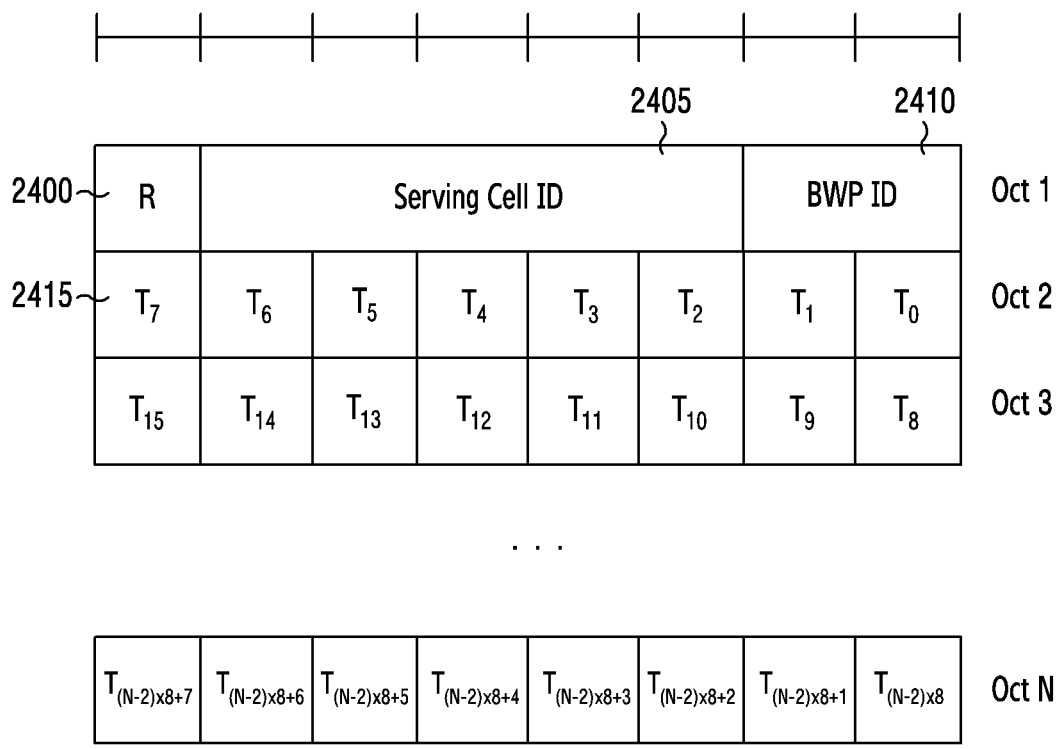
FIG. 24 illustrates a second MAC-CE structure for joint TCI state activation and indication in a wireless communication system according to an embodiment.

FIG. 24 illustrates a second MAC-CE structure for joint TCI state activation and indication in a wireless communication system according to an embodiment.

Referring to FIG. 24, a serving cell ID field 2405 and a BWP ID field 2410 may indicate a serving cell ID and a BWP ID respectively. A R field 2400 may be a 1-bit reserved field without indication information. Each field in second through N-th octets is a bitmap indicating the joint TCI state configured with higher layer signaling. For example, T7 2415 may be a field indicating an eighth joint TCI state configured with the higher layer signaling. If the MAC-CE structure of FIG. 24 delivers one joint TCI state, the UE may apply the joint TCI state indicated by the MAC-CE to its uplink transmit and downlink receive beams. If the MAC-CE structure delivers two or more joint TCI state, the UE may identify that each joint TCI state indicated by the MAC-CE corresponds to each codepoint of the TCI state field of DCI format 1_1 or 1_2, and activate each joint TCI state. In addition, If the MAC-CE structure delivers two or more joint TCI states, the UE may correspond and activate the indicated joint TCI states to the codepoints of the TCI state field in ascending order of index.

Figure 25:
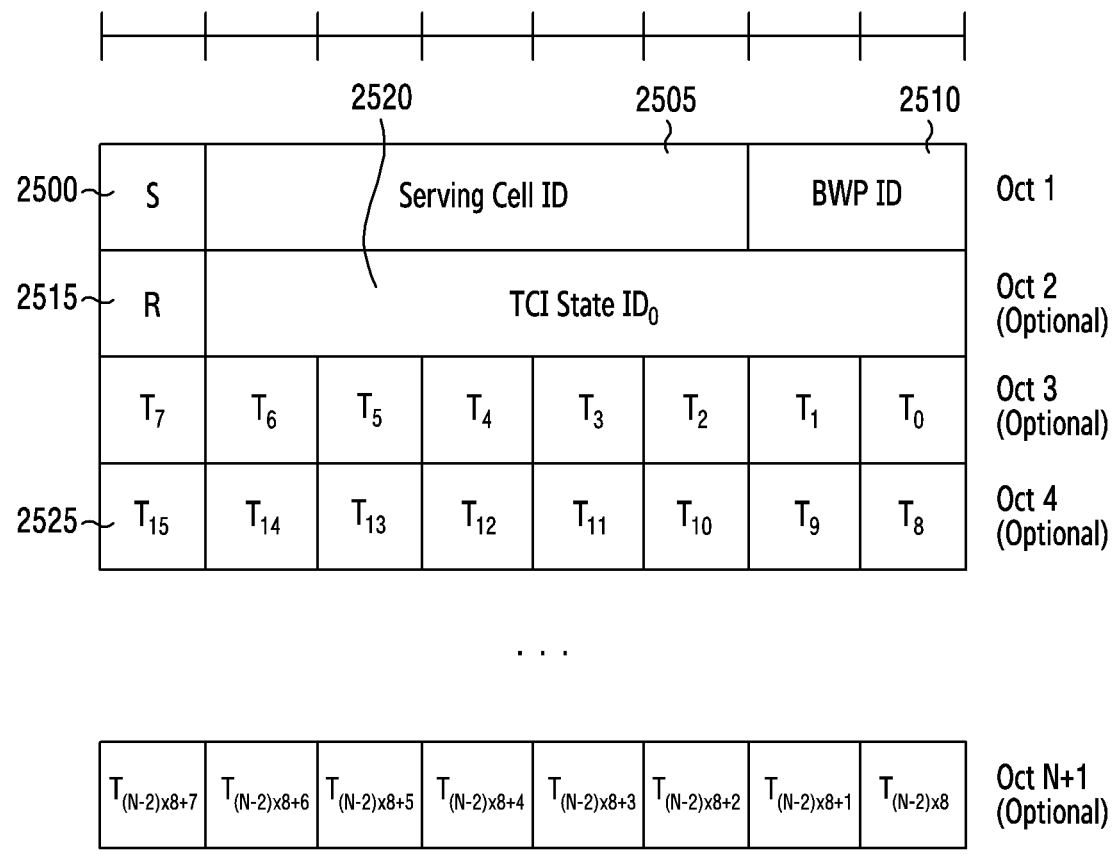
FIG. 25 illustrates a third MAC-CE structure for joint TCI state activation and indication in a wireless communication system according to an embodiment.

FIG. 25 illustrates a third MAC-CE structure for joint TCI state activation and indication in a wireless communication system according to an embodiment.

Referring to FIG. 25, a serving cell ID field 2505 and a BWP ID field 2510 may indicate a serving cell ID and a BWP ID respectively. If an S field value 2500 is 1, the corresponding MAC-CE may indicate one joint TCI state, and may have the length only up to a second octet, and the joint TCI state may be indicated to the UE through a TCI state $ID_0$ field 2520. For example, if the S field value 2500 is 0, the corresponding MAC-CE may include two or more joint TCI state information. In addition, if the S field value 2500 is 0, each joint TCI state may be activated at each codepoint of the TCI state field of DCI format 1_1 or 1_2, and up to eight joint TCI states may be activated. For example, if the S field value 2500 is 0, the second octet does not exist and a first octet and a third octet through an (N+1)-th octet may exist in the MAC-CE structure of FIG. 25. Each field in the third octet through the (N+1)-th octet is a bitmap indicating the joint TCI state configured with higher layer signaling. For example, $T_{15}$ 2525 may be a field indicating whether to indicate a sixteenth joint TCI state configured with the higher layer signaling. If the MAC-CE structure of FIG. 25 delivers one joint TCI state, the UE may apply the joint TCI state indicated by the MAC-CE to its uplink transmit and downlink receive beams. If the MAC-CE structure delivers two or more joint TCI states, the UE may identify that each joint TCI state indicated by the MAC-CE corresponds to each codepoint of the TCI state field of DCI format 1_1 or 1_2, activate each joint TCI state, and correspond and activate the indicated joint TCI states to the codepoints of the TCI state field in ascending order of index.

Figure 26:
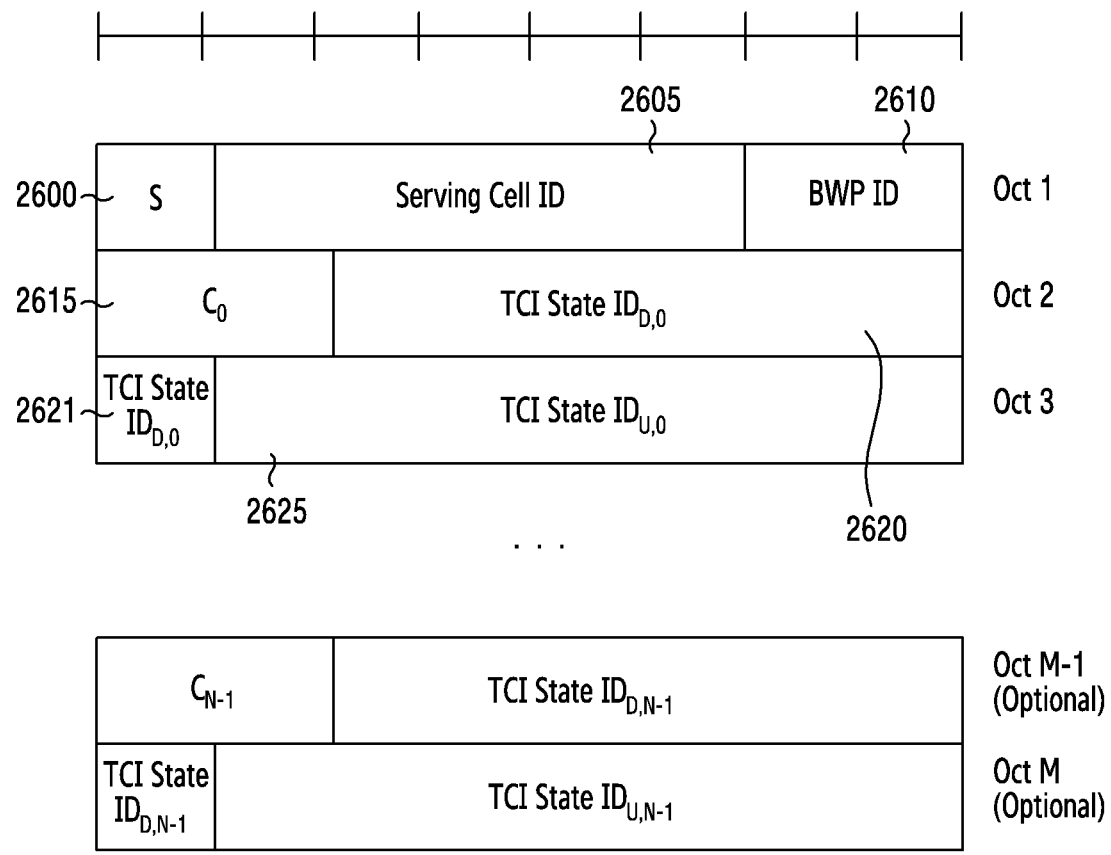
FIG. 26 illustrates a first MAC-CE structure for separate TCI state activation and indication in a wireless communication system according to an embodiment.

FIG. 26 illustrates a first MAC-CE structure for separate TCI state activation and indication in a wireless communication system according to an embodiment.

In FIG. 26, a serving cell ID field 2605 and a BWP ID field 2610 may indicate a serving cell ID and a BWP ID respectively. For example, if an S field value 2600 is 1, the corresponding MAC-CE may indicate one separate TCI state set, and include only up to a third octet.

For example, if the S field value 2600 is 0, the corresponding MAC-CE may include two or more separate TCI state set information, each codepoint of the TCI state field of DCI format 1_1 or 1_2 may activate each separate TCI state set, and up to eight separate TCI state sets may be activated. A $C_0$ field 2615 may be a field indicating which separate TCI states are included in the indicated separate TCI state set. For example, the $C_0$ field value "00" may indicate reserve, "01" may indicate one DL TCI state, "10" may indicate one UL TCI state, and "11" may indicate one DL TCI state and one UL TCI state, but is not limited by these specific values. A TCI state $ID_{D,0}$ field 2620 and a TCI state $ID_{U,0}$ field 2625 may indicate the DL TCI state and the UL TCI state respectively included and indicated in a 0-th separate TCI state set. If the $C_0$ field value is "01", the TCI state $ID_{D,0}$ field 2620 may indicate the DL TCI state and the TCI state $ID_{U,0}$ field 2625 may be ignored. If the $C_0$ field value is "10", the TCI state $ID_{D,0}$ field 2620 may be ignored and the TCI state $ID_{U,0}$ field 2625 may indicate the UL TCI state. If the $C_0$ field value is "11", the TCI state $ID_{D,0}$ field 2620 may indicate the DL TCI state and the TCI state $ID_{U,0}$ field 2625 may indicate the UL TCI state.

FIG. 26 may show an example of the MAC-CE if the UL TCI state of the separate TCI state uses the same higher layer signaling structure as the DL TCI state of the separate TCI state and the joint TCI state. Accordingly, the length of the TCI state $ID_{D,0}$ field 2620 and the TCI state $ID_{U,0}$ field 2625 may be 7 bits for representing up to 128 TCI states. Hence, 6 bits 2620 may be allocated to the second octet and one bit 2621 may be allocated to the third octet to use 7 bits as the TCI state $ID_{D,0}$ field 2620. In addition. FIG. 26 may represent that the UL TCI state of the separate TCI state uses the different higher layer signaling structure from the DL TCI state of the separate TCI state and the joint TCI state. Since the UL TCI state requires 6 bits to represent up to 64 states, a first bit of the TCI state $ID_{U,0}$ field 2625 may be fixed to 0 or 1 and actual bits representing the UL TCI state may correspond to only 6 bits in total from the second bit to the seventh bit.

Figure 27:
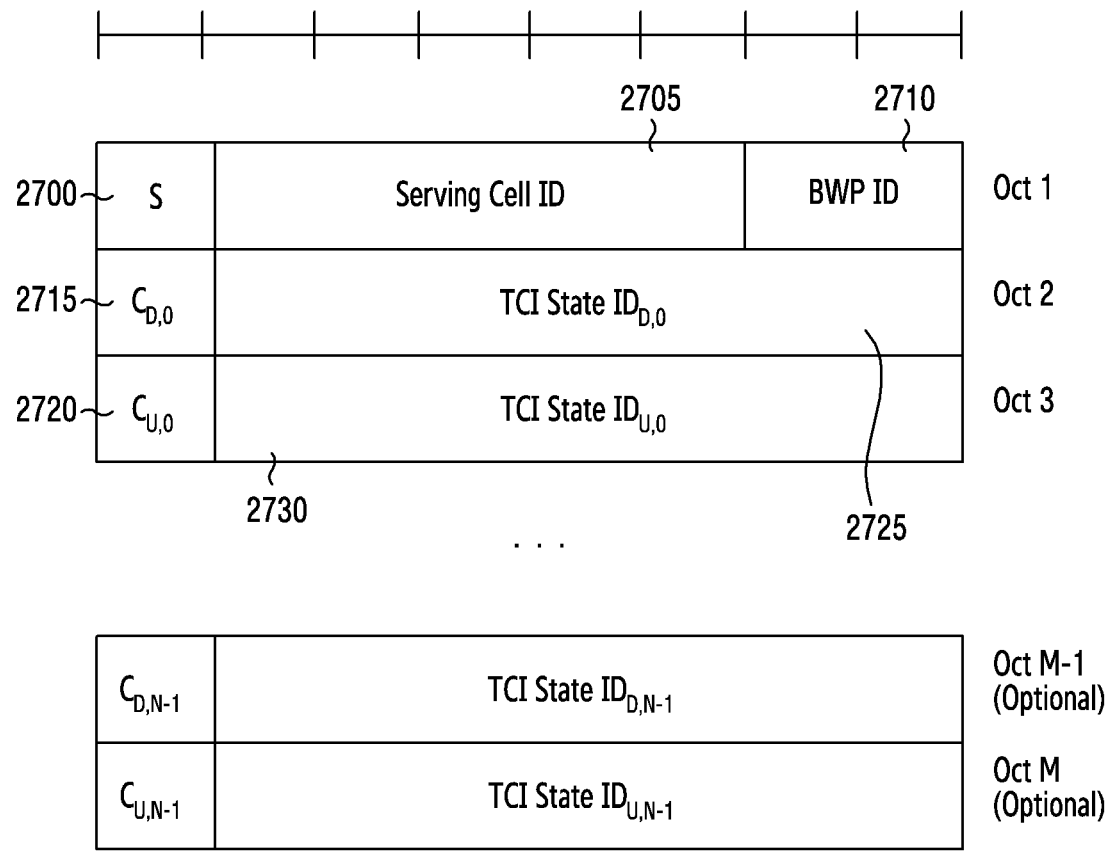
FIG. 27 illustrates a second MAC-CE structure for separate TCI state activation and indication in a wireless communication system according to an embodiment.

FIG. 27 illustrates a second MAC-CE structure for separate TCI state activation and indication in a wireless communication system according to an embodiment.

Referring to FIG. 27, a serving cell ID field 2705 and a BWP ID field 2710 may indicate a serving cell ID and a BWP ID respectively. For example, if an S field value 2700 is 1, the corresponding MAC-CE may indicate one separate TCI state set, and include only up to a third octet. For example, if the S field value 2700 is 0, the corresponding MAC-CE may include two or more separate TCI state set information, each codepoint of the TCI state field of DCI format 1_1 or 1_2 may correspond to each separate TCI state set to activate each separate TCI state set, and up to eight separate TCI state sets may be activated. A $C_{D,0}$ field 2715 may be a field indicating whether the indicated separate TCI state set includes the DL TCI state, and if its value is 0, the DL TCI state may be included and the DL TCI state may be indicated by a TCI state $ID_{D,0}$ field 2725. If the $C_{D,0}$ field value 2715 is 0, the DL TCI state may not be included and the TCI state $ID_{D,0}$ field 2725 may be ignored. Likewise, a $C_{U,0}$ field 2720 may be a field indicating whether the indicated separate TCI state set includes the UL TCI state, and if its value is 1, the UL TCI state may be included and the UL TCI state may be indicated by a TCI state $ID_{U,0}$ field 2730. If the $C_{U,0}$ field value 2720 is 0, the UL TCI state may not be included and the TCI state $ID_{U,0}$ field 2730 may be ignored.

FIG. 27 may show an example of the MAC-CE if the UL TCI state of the separate TCI state uses the same higher layer signaling structure as the DL TCI state of the separate TCI state and the joint TCI state. Accordingly, the length of the TCI state $ID_{D,0}$ field 2725 and the TCI state $ID_{U,0}$ field 2730 may be 7 bits for representing up to 128 TCI states. In addition, FIG. 27 may represent that the UL TCI state of the separate TCI state uses the different higher layer signaling structure from the DL TCI state of the separate TCI state and the joint TCI state. Since the UL TCI state requires 6 bits to represent up to 64 states, a first bit of the TCI state $ID_{U,0}$ field 2730 may be fixed to 0 or 1 and actual bits representing the UL TCI state may correspond to only 6 bits in total from the second bit to the seventh bit.

Figure 28:
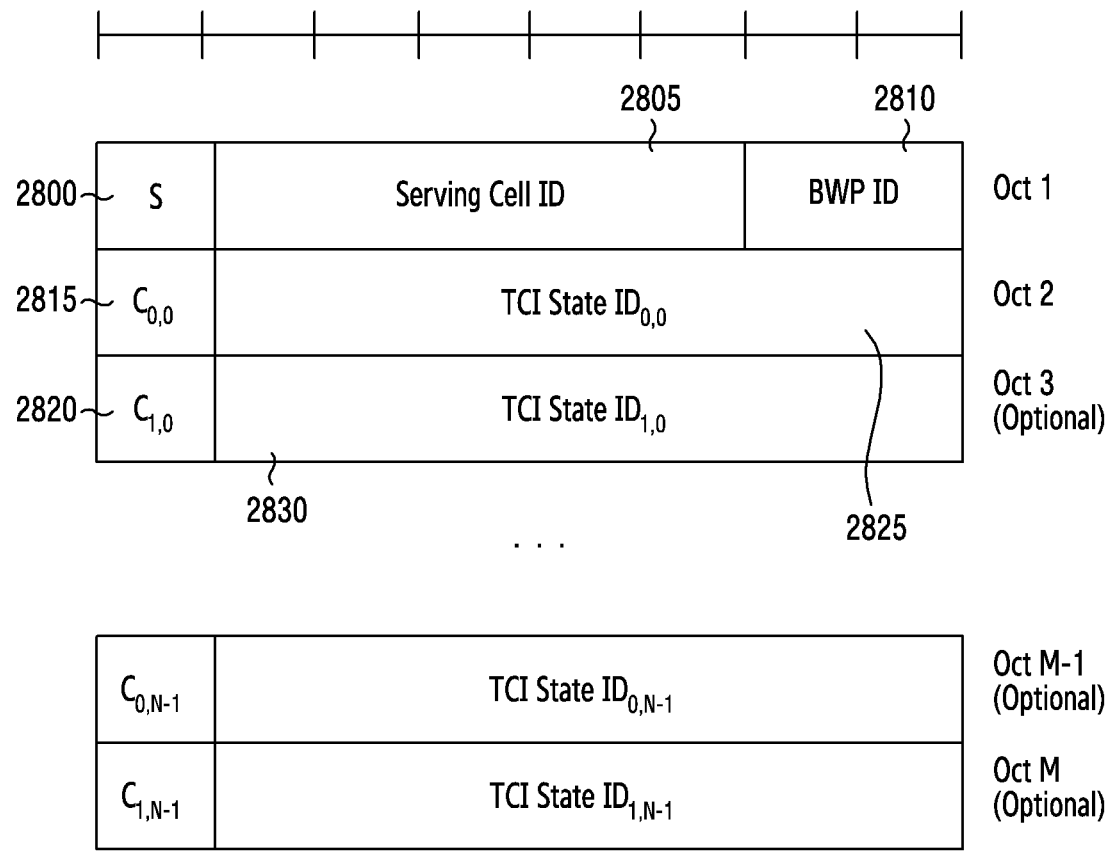
FIG. 28 illustrates a third MAC-CE structure for separate TCI state activation and indication in a wireless communication system according to an embodiment.

FIG. 28 illustrates a third MAC-CE structure for separate TCI state activation and indication in a wireless communication system according to an embodiment.

Referring to FIG. 28, a serving cell ID field 2805 and a BWP ID field 2810 may indicate a serving cell ID and a BWP ID respectively. For example, if a S field value 2800 is 1, the corresponding MAC-CE may indicate one separate TCI state set, and include only up to a third octet. The MAC-CE structure of FIG. 28 may indicate one separate TCI state set using two octets, and if the corresponding separate TCI state set includes the DL TCI state, a first octet of the two octets may always indicate the DL TCI state and a second octet may always indicate the UL TCI state. According to an embodiment, the above sequence may be changed.

For example, if the S field value 2800 is 0, the corresponding MAC-CE may include two or more separate TCI state set information, each codepoint of the TCI state field of DCI format 1_1 or 1_2 may correspond to each separate TCI state set to activate each separate TCI state set, and up to eight separate TCI state sets may be activated. A $C_{0,0}$ field 2815 may identify whether the TCI state indicated by a TCI state $ID_{0,0}$ field 2825 is the DL TCI state or the UL TCI state, and if its value is 1, the TCI state $ID_{0,0}$ field 2825 may indicate the DL TCI state, and a third octet may exist. In this case, if a $C_{1,0}$ field value 2820 is 1, the UL TCI state may be indicated by a TCI state $ID_{1,0}$ field 2830. If the $C_{1,0}$ field value 2820 is 0, the TCI state $ID_{1,0}$ field 2830 may be ignored. If the $C_{0,0}$ field value 2815 is 0, the TCI state $ID_{0,0}$ field 2825 may indicate the UL TCI state and the third octet may not exist. This example is merely an example, and does not limit the disclosure.

FIG. 28 may show the example of the MAC-CE if the UL TCI state of the separate TCI state uses the same higher layer signaling structure as the DL TCI state of the separate TCI state and the joint TCI state. Accordingly, the length of the TCI state $ID_{0,0}$ field 2825 and the TCI state $ID_{1,0}$ field 2830 may be 7 bits for representing up to 128 TCI states. In addition, FIG. 28 may represent that the UL TCI state of the separate TCI state uses the different higher layer signaling structure from the DL TCI state of the separate TCI state and the joint TCI state as mentioned above. Hence, the TCI state $ID_{0,0}$ field 2825 may include 7 bits for representing 6 bits to represent up to 64 UL TCI states and 7 bits to represent up to 128 DL TCI states. If the $C_{0,0}$ field value 2815 is 1 and the TCI state $ID_{0,0}$ field 2825 indicates the UL TCI state, a first bit of the TCI state $ID_{0,0}$ field 2825 may be fixed to 0 or 1 and actual bits representing the UL TCI state may correspond to only 6 bits in total from the second bit to the seventh bit.

Figure 29:
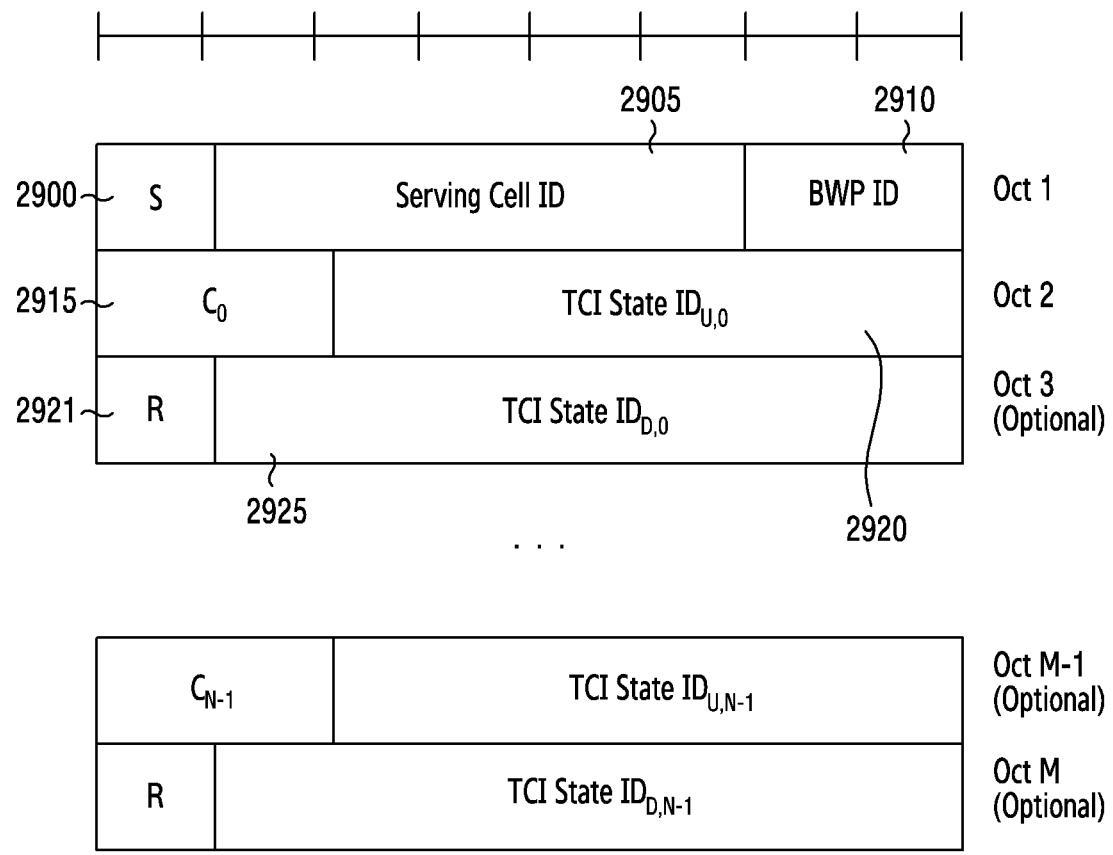
FIG. 29 illustrates a fourth MAC-CE structure for separate TCI state activation and indication in a wireless communication system according to an embodiment.

FIG. 29 illustrates a fourth MAC-CE structure for separate TCI state activation and indication in a wireless communication system according to an embodiment.

In FIG. 29, a serving cell ID field 2905 and a BWP ID field 2910 may indicate a serving cell ID and a BWP ID respectively. For example, if an S field value 2900 is 1, the corresponding MAC-CE may indicate one separate TCI state set, and include only up to a third octet.

For example, if the S field value 2900 is 0, the corresponding MAC-CE may include two or more separate TCI state set information, each codepoint of the TCI state field of DCI format 1_1 or 1_2 may activate each separate TCI state set, and up to eight separate TCI state sets may be activated. A $C_0$ field 2915 may indicate which separate TCI states are included in the indicated separate TCI state set. For example, the $C_0$ field value "00" may indicate reserve, "01" may indicate one DL TCI state, "10" may indicate one UL TCI state, and "11" may indicate one DL TCI state and one UL TCI state, but is not limited by these specific values. A TCI state $ID_{U,0}$ field 2920 and a TCI state $ID_{D,0}$ field 2925 may indicate the UL TCI state and the DL TCI state respectively included and indicated in a 0-th separate TCI state set. If the $C_0$ field value 2915 is "01", the TCI state $ID_{D,0}$ field 2925 may indicate the DL TCI state and the TCI state $ID_{U,0}$ field 2920 may be ignored. If the $C_0$ field value 2915 is "10", the third octet may be ignored and the TCI state $ID_{U,0}$ field 2920 may indicate the UL TCI state. If the $C_0$ field value 2915 is "11", the TCI state $ID_{D,0}$ field 2925 may indicate the DL TCI state and the TCI state $ID_{U,0}$ field 2920 may indicate the UL TCI state.

FIG. 29 may show an example of the MAC-CE used if the UL TCI state of the separate TCI state uses the different higher layer signaling structure from the DL TCI state of the separate TCI state and the joint TCI state. Accordingly, the length of the TCI state $ID_{D,0}$ field 2925 may use 7 bits for representing up to 128 TCI states, and the length of the TCI state $ID_{U,0}$ field 2920 may use 6 bits for representing up to 64 TCI states.

Figure 30:
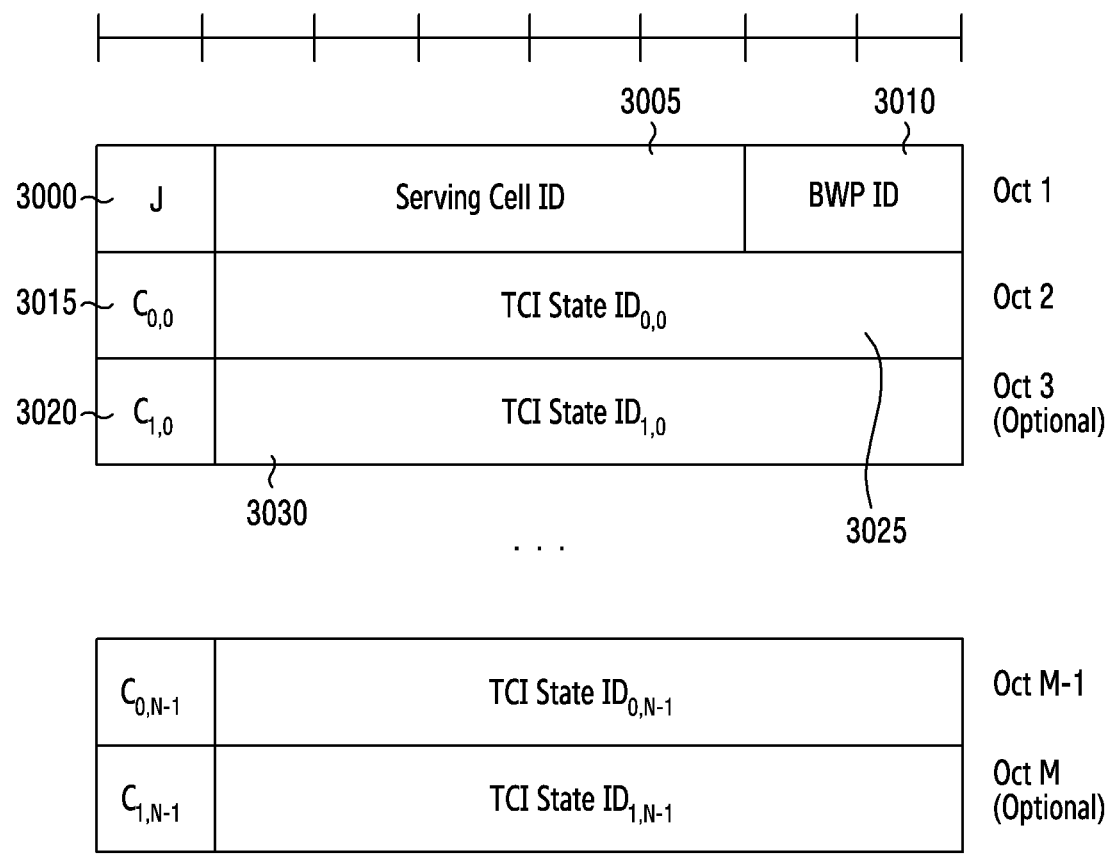
FIG. 30 illustrates a first MAC-CE structure for joint and separate TCI state activation and indication in a wireless communication system according to an embodiment.

FIG. 30 illustrates a first MAC-CE structure for joint and separate TCI state activation and indication in a wireless communication system according to an embodiment.

In FIG. 30, a serving cell ID field 3005 and a BWP ID field 3010 may indicate a serving cell ID and a BWP ID respectively. For example, if a J field value 3000 is 1, the corresponding MAC-CE may indicate the joint TCI state set, and the value 0 may indicate the separate TCI state set.

If the corresponding MAC-CE indicates the joint TCI state set, every odd-numbered octet (third, fifth, . . . ) excluding a first octet may be ignored. A $C_{0,0}$ field 3015 may indicate whether the corresponding MAC-CE indicates one joint TCI state. The $C_{0,0}$ field 3015 may include two or more TCI state information, and indicate whether to activate each TCI state at each codepoint of the TCI state field of DCI format 1_1 or 1_2. If a value of the $C_{0,0}$ field 3015 is 1, the corresponding MAC-CE may indicate one joint TCI state, and octets from the third octet may not exist. If the value is 0, the two or more joint TCI states indicated by the corresponding MAC-CE may correspond to each codepoint of the TCI state field of DCI format 1_1 or 1_2 to be activated. A TCI state $ID_{0,0}$ may indicate a first joint TCI state.

If the corresponding MAC-CE indicates the separate TCI state set, for example, the $C_{0,0}$ field 3015 may identify whether the TCI state indicated by the TCI state $ID_{0,0}$ 3025 is the DL TCI state or the UL TCI state. If its value is 1, the TCI state $ID_{0,0}$ 3025 may indicate the DL TCI state and the third octet may exist. In this case, if a value of a $C_{1,0}$ field 3020 is 1, the UL TCI state may be indicated by a TCI state $ID_{1,0}$ 3030, and if the value of the $C_{1,0}$ field 3020 is 0, the TCI state $ID_{1,0}$ 3030 may be ignored. If the value of the $C_{0,0}$ field 3015 is 0, the UL TCI state may be indicated by the TCI state $ID_{0,0}$ 3025 and the third octet may not exist. FIG. 30 may show an example of the MAC-CE used if the UL TCI state of the separate TCI state uses the same higher layer signaling structure as the DL TCI state of the separate TCI state and the joint TCI state. Accordingly, the length of the TCI state $ID_{0,0}$ field 3025 and the TCI state $ID_{1,0}$ field 3030 may be 7 bits for representing up to 128 TCI states. In addition, FIG. 30 may show an example of the MAC-CE used if the UL TCI state of the separate TCI state uses the different higher layer signaling structure from the DL TCI state of the separate TCI state and the joint TCI state. Hence, the TCI state $ID_{0,0}$ field 3025 may use 7 bits for representing 6 bits to represent up to 64 UL TCI states and 7 bits to represent up to 128 DL TCI states. If the $C_{0,0}$ field value 3015 is 1 and the TCI state $ID_{0,0}$ field 3025 indicates the UL TCI state, the first bit of the TCI state $ID_{0,0}$ field 3025 may be fixed to 0 or 1 and actual bits representing the UL TCI state may correspond to only 6 bits in total from the second bit to the seventh bit.

Figure 31:
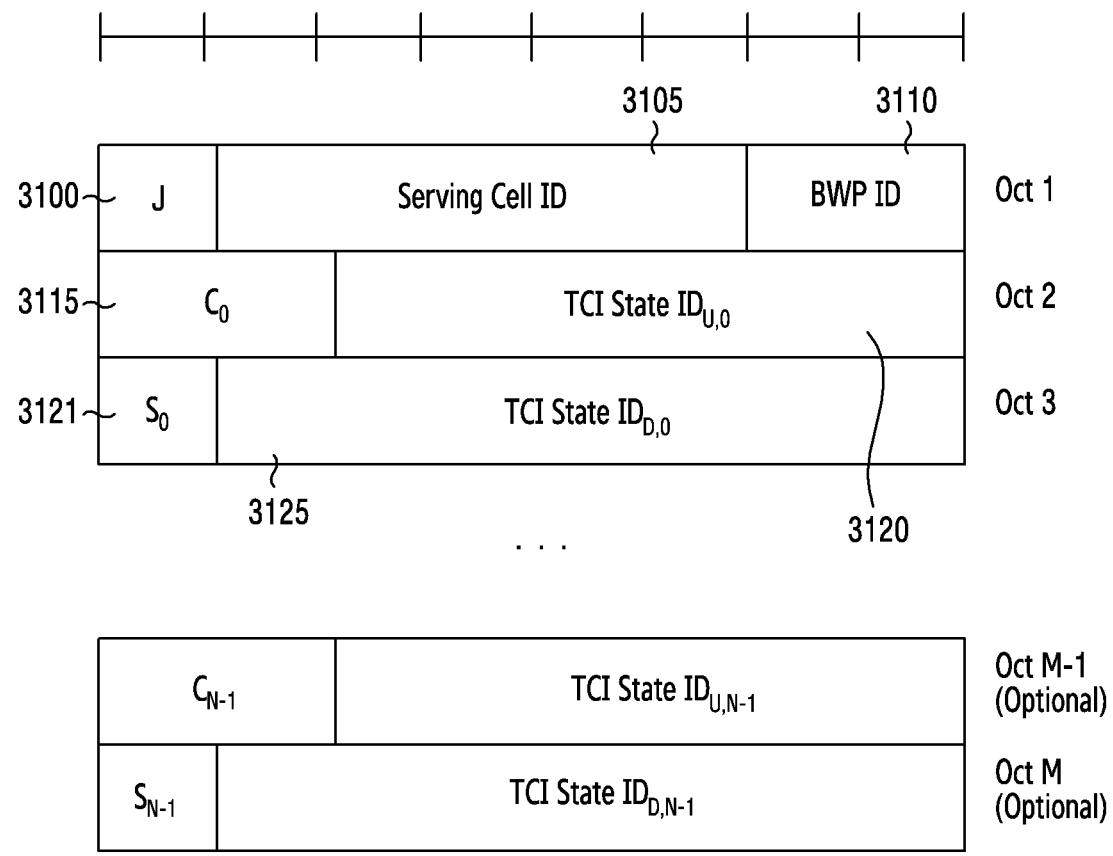
FIG. 31 illustrates a second MAC-CE structure for joint and separate TCI state activation and indication in a wireless communication system according to an embodiment.

FIG. 31 illustrates a second MAC-CE structure for joint and separate TCI state activation and indication in a wireless communication system according to an embodiment.

In FIG. 31, a serving cell ID field 3105 and a BWP ID field 3110 may indicate a serving cell ID and a BWP ID respectively. For example, if a J field value 3100 is 1, the corresponding MAC-CE may indicate the joint TCI state set, and the value 0 may indicate the separate TCI state set.

If the corresponding MAC-CE indicates the joint TCI state set, every even-numbered octet (second, fourth, . . . ) excluding a first octet may be ignored. An S0 field 3121 may indicate whether the corresponding MAC-CE indicates one joint TCI state. The S0 field 3121 may indicate whether to activate two or more TCI states at respective codepoints of the TCI state field of DCI format 1_1 or 1_2. If a value of the S0 field 3121 is 1, the corresponding MAC-CE may indicate one joint TCI state, and may not exist from the third octet. If the value is 0, the corresponding MAC-CE may include two or more joint TCI state information, and activate each joint TCI state at each codepoint of the TCI state field of DCI format 1_1 or 1_2. A TCI state $ID_{D,0}$ may indicate a first joint TCI state.

If the corresponding MAC-CE indicates the separate TCI state set, a $C_0$ field 3115 may be a field indicating which separate TCI states are included in the indicated separate TCI state set. For example, a $C_0$ field value 3115 of "00" may indicate reserve, "01" may indicate one DL TCI state, "10" may indicate one UL TCI state, and "11" may indicate one DL TCI state and one UL TCI state. These values are merely examples and the disclosure is not limited by this example. A TCI state $ID_{U,0}$ field 3120 and a TCI state $ID_{D,0}$ field 3125 may indicate the UL TCI state and the DL TCI state respectively included and indicated in a 0-th separate TCI state set. If the $C_0$ field value 3115 is "01", the TCI state $ID_{D,0}$ field 3125 may indicate the DL TCI state and the TCI state $ID_{U,0}$ field 3120 may be ignored. If the $C_0$ field value 3115 is "10", the TCI state $ID_{U,0}$ field 3120 may indicate the UL TCI state. If the $C_0$ field value 3115 is "11", the TCI state $ID_{D,0}$ field 3125 may indicate the DL TCI state and the TCI state $ID_{U,0}$ field 3120 may indicate the UL TCI state. If the S0 field value 3121 is 1, the corresponding MAC-CE may indicate one separate TCI state, and may not exist from a fourth octet. If the S0 field value 3121 is 0, the corresponding MAC-CE may include two or more separate TCI state set information, activate each separate TCI state set at each codepoint of the TCI state field of DCI format 1_1 or 1_2, and activate up to 8 separate TCI state sets. If the $S_0$ field value 3121 is 0 and a $C_1, \ldots, C_{N-1}$ field value is "10", it may indicate only the UL TCI state and fifth, seventh, . . . , M-th octets may be ignored. Alternatively, the $S_n$ field may indicate whether there exists an octet for a next separate TCI state set. For example, if the $S_n$ field value is 1, the next octet may not exist, and if the Sn field value is 0, the next octet including $C_{n+1}$ and a TCI state $ID_{U,n+1}$ may exist.

FIG. 31 may show an example of the MAC-CE used if the UL TCI state of the separate TCI state uses the different higher layer signaling structure from the DL TCI state of the separate TCI state and the joint TCI state. Accordingly, the length of the TCI state $ID_{D,0}$ field 3125 may use 7 bits for representing up to 128 TCI states, and the length of the TCI state $ID_{U,0}$ field 3120 may use 6 bits for representing up to 64 TCI states.

If the UE receives the transmit and receive beam related indication using the joint TCI state scheme or the separate TCI state scheme through higher layer signaling, the UE may perform transmit and receive beam application by receiving the PDSCH including the MAC-CE indicating the joint TCI state or the separate TCI state from the base station. If the MAC-CE includes two or more joint TCI state or separate TCI state sets, the UE may identify that the plurality of joint TCI state or separate TCI state sets indicated by the MAC-CE corresponds to respective codepoints of the TCI state field of DCI format 1_1 or 1_2, and activate the indicated joint TCI state or separate TCI state sets from 3 ms after PUCCH transmission including HARQ-ACK information indicating whether corresponding PDSCH is successfully received or not. Next, the UE may receive DCI format 1_1 or 1_2 and apply one joint TCI state or separate TCI state set indicated by the TCI state field of the corresponding DCI to the uplink transmit and downlink receive beams. In so doing, DCI format 1_1 or 1_2 may include downlink data channel scheduling information (with DL assignment), or may not include the same (without DL assignment).

Figure 32:
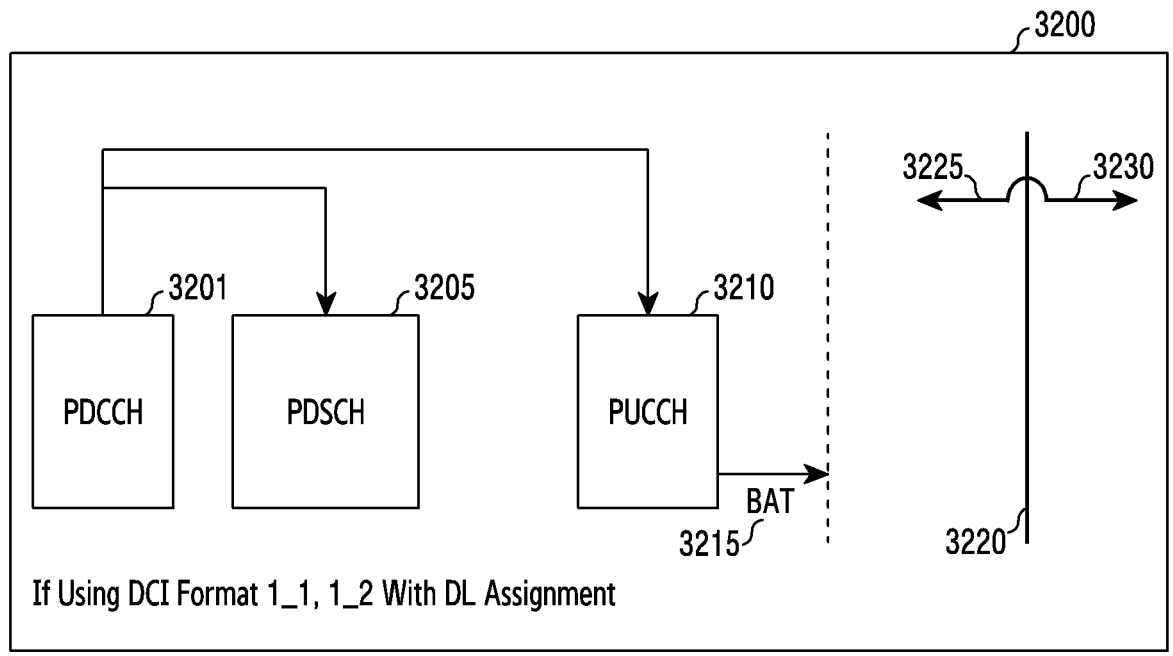
FIG. 32 illustrates a beam application time to consider in using a unified TCI scheme in a wireless communication system according to an embodiment.
Figure 32:
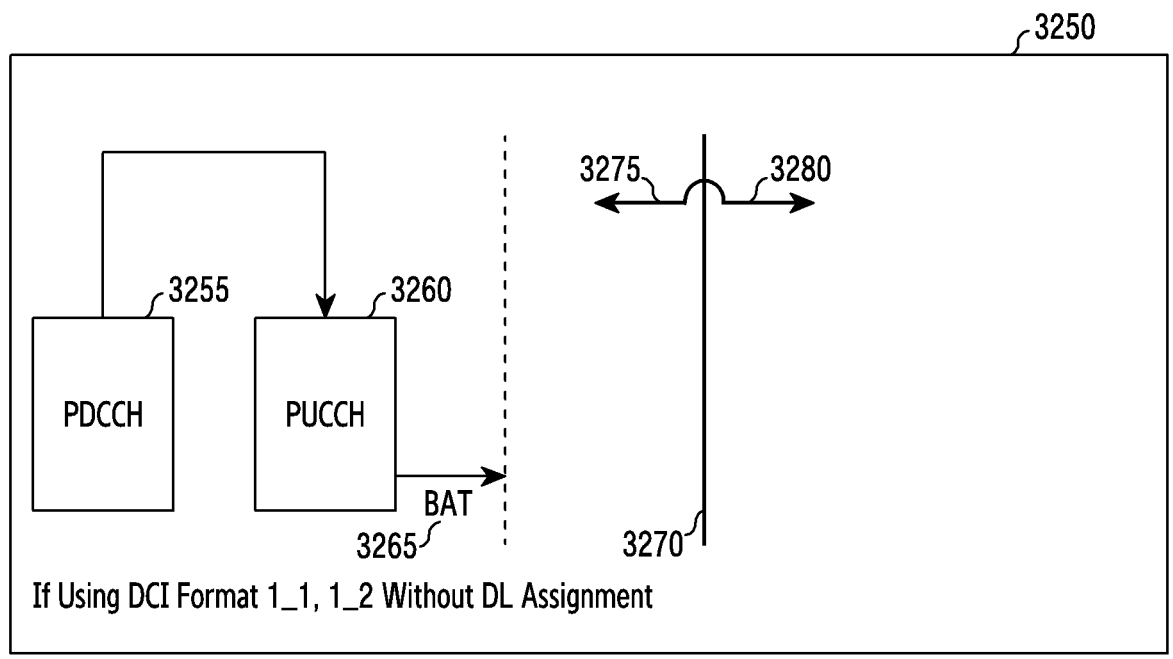

FIG. 32 illustrates a beam application time to consider in using a unified TCI scheme in a wireless communication system according to an embodiment. As mentioned above, with or without the downlink data channel scheduling information (DL assignment) from the base station, the UE may receive DCI format 1_1 or 1_2 and apply one joint TCI state or separate TCI state set indicated by the TCI state field of the corresponding DCI to the uplink transmit and downlink receive beams.

DCI format 1_1 or 1_2 3200 with DL assignment: If the UE receives from the base station DCI format 1_1 or 1_2 (PDCCH) 3201 including the downlink data channel scheduling information to indicate one joint TCI state or separate TCI state set based on the unified TCI scheme, the UE may receive a PDSCH 3205 scheduled based on the received DCI, and transmit a PUCCH 3210 including HARQ-ACK indicating reception success or failure of the DCI and the PDSCH. At this time, the HARQ-ACK may include success or failure of the DCI and the PDSCH both, the UE may transmit negative ACK (NACK) if not receiving at least one of the DCI and the PDSCH, and the UE may transmit ACK if successfully receiving both the DCI and the PDSCH.

DCI format 1_1 or 1_2 3250 without the DL assignment: If the UE receives from the base station DCI format 1_1 or 1_2 (PDCCH) 3255 not including the downlink data channel scheduling information to indicate one joint TCI state or separate TCI state set based on the unified TCI scheme, the UE may assume the following for the corresponding DCI:

including CRC scrambled with CS-RNTI
every bit value allocated to fields used as redundancy version (RV) fields is 1.
every bit value allocated to fields used as MCS fields is 1.
every bit value allocated to fields used as new data indication (NDI) fields is 1.
every bit value allocated to an FDRA field is 0 for FDRA type 0, every bit value allocated to the FDRA field is 1 for FDRA type 1, and every bit value allocated to the FDRA field is 0 for FDRA scheme dynamicSwitch.

The UE may transmit a PUCCH 3260 including the HARQ-ACK indicating reception success or failure of DCI format 1_1 or 1_2 for which the above details are assumed.

With respect to DCI format 1_1 or 1_2 with the DL assignment 3200 and without the DL assignment 3250, if a new TCI state indicated by the DCI 3201 and the 3255 is already indicated and identical to the TCI state applied to the uplink transmit and downlink receive beams, the UE may maintain the existing TCI state. If the new TCI state is different from the existing TCI state, the UE may determine an application time 3230 and 3280 of the joint TCI state or separate TCI state set indicated from the TCI state field of the DCI after an initial slot 3220 and 3270 after a time corresponding to a beam application time (BAT) 3215 and 3265 after the PUCCH transmission, and may use the existing TCI state 3225 and 3275 until the corresponding slot 3220 and 3270.

With respect to DCI format 1_1 or 1_2 with the DL assignment 3200 and without the DL assignment 3250, the BAT may be configured with higher layer signaling based on UE capability report information using a specific number of OFDM symbols. Numerology of the BAT and the first slot after the BAT may be determined based on the smallest numerology among all the cells applying the joint TCI state or separate TCI state set indicated by the DCI.

The UE may apply one joint TCI state indicated by the MAC-CE or the DCI in receiving CORESETs connected to every UE-specific search space, receiving the PDSCH scheduled with the PDSCCH transmitted from the corresponding CORESET and transmitting the PUSCH, and transmitting every PUCCH resource.

If one separate TCI state set indicated by the MAC-CE or the DCI includes one DL TCI state, the UE may apply the one separate TCI state set in receiving CORESETs connected to every UE-specific search space, and receiving the PDSCH scheduled with the PDCCH transmitted from the corresponding CORESET, and apply to every PUSCH and PUCCH resource based on the existing UL TCI state indicated.

If one separate TCI state set indicated by the MAC-CE or the DCI includes one UL TCI state, the UE may apply it to every PUSCH and PUCCH resource, and apply based on the existing DL TCI state in receiving CORESETs connected to every UE-specific search space, and receiving the PDSCH scheduled with the PDCCH transmitted from the corresponding CORESET.

If one separate TCI state set indicated by the MAC-CE or the DCI includes one DL TCI state and one UL TCI state, the UE may apply the DL TCI state to receiving CORESETs connected to every UE-specific search space, and receiving the PDSCH scheduled with the PDCCH transmitted from the corresponding CORESET, and apply the UL TCI state to every PUSCH and PUCCH resource.

According to an embodiment, the examples of the MAC CE of FIG. 23 through FIG. 31 may combine at least one of their components.

Second Embodiment: Multi-TCI State Indication and Activation Method Based on the Unified TCI Scheme In an embodiment, the multi-TCI state indication and activation method based on the unified TCI scheme is described. The multi-TCI state indication and activation method may indicate expanding the number of indicated joint TCI states to two or more, and expanding DL TCI states and UL TCI states included in one separate TCI state set to up to two or more. If one separate TCI state set may include up to two DL TCI states and two UL TCI states, the one separate TCI state set may have eight combinations in total of the DL TCI state and the UL TCI state (e.g., (DL, UL)={0,1}, {0,2}, {1,0}, {1,1}, {1,2}, {2,0}, {2,1}, {2,2}, wherein the number denotes the number of the TCI states).

If the UE is indicated with the multi-TCI state from the base station based on a MAC-CE, the UE may receive from the base station two or more joint TCI states or one separate TCI state set through the corresponding MAC-CE. The base station may schedule the UE to receive a PDSCH including the corresponding MAC-CE through the PDCCH. The UE may determine the uplink transmit beam or transmit filter and the downlink receive beam or receive filter based on the two or more joint TCI states or one separate TCI state set, indicated from 3 ms after PUCCH transmission including HARQ-ACK information indicating whether the PDSCH including the corresponding MAC-CE is successfully received or not.

If the UE is indicated with the multi-TCI state from the base station based on DCI format 1_1 or 1_2, each codepoint of one TCI state field of the corresponding DCI format 1_1 or 1_2 may indicate two or more joint TCI states or two or more separate TCI state sets. At this time, the UE may receive a MAC-CE from the base station and activate two or more joint TCI states or two or more separate TCI state sets corresponding to each codepoint of one TCI state field of the corresponding DCI format 1_1 or 1_2. The base station may schedule the UE to receive a PDSCH including the corresponding MAC-CE through the PDCCH. The UE may activate TCI state information included in the MAC-CE from 3 ms after PUCCH transmission including HARQ-ACK information indicating whether the PDSCH including the corresponding MAC-CE is successfully received or not.

If the UE is indicated with the multi-TCI state from the base station based on DCI format 1_1 or 1_2, the corresponding DCI format 1_1 or 1_2 may include two or more TCI state fields, and one of two or more joint TCI states or two or more separate TCI state sets may be indicated based on each TCI state field. At this time, the UE may receive a MAC-CE from the base station and activate two or more joint TCI states or separate TCI state sets corresponding to each codepoint of TCI state fields of the corresponding DCI format 1_1 or 1_2. The base station may schedule the UE to receive a PDSCH including the corresponding MAC-CE through the PDCCH. The UE may activate TCI state information included in the MAC-CE from 3 ms after PUCCH transmission including HARQ-ACK information indicating whether the PDSCH including the corresponding MAC-CE is successfully received or not. The UE may be configured with presence or absence of one or more additional TCI state fields through higher layer signaling, a bitwidth of the additional TCI state field may be equal to the existing TCI state field, and its length may be adjusted based on higher layer signaling.

The UE may receive transmit and receive beam related indication in the unified TCI manner using one of the joint TCI state and the separate TCI state configured from the base station. The UE may be configured with using one of the joint TCI state and the separate TCI state from the base station through higher layer signaling. With respect to the separate TCI state indication, the UE may be configured through higher layer signaling to make the bitwidth of the TCI state field of DCI format 1_1 or 1_2 to be up to 4.

The MAC-CE used to activate or indicate the multiple joint TCI states and separate TCI state states may individually exist for each joint and separate TCI state scheme. In addition, the MAC-CE used to activate or indicate the multiple joint TCI states and separate TCI state states may activate or indicate the TCI state based on one of the joint or separate TCI state schemes using one MAC-CE. Also, the MAC-CE used to activate or indicate the multiple joint TCI states and separate TCI state states may share one MAC-CE structure used in the MAC-CE based indication scheme and the MAC-CE based activation scheme, and may use individual MAC-CE structures. In the drawings to be described, various MAC-CE structures may be considered to activate and indicate multiple joint or separate TCI state states. The drawings to be described consider activating or indicating two TCI states for ease of understanding, but may be applied to three or more TCI states in a similar manner.

Figure 33:
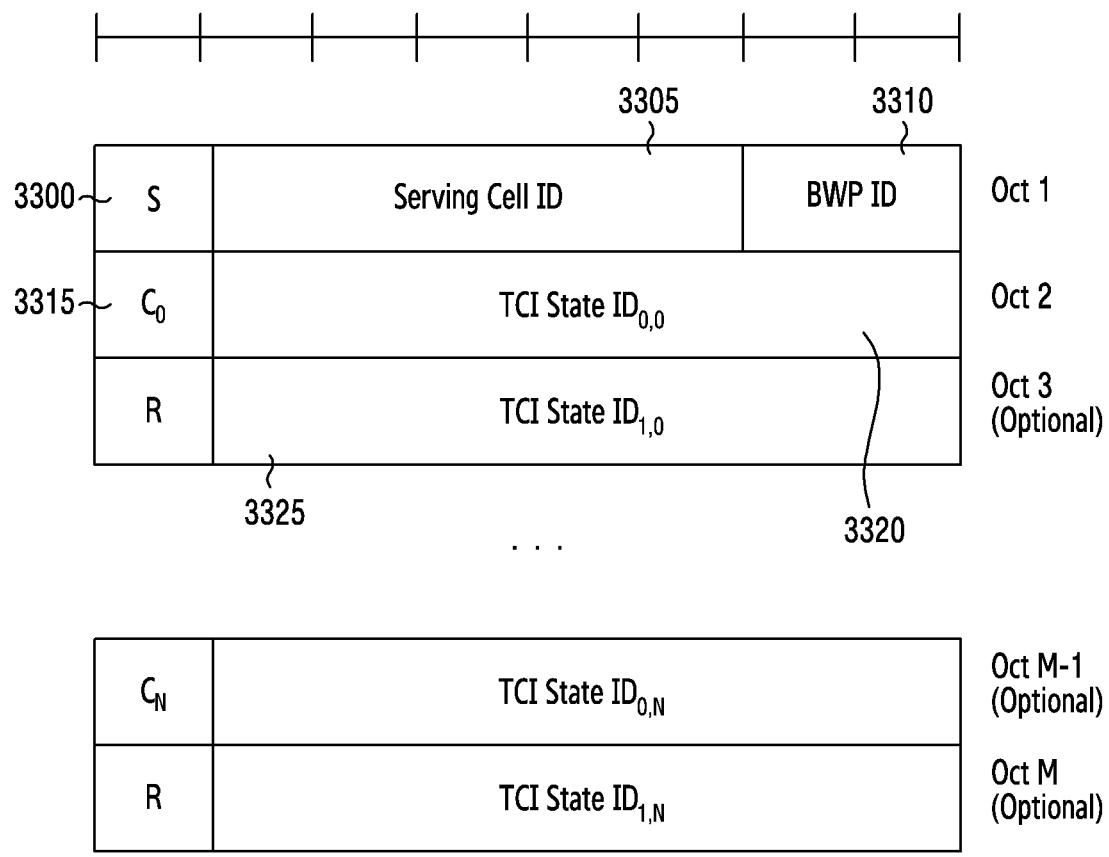
FIG. 33 illustrates a first MAC-CE structure for activating and indicating a plurality of joint TCI states in a wireless communication system according to an embodiment.

FIG. 33 illustrates a first MAC-CE structure for multi-joint TCI state activation and indication in a wireless communication system according to an embodiment.

Referring to FIG. 33, a serving cell ID field 3305 and a BWP ID field 3310 may indicate a serving cell ID and a BWP ID respectively. For example, if an S field value 3300 is 1, a corresponding MAC-CE may indicate one or two separate TCI states, and have a length only up to a third octet. For example, if a $C_0$ field value 3315 is 0, the third octet does not exist and one joint TCI state may be indicated through a TCI state $ID_{0,0}$ field 3320. If the $C_0$ field value 3315 is 1, the third octet exists and two joint TCI states may be indicated by the TCI state $ID_{0,0}$ field 3320 and a TCI state $ID_{1,0}$ field 3325.

For example, if the S field value 3300 is 0, the corresponding MAC-CE may activate one or two joint TCI states corresponding to respective codepoints of the TCI state field of DCI format 1_1 or 1_2. If the S field value 3300 is 0, one joint TCI state corresponding to each codepoint of two TCI state fields of DCI format 1_1 or 1_2 may be activated, and joint TCI states for up to 8 codepoints may be activated. If activating one or two joint TCI states for one codepoint of one TCI state field, a TCI state $ID_{0,Y}$ field and a TCI state $ID_{1,Y}$ field may indicate first and second joint TCI states of the two joint TCI states activated at a Y-th codepoint of the TCI state field. If activating one joint TCI state for one codepoint of two TCI state fields, the TCI state $ID_{0,Y}$ field and the TCI state $ID_{1,Y}$ field may indicate each joint TCI state activated at the Y-th codepoint of the first and second TCI state fields.

Figure 34:
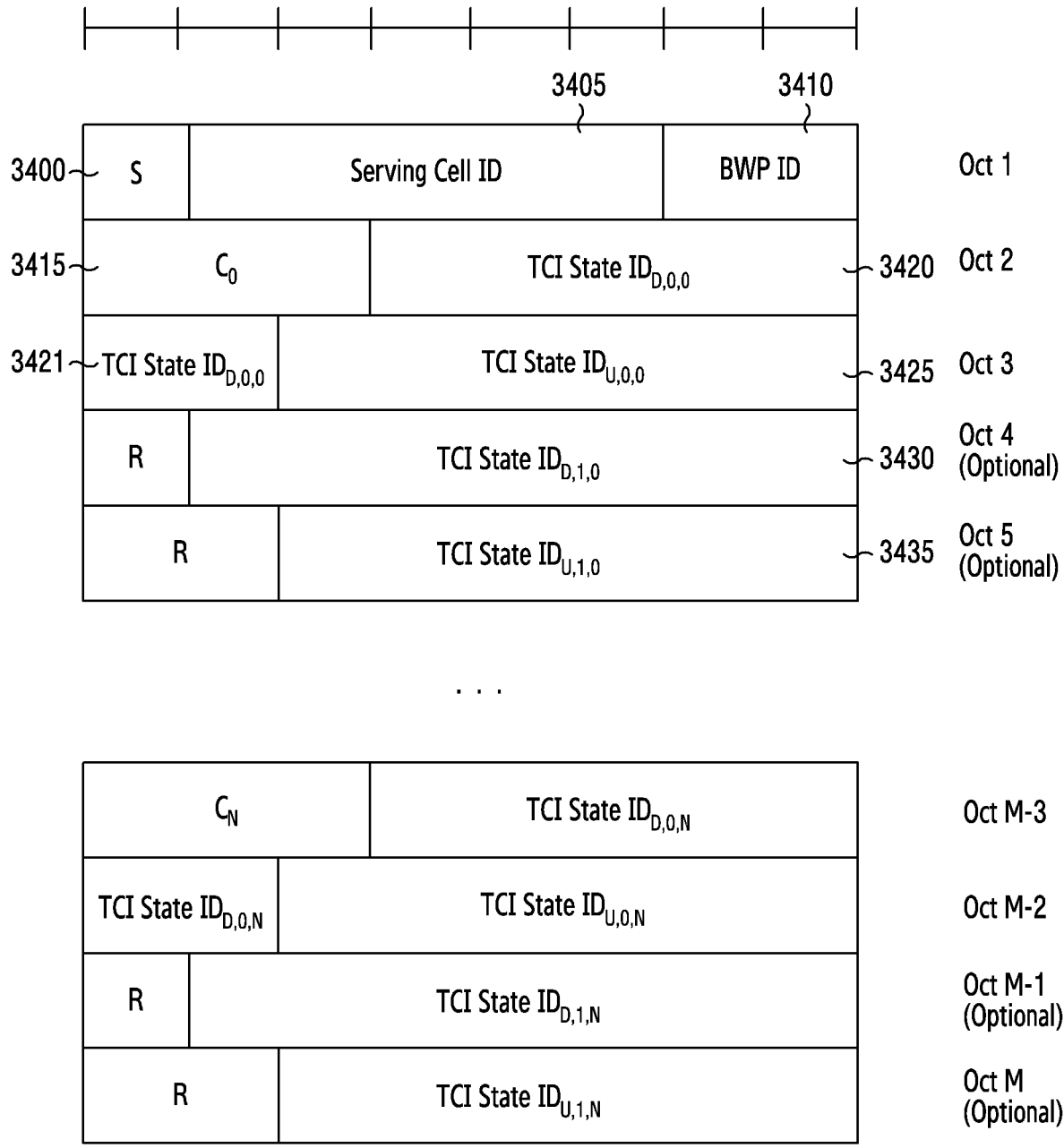
FIG. 34 illustrates a second MAC-CE structure for activating and indicating a plurality of separate TCI states in a wireless communication system according to an embodiment.

FIG. 34 illustrates a second MAC-CE structure for multi-separate TCI state activation and indication in a wireless communication system according to an embodiment.

Referring to FIG. 34, a serving cell ID field 3405 and a BWP ID field 3410 may indicate a serving cell ID and a BWP ID respectively. For example, if an S field value 3400 is 1, a corresponding MAC-CE may indicate one separate TCI state set, and include only up to a fifth octet. If the S field value 3400 is 0, the corresponding MAC-CE may include information of multiple separate TCI state sets, and activate one separate TCI state set corresponding to each codepoint of the TCI state field of DCI format 1_1 or 1_2 or one separate TCI state set corresponding to each codepoint of two TCI state fields of DCI format 1_1 or 1_2. If the S field value 3400 is 0, the separate TCI state for up to 8 or 16 codepoints may be activated by higher layer signaling as mentioned above.

The MAC-CE structure of FIG. 34 may correspond to one separate TCI state set every four octets from the second octet. For example, a $C_0$ field 3415 may have eight values in total from "000" to "111", corresponding to eight cases of one separate TCI state set as described above.

If the $C_0$ field has the value "000", one separate TCI state set may indicate including one UL TCI state, TCI state $ID_{D,0,0}$ fields 3420 and 3421 may be ignored, and a TCI state $ID_{U,0,0}$ field 3425 may include one UL TCI state information. The fourth and fifth octets may be ignored.

If the $C_0$ field has the value "001", one separate TCI state set may indicate including two UL TCI states. The TCI state $ID_{D,0,0}$ fields 3420 and 3421 may be ignored. The TCI state $ID_{U,0,0}$ field 3425 may include first UL TCI state information of the two UL TCI states. The fourth octet may be ignored, and a TCI state $ID_{U,1,0}$ field 3435 may include second UL TCI state information of the two UL TCI states.

If the $C_0$ field has the value "010", one separate TCI state set may indicate including one DL TCI state. The TCI state $ID_{D,0,0}$ fields 3420 and 3421 may include one DL TCI state information, and the TCI state $ID_{U,0,0}$ field 3425 and the fourth and fifth octets may be ignored.

If the $C_0$ field has the value "011", one separate TCI state set may indicate including one DL TCI state and one UL TCI state. The TCI state $ID_{D,0,0}$ fields 3420 and 3421 may include one DL TCI state information. The TCI state $ID_{U,0,0}$ field 3425 may include one UL TCI state information. The fourth and fifth octets may be ignored.

If the $C_0$ field has the value "100", one separate TCI state set may indicate including one DL TCI state and two UL TCI states. The TCI state $ID_{D,0,0}$ fields 3420 and 3421 may include one DL TCI state information. The TCI state $ID_{U,0,0}$ field 3425 may include first UL TCI state information of the two UL TCI states. The fourth octet may be ignored, and the TCI state $ID_{U,1,0}$ field 3435 may include second UL TCI state information of the two UL TCI states.

If the $C_0$ field has the value "101", one separate TCI state set may indicate including two DL TCI states. The TCI state $ID_{D,0,0}$ fields 3420 and 3421 may include first DL TCI state information of the two DL TCI states. The TCI state $ID_{U,0,0}$ field 3425 and the fifth octet may be ignored. The TCI state $ID_{U,1,0}$ field 3435 may include second DL TCI state information of the two DL TCI states.

If the $C_0$ field has the value "110", one separate TCI state set may indicate including two DL TCI states and one UL TCI state. The TCI state $ID_{D,0,0}$ fields 3420 and 3421 may include first DL TCI state information of the two DL TCI states. The TCI state $ID_{U,0,0}$ field 3425 may include one UL TCI state information. A TCI state $ID_{D,1,0}$ field 3430 may include second DL TCI state information of the two DL TCI states, and the fifth octet may be ignored.

If the $C_0$ field has the value "111", one separate TCI state set may indicate including two DL TCI states and two UL TCI states. The TCI state $ID_{D,0,0}$ fields 3420 and 3421 may include first DL TCI state information of the two DL TCI states. The TCI state $ID_{U,0,0}$ field 3425 may include first UL TCI state information of the two UL TCI states. The TCI state $ID_{D,1,0}$ field 3430 may include second DL TCI state information of the two DL TCI states. The TCI state $ID_{U,1,0}$ field 3435 may include second UL TCI state information of the two UL TCI states.

FIG. 34 shows the second MAC-CE structure for multi-separate TCI state activation and indication in the wireless communication system according to an embodiment. Specifically, the UL TCI state of the separate TCI state uses the different higher layer signaling structure from the DL TCI state of the separate TCI state and the joint TCI state as described above. Since the UL TCI state requires 6 bits to represent up to 64 states, the TCI state $ID_{D,0,0}$ through TCI state $ID_{D,1,N}$ fields indicating the DL TCI states may be represented with 7 bits, whereas the TCI state $ID_{U,0,0}$ through TCI state $ID_{U,1,N}$ fields indicating the UL TCI states may be represented with 6 bits.

Figure 35:
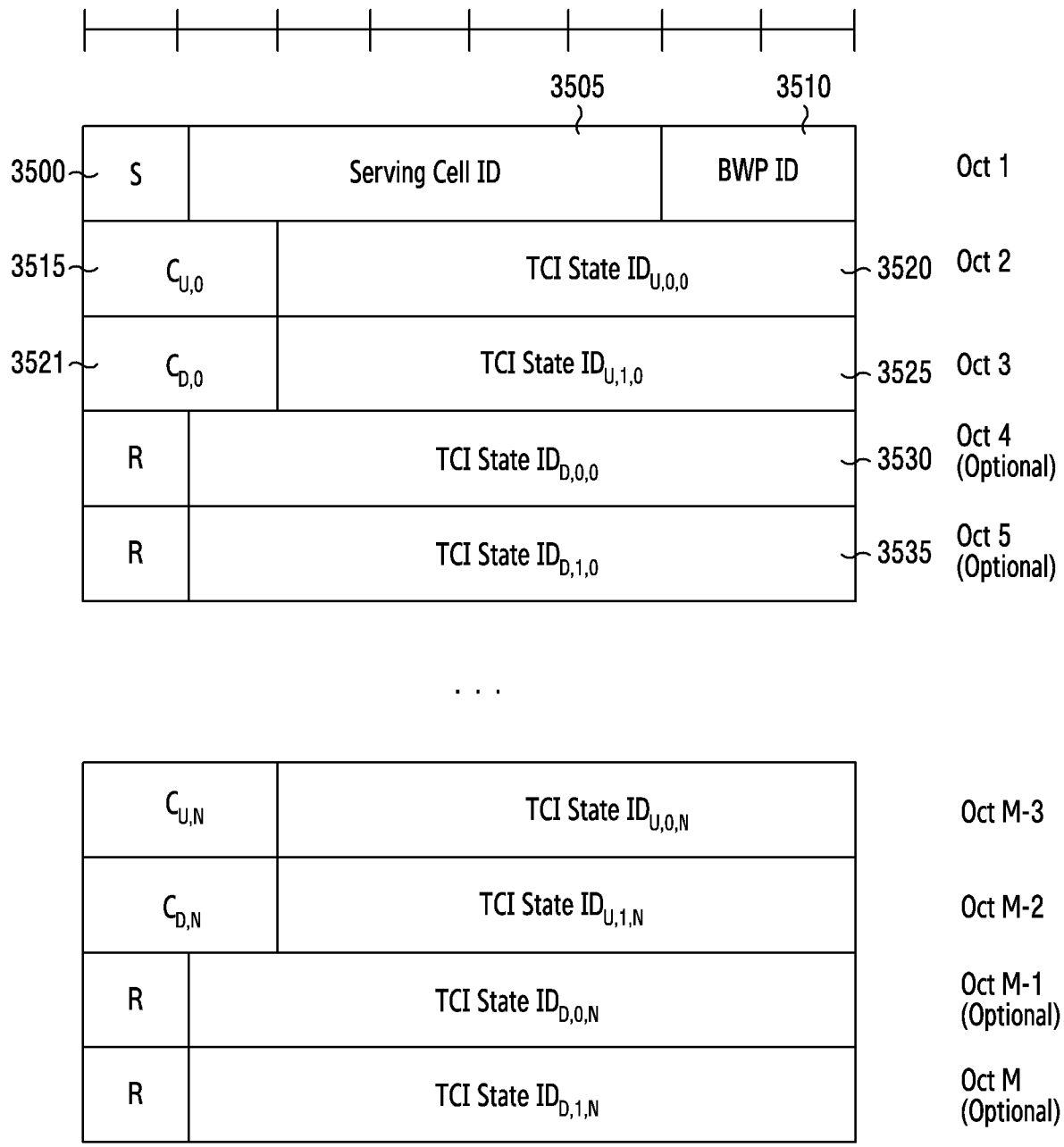
FIG. 35 illustrates a third MAC-CE structure for activating and indicating a plurality of separate TCI states in a wireless communication system according to an embodiment.

FIG. 35 illustrates a third MAC-CE structure for multi-separate TCI state activation and indication in a wireless communication system according to an embodiment.

Referring to FIG. 35, a serving cell ID field 3505 and a BWP ID field 3510 may indicate a serving cell ID and a BWP ID respectively. For example, if an S field value 3500 is 1, a corresponding MAC-CE may indicate one separate TCI state set, and have the length only up to a fifth octet. If the S field value 3500 is 0, the corresponding MAC-CE may include information of multiple separate TCI state sets. If the S field value 3500 is 0, the corresponding MAC-CE may activate one separate TCI state set corresponding to each codepoint of the TCI state field of DCI format 1_1 or 1_2, or activate one separate TCI state set corresponding to each codepoint of two TCI state fields of DCI format 1_1 or 1_2. If the S field value 3500 is 0, the separate TCI state set corresponding to up to 8 or 16 codepoints may be activated by higher layer signaling as mentioned above. The MAC-CE structure of FIG. 35 may correspond to one separate TCI state set every four octets from the second octet. For example, a $C_{U,0}$ field 3515 and a $C_{D,0}$ field 3521 may indicate the number of UL TCI states and the number of DL TCI states respectively included in one separate TCI state set, and may have meaning per codepoint as follows.

If the $C_{U,0}$ field 3515 has the value "00", it may indicate including no UL TCI state. A TCI state $ID_{U,0,0}$ field 3520 and a TCI state $ID_{U,1,0}$ field 3525 may be ignored.

If the $C_{U,0}$ field 3515 has the value "01", it may indicate including one UL TCI state. The TCI state $ID_{U,0,0}$ field 3520 may include one UL TCI state information, and the TCI state $ID_{U,1,0}$ field 3525 may be ignored.

If the $C_{U,0}$ field 3515 has the value "10", it may indicate including two UL TCI states. The TCI state $ID_{U,0,0}$ field 3520 may include first UL TCI state information of the two UL TCI states. The TCI state $ID_{U,1,0}$ field 3525 may include second UL TCI state information of the two UL TCI states.

If the $C_{D,0}$ field 3521 has the value "00", it may indicate including no DL TCI state. The fourth and fifth octets may be ignored.

If the $C_{D,0}$ field 3521 has the value "01", it may indicate including one DL TCI state. A TCI state $ID_{D,0,0}$ field 3530 may include one UL TCI state information, and the fifth octet may be ignored.

If the $C_{D,0}$ field 3521 has the value "10", it may indicate including two DL TCI states. The TCI state $ID_{D,0,0}$ field 3530 may include first DL TCI state information of the two DL TCI states, and a TCI state $ID_{D,1,0}$ field 3535 may include second DL TCI state information of the two DL TCI states.

FIG. 35 shows the third MAC-CE structure for the multi-separate TCI state activation and indication in the wireless communication system according to an embodiment. Specifically, the UL TCI state of the separate TCI state uses the different higher layer signaling structure from the DL TCI state of the separate TCI state and the joint TCI state as described above. Since the UL TCI state requires 6 bits to represent up to 64 states, the TCI state $ID_{D,0,0}$ through TCI state $ID_{D,1,N}$ fields indicating the DL TCI state may be represented with 7 bits, whereas the TCI state $ID_{0,0,0}$ through TCI state $ID_{U,1,N}$ fields indicating the UL TCI state may be represented with 6 bits.

According to an embodiment, the examples of the MAC-CE of FIG. 33 through FIG. 35 may combine at least one of the components therein.

Third Embodiment: Indicated TCI State Application Method Based on the BAT

In an embodiment, a method for applying multiple TCI states indicated based on the unified TCI scheme in consideration of the BAT is explained. As above, if the TCI state is indicated based on DCI format 1_1 or 1_2, the UE may use the transmit and receive beam by applying the indicated TCI state, from a first slot after the BAT from PUCCH transmission including reception success or failure information of corresponding DCI. At this time, if the UE transmission and reception scheduled or activated before the BAT of a newly indicated TCI state does not terminate before the BAT, the newly indicated TCI state is different from the previous TCI state and it may need to change the beam after the BAT. Such UE transmission and reception may consider at least one of the following:

PDSCH repetitive transmission scheduled or semi-statically activated with DCI

PUSCH repetition type A considering an available slot, scheduled or semi-statically activated or configured by DCI inter-slot PUCCH repetitive transmission transport block over multiple slots (TBoMS)

If the transmission and reception scheduled or activated before the BAT does not terminate before the BAT, the transmission and reception may be performed by considering at least one of transmit and receive beam application methods to be described.

Method 3-1: Terminating Transmission and Reception

According to an embodiment, if the transmission and reception scheduled or activated before the BAT does not terminate before the BAT, the UE may terminate the corresponding transmission and reception. This method may be applied if at least one is different between the type of the previously indicated TCI state and the type of the newly indicated TCI state. In addition, the corresponding method may be applied regardless of the number of the previously indicated TCI states and the number of the newly indicated TCI states. Even if one TCI state #1 is previously indicated and the newly indicated TCI states include a TCI state #2 and a TCI state #3, at least one is different between the indicated two TCI state types and accordingly the UE may terminate the transmission and reception scheduled or activated before the BAT, after the BAT.

Method 3-2: Maintaining Beams for Corresponding Transmission and Reception Until Transmission and Reception is Ended According to an embodiment, if the transmission and reception scheduled or activated before the BAT does not terminate before the BAT, the UE may perform the transmission and reception using the previously indicated TCI state until the corresponding transmission and reception ends.

Method 3-3: Applying Newly Indicated Unified TCI

According to an embodiment, if the transmission and reception scheduled or activated before the BAT does not terminate before the BAT, the UE may perform the transmission and reception using the newly indicated TCI state after the BAT. If one TCI state is previously indicated and one TCI state is newly indicated, the UE may apply the newly indicated TCI state to the corresponding transmission and reception after the BAT. If one TCI state is previously indicated and two TCI states are newly indicated, the UE may apply the two new TCI states to the corresponding transmission and reception after the BAT and perform transmission and reception by applying the TCI state to each repetitive transmission and reception, depending on the beam mapping scheme configured with higher layer signaling. In addition, in uplink transmission and downlink reception semi-statically activated to periodically perform single transmission and reception, the UE may apply only the first TCI state newly indicated. If two TCI states are previously indicated and one TCI state is newly indicated, the UE may apply the new TCI state to the corresponding transmission and reception after the BAT. If two TCI states are previously indicated and two TCI states are newly indicated, the UE may apply the two new TCI states to the corresponding transmission and reception after the BAT, and perform repetitive transmission and reception by applying the TCI state to each repetitive transmission and reception, depending on the beam mapping scheme used in the existing transmission and reception. In addition, in uplink transmission and downlink reception semi-statically activated to periodically perform single transmission and reception, the corresponding operation may be performed using the TCI state of the same order, depending on which one of the previously indicated TCI states is used for each transmission and reception. At this time, even if the beam is changed with the newly indicated TCI state after the BAT for the repetitive transmission and reception, the beam mapping sequence before the BAT may be maintained even after the BAT, and the beam mapping sequence may be initiated after the BAT to apply from the first TCI state. Maintaining the beam mapping sequence may indicate, if the beam mapping sequence of the last repetitive transmission and reception before the BAT is the first TCI state and the beam mapping sequence of the first repetitive transmission and reception after the BAT is the second TCI state, performing the transmission and reception by applying the second TCI state of the two new TCI states for the corresponding transmission and reception. For example, the single transmission and reception may be periodically performed by, if the first state of the two previous TCI states is applied to the PUCCH repetitive transmission, applying the first state of the two new TCI states to the corresponding PUCCH repetitive transmission after the BAT.

Method 3-4: Maintaining Transmission and Reception Corresponding to the Same TCI as Previously Indicated TCI of Indicated New Unified TCI According to an embodiment, if the transmission and reception scheduled or activated before the BAT does not terminate before the BAT or if the previous TCI states and the new TCI states have an overlapping TCI state, the UE may maintain transmission and reception of the same TCI state as the previous TCI state among the new TCI states after the BAT, and terminate transmission and reception of other TCI states. If one TCI state is previously indicated, two TCI states are newly indicated, and the first TCI state newly indicated is the same as the previously indicated TCI state, the UE may apply the two new TCI states to the corresponding transmission and reception after the BAT. However, in case of repetition, when the UE performs the transmission and reception by applying the TCI state to each repetitive transmission according to the beam mapping scheme configured with higher layer signaling, the UE may ignore repetitive transmission/reception to which the second TCI state is applied and operate only for repetitive transmission/reception to which the first TCI state is applied. If the previous TCI states and the new TCI states do not overlap, the corresponding Method 3-4 may terminate the existing transmission and reception in the same manner as Method 3-1. If two TCI states are previously indicated, two TCI states are newly indicated, and the previous TCI states and the new TCI states overlap in the first TCI state, the UE may perform only repetitive transmission and reception corresponding to the first TCI state according to the beam mapping scheme used in the existing transmission and reception after the BAT. In addition, uplink transmission and downlink reception semi-statically activated to periodically perform single transmission and reception may maintain the transmission and reception using the first TCI state of the previous TCI states per transmission and reception. In this case, even if the beam is changed with the newly indicated TCI state after the BAT for the repetitive transmission and reception, the beam mapping sequence before the BAT may be maintained even after the BAT, and the beam mapping sequence may be initiated after the BAT to apply from the first TCI state. Maintaining the beam mapping sequence may indicate, if the beam mapping sequence of the last repetitive transmission before the BAT is the first TCI state and the beam mapping sequence of the first repetitive transmission and reception after the BAT is the second TCI state, performing the transmission and reception by applying the second TCI state of the two new TCI states for the corresponding transmission and reception.

The UE may apply one of Method 3-1 through Method 3-4 to every transmission and reception not terminated before the BAT. In addition, a different method may be applied to each transmission and reception, and a different method may be applied depending on the number and the type of the previous TCI states and the new TCI states. For example, the DCI based dynamic scheduling based repetitive transmission may terminate the transmission and reception after a new BAT based on Method 3-1. By contrast, a new transmit and receive beam may be applied based on Method 3-3 to transmission and reception semi-statically activated or configured.

Figure 36:
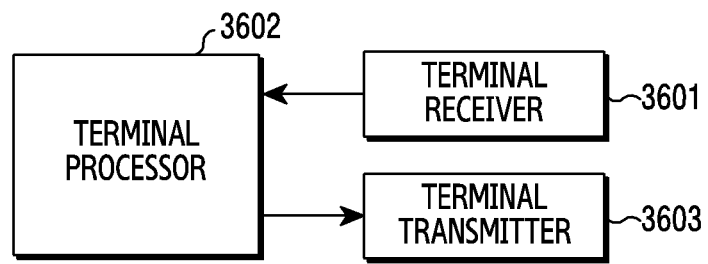
FIG. 36 illustrates a terminal structure in a wireless communication system according to various embodiment.

FIG. 36 illustrates a terminal structure in a wireless communication system according to an embodiment.

Referring to FIG. 36, the terminal may include a transceiver referring to a terminal receiver 3601 and a terminal transmitter 3603, a memory and a terminal processor 3602 (or a terminal controller or processor). According to the above-described communication method of the terminal, the transceiver 3601 and 3603, the memory and the UE processor 3602 of the terminal may operate. However, the components of the terminal are not limited to the above-described example. For example, the terminal may include more or fewer components than the aforementioned components. Further, the transceiver, the memory, and the processor may be implemented with a single chip.

The transceiver 3601 and 3603 of the terminal may transmit and receive a signal to and from the base station. Herein, the signal may include control information and data. For doing so, the transceiver may include a radio frequency (RF) transmitter for up-converting and amplifying a frequency of a transmitted signal, and an RF receiver for low-noise amplifying and down-converting a received signal. However, this is only one embodiment of the transceiver, and the components of the transceiver are not limited to the RF transmitter and the RF receiver.

The transceiver 3601 and 3603 of the terminal may receive a signal over a radio channel, output the same to the processor, and transmit a signal output from the processor over a radio channel.

The memory may store a program and data necessary for the operation of the terminal. In addition, the memory may store control information or data included in the signal transmitted and received by the terminal. The memory may be configured with a storage medium such as read only memory (ROM), random access memory (RAM), hard disk, compact disc (CD)-ROM, and digital versatile disc (DVD), or a combination thereof. In addition, a plurality of memories may be provided.

The processor may control a series of processes to operate the terminal according to the above-described embodiments. For example, the processor may control the components of the terminal to receive DCI including two layers and thus concurrently receive a plurality of PDSCHs. A plurality of processors may be provided, and the processor may execute the program stored in the memory to control the components of the terminal.

Figure 37:
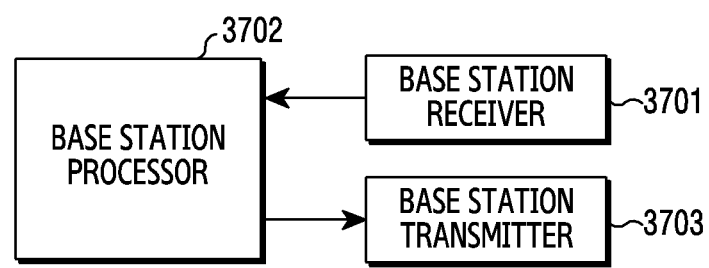
FIG. 37 is a diagram illustrates a base station structure in a wireless communication system according to an embodiment.

FIG. 37 illustrates a structure of a base station in a wireless communication system according to an embodiment.

Referring to FIG. 37, the base station may include a transceiver referring to a base station receiver 3701 and a base station transmitter 3703, a memory and a base station processor 3702 (or a base station controller or a processor). According to the above-described communication method of the base station, the transceiver 3701 and 3703, the memory, and the base station processor 3702 of the base station may operate. However, the components of the base station are not limited to the above-described example. For example, the base station may include more or fewer components than the aforementioned components. In addition, the transceiver, the memory, and the processor may be implemented with a single chip.

The transceiver 3701 and 3703 may transmit and receive a signal to and from the terminal. Herein, the signal may include control information and data. For doing so, the transceiver may include an RF transmitter for up-converting and amplifying a frequency of a transmitted signal, and an RF receiver for low-noise amplifying and down-converting a received signal. However, this is only one embodiment of the transceiver, and the components of the transceiver are not limited to the RF transmitter and the RF receiver.

The transceiver may receive a signal over a radio channel, output the same to the processor, and transmit a signal output from the processor over a radio channel.

The memory may store a program and data necessary for the operation of the base station. In addition, the memory may store control information or data included in the signal transmitted and received by the base station. The memory may be configured with a storage medium such as ROM, RAM, hard disk, CD-ROM, and DVD, or a combination thereof. In addition, a plurality of memories may be provided.

The processor may control a series of processes to operate the base station according to the above-described embodiment. For example, the processor may control the components of the base station to configure and transmit two-layer DCI including allocation information of multiple PDSCHs. A plurality of processors may be provided, and the processor may execute the program stored in the memory to control the components of the base station.

Based on the discussions described above, the disclosure provides a method and an apparatus for repetitive transmission and reception considering a beam application time in a wireless communication system.

Also, the disclosure provides a method and an apparatus for indicating and activating a single transmission configuration indication (TCI) state based on a unified TCI scheme in a wireless communication system.

Also, the disclosure provides a method and an apparatus for indicating and activating multiple TCI states based on a unified TCI scheme in a wireless communication system.

Also, the disclosure provides a method and an apparatus for applying a plurality of TCI states indicated based on a unified TCI scheme in a wireless communication system.

An apparatus and a method according to an embodiment, may enable a terminal to perform beam management using a TCI state for uplink transmission, as indicated from a base station in a unified TCI scheme.

The terminal may terminate a corresponding transmission and reception operation, if the transmission and reception operation scheduled or activated before a beam application time does not end before the beam application time.

The terminal may perform a transmission and reception operation using a previously indicated TCI state until a corresponding transmission and reception terminates, if the transmission and reception operation scheduled or activated before a beam application time does not end before the beam application time.

The terminal may perform a transmission and reception operation using a newly indicated TCI state after a beam application time, if the transmission and reception operation scheduled or activated before a beam application time does not end before the beam application time The methods according to the embodiments described in the claims or the above specification may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification.

Such a program (software module, software) may be stored to a random access memory, a non-volatile memory including a flash memory, a ROM, an electrically erasable programmable ROM (EEPROM), a magnetic disc storage device, a CD-ROM, DVD or other optical storage device, and a magnetic cassette. Alternatively, it may be stored to a memory combining part or all of those recording media. A plurality of memories may be included.

Also, the program may be stored in an attachable storage device accessible via a communication network such as Internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

Meanwhile, the embodiments of the disclosure described in the specification and the drawings merely present specific examples to easily explain the technical contents of the disclosure and help understanding of the disclosure, and are not intended to limit the scope of the disclosure. That is, it will be apparent to those skilled in the art that other variants based on the technical idea of the disclosure may be implemented. Also, the above respective embodiments may be employed in combination, as necessary. For example, one embodiment of the disclosure may be partially combined with another embodiment to operate the base station and the terminal. For example, the first embodiment and the second embodiment of the disclosure may be partially combined to operate the base station and the terminal. In addition, although the above embodiments have been described by way of the FDD LTE system, other variants based on the technical idea of the embodiments may be implemented in other systems such as TDD LTE and 5G or NR systems.

In the drawings for explaining the method of the disclosure, the order of description does not necessarily correspond to the execution order, and the precedence relationship may be changed or may be executed in parallel.

Alternatively, in the drawings explaining the method of the disclosure, some components may be omitted and only some elements may be included therein without departing from the essential spirit and the scope of the disclosure.

Further, the method of the disclosure may be fulfilled by combining some or all of the contents of each embodiment without departing from the essential spirit and the scope of the disclosure.

According to various embodiments, a user equipment (UE) in a wireless communication system is provided, the UE including a transceiver; and a controller coupled with the transceiver and configured to transmit, to a base station (BS), at least one first physical uplink shared channel (PUSCH) of a PUSCH repetition based on at least one first unified transmission configuration indicator (TCI) state, receive, from the BS, downlink control information (DCI) including information indicating at least one second unified TCI state, and perform an operation for at least one second PUSCH of the PUSCH repetition based on the information, wherein the at least one second PUSCH of the PUSCH repetition is after a beam application time (BAT) from a physical uplink control channel (PUCCH) for the DCI.

In one embodiment, wherein, in case that the at least one first unified TCI state is different from the at least one second unified TCI state, a transmission of the at least one second PUSCH of the PUSCH repetition is terminated.

In one embodiment, wherein, in case that the at least one first unified TCI state is different from the at least one second unified TCI state, the at least one second PUSCH of the PUSCH repetition is transmitted based on the at least one first unified TCI state.

In one embodiment, wherein, in case that the at least one first unified TCI state is different from the at least one second unified TCI state, the at least one second PUSCH of the PUSCH repetition is transmitted based on the at least one second unified TCI state.

In one embodiment, wherein, in case that a part of the at least one second unified TCI state is different from the at least one first unified TCI state, a transmission of a PUSCH corresponding to the part among the at least one second PUSCH of the PUSCH repetition is terminated.

According to various embodiments, a base station (BS) in a wireless communication system is provided, the BS including a transceiver; and a controller coupled with the transceiver and configured to receive, from a user equipment (UE), at least one first physical uplink shared channel (PUSCH) of a PUSCH repetition based on at least one first unified transmission configuration indicator (TCI) state, and transmit, from the UE, downlink control information (DCI) including information indicating at least one second unified TCI state, wherein an operation for at least one second PUSCH of the PUSCH repetition is performed based on the information, and wherein the at least one second PUSCH of the PUSCH repetition is after a beam application time (BAT) from a physical uplink control channel (PUCCH) for the DCI.

In one embodiment, wherein, in case that the at least one first unified TCI state is different from the at least one second unified TCI state, a transmission of the at least one second PUSCH of the PUSCH repetition is terminated.

In one embodiment, wherein, in case that the at least one first unified TCI state is different from the at least one second unified TCI state, the at least one second PUSCH of the PUSCH repetition is transmitted based on the at least one first unified TCI state.

In one embodiment, wherein, in case that the at least one first unified TCI state is different from the at least one second unified TCI state, the at least one second PUSCH of the PUSCH repetition is transmitted based on the at least one second unified TCI state.

In one embodiment, wherein, in case that a part of the at least one second unified TCI state is different from the at least one first unified TCI state, a transmission of a PUSCH corresponding to the part among the at least one second PUSCH of the PUSCH repetition is terminated.

According to various embodiments, a method performed by a user equipment (UE) in a wireless communication system is provided, the method including transmitting, to a base station (BS), at least one first physical uplink shared channel (PUSCH) of a PUSCH repetition based on at least one first unified transmission configuration indicator (TCI) state; receiving, from the BS, downlink control information (DCI) including information indicating at least one second unified TCI state; and performing an operation for at least one second PUSCH of the PUSCH repetition based on the information, wherein the at least one second PUSCH of the PUSCH repetition is after a beam application time (BAT) from a physical uplink control channel (PUCCH) for the DCI.

In one embodiment, wherein, in case that the at least one first unified TCI state is different from the at least one second unified TCI state, a transmission of the at least one second PUSCH of the PUSCH repetition is terminated.

In one embodiment, wherein, in case that the at least one first unified TCI state is different from the at least one second unified TCI state, the at least one second PUSCH of the PUSCH repetition is transmitted based on the at least one first unified TCI state.

In one embodiment, wherein, in case that the at least one first unified TCI state is different from the at least one second unified TCI state, the at least one second PUSCH of the PUSCH repetition is transmitted based on the at least one second unified TCI state.

In one embodiment, wherein, in case that a part of the at least one second unified TCI state is different from the at least one first unified TCI state, a transmission of a PUSCH corresponding to the part among the at least one second PUSCH of the PUSCH repetition is terminated.

According to various embodiments, a method performed by a base station (BS) in a wireless communication system is provided, the method including receiving, from a user equipment (UE), at least one first physical uplink shared channel (PUSCH) of a PUSCH repetition based on at least one first unified transmission configuration indicator (TCI) state, and transmitting, from the UE, downlink control information (DCI) including information indicating at least one second unified TCI state, wherein an operation for at least one second PUSCH of the PUSCH repetition is performed based on the information, and wherein the at least one second PUSCH of the PUSCH repetition is after a beam application time (BAT) from a physical uplink control channel (PUCCH) for the DCI.

In one embodiment, wherein, in case that the at least one first unified TCI state is different from the at least one second unified TCI state, a transmission of the at least one second PUSCH of the PUSCH repetition is terminated.

In one embodiment, wherein, in case that the at least one first unified TCI state is different from the at least one second unified TCI state, the at least one second PUSCH of the PUSCH repetition is transmitted based on the at least one first unified TCI state.

In one embodiment, wherein, in case that the at least one first unified TCI state is different from the at least one second unified TCI state, the at least one second PUSCH of the PUSCH repetition is transmitted based on the at least one second unified TCI state.

In one embodiment, wherein, in case that a part of the at least one second unified TCI state is different from the at least one first unified TCI state, a transmission of a PUSCH corresponding to the part among the at least one second PUSCH of the PUSCH repetition is terminated.

Various embodiments of the disclosure have been described. The above description of the disclosure is merely for the purpose of illustration, and is not intended to limit embodiments of the disclosure to the embodiments set forth herein. Those skilled in the art will appreciate that other specific modifications and changes may be easily made thereto without changing the technical idea or essential features of the disclosure. The scope of the disclosure should be determined not by the above description but by the appended claims, and all changes and modifications derived from the meaning and the scope of the claims and equivalent concepts thereof shall be construed as falling within the scope of the disclosure.

What is claimed is:

1. A user equipment (UE) in a wireless communication system, the UE comprising:
   a transceiver; and
   a controller coupled with the transceiver and configured to:
   transmit, to a base station (BS), at least one first physical uplink shared channel (PUSCH) of a PUSCH repetition based on at least one first unified transmission configuration indicator (TCI) state,
   receive, from the BS, downlink control information (DCI) including information indicating at least one second unified TCI state, and
   perform an operation for at least one second PUSCH of the PUSCH repetition based on the information,
   wherein the at least one second PUSCH of the PUSCH repetition is after a beam application time (BAT) from a physical uplink control channel (PUCCH) for the DCI.

2. The UE of claim 1, wherein, in case that the at least one first unified TCI state is different from the at least one second unified TCI state, a transmission of the at least one second PUSCH of the PUSCH repetition is terminated.

3. The UE of claim 1, wherein, in case that the at least one first unified TCI state is different from the at least one second unified TCI state, the at least one second PUSCH of the PUSCH repetition is transmitted based on the at least one first unified TCI state.

4. The UE of claim 1, wherein, in case that the at least one first unified TCI state is different from the at least one second unified TCI state, the at least one second PUSCH of the PUSCH repetition is transmitted based on the at least one second unified TCI state.

5. The UE of claim 1, wherein, in case that a part of the at least one second unified TCI state is different from the at least one first unified TCI state, a transmission of a PUSCH corresponding to the part among the at least one second PUSCH of the PUSCH repetition is terminated.

6. A base station (BS) in a wireless communication system, the BS comprising:
   a transceiver; and
   a controller coupled with the transceiver and configured to:
   receive, from a user equipment (UE), at least one first physical uplink shared channel (PUSCH) of a PUSCH repetition based on at least one first unified transmission configuration indicator (TCI) state, and
   transmit, to the UE, downlink control information (DCI) including information indicating at least one second unified TCI state,
   wherein an operation for at least one second PUSCH of the PUSCH repetition is performed based on the information, and
   wherein the at least one second PUSCH of the PUSCH repetition is after a beam application time (BAT) from a physical uplink control channel (PUCCH) for the DCI.

7. The BS of claim 6, wherein, in case that the at least one first unified TCI state is different from the at least one second unified TCI state, a transmission of the at least one second PUSCH of the PUSCH repetition is terminated.

8. The BS of claim 6, wherein, in case that the at least one first unified TCI state is different from the at least one second unified TCI state, the at least one second PUSCH of the PUSCH repetition is transmitted based on the at least one first unified TCI state.

9. The BS of claim 6, wherein, in case that the at least one first unified TCI state is different from the at least one second unified TCI state, the at least one second PUSCH of the PUSCH repetition is transmitted based on the at least one second unified TCI state.

10. The BS of claim 6, wherein, in case that a part of the at least one second unified TCI state is different from the at least one first unified TCI state, a transmission of a PUSCH corresponding to the part among the at least one second PUSCH of the PUSCH repetition is terminated.

11. A method performed by a user equipment (UE) in a wireless communication system, the method comprising:
    transmitting, to a base station (BS), at least one first physical uplink shared channel (PUSCH) of a PUSCH repetition based on at least one first unified transmission configuration indicator (TCI) state;
    receiving, from the BS, downlink control information (DCI) including information indicating at least one second unified TCI state; and
    performing an operation for at least one second PUSCH of the PUSCH repetition based on the information,
    wherein the at least one second PUSCH of the PUSCH repetition is after a beam application time (BAT) from a physical uplink control channel (PUCCH) for the DCI.

12. The method of claim 11, wherein, in case that the at least one first unified TCI state is different from the at least one second unified TCI state, a transmission of the at least one second PUSCH of the PUSCH repetition is terminated.

13. The method of claim 11, wherein, in case that the at least one first unified TCI state is different from the at least one second unified TCI state, the at least one second PUSCH of the PUSCH repetition is transmitted based on the at least one first unified TCI state.

14. The method of claim 11, wherein, in case that the at least one first unified TCI state is different from the at least one second unified TCI state, the at least one second PUSCH of the PUSCH repetition is transmitted based on the at least one second unified TCI state.

15. The method of claim 11, wherein, in case that a part of the at least one second unified TCI state is different from the at least one first unified TCI state, a transmission of a PUSCH corresponding to the part among the at least one second PUSCH of the PUSCH repetition is terminated.

16. A method performed by a base station (BS) in a wireless communication system, the method comprising:
    receiving, from a user equipment (UE), at least one first physical uplink shared channel (PUSCH) of a PUSCH repetition based on at least one first unified transmission configuration indicator (TCI) state, and
    transmitting, to the UE, downlink control information (DCI) including information indicating at least one second unified TCI state,
    wherein an operation for at least one second PUSCH of the PUSCH repetition is performed based on the information, and
    wherein the at least one second PUSCH of the PUSCH repetition is after a beam application time (BAT) from a physical uplink control channel (PUCCH) for the DCI.

17. The method of claim 16, wherein, in case that the at least one first unified TCI state is different from the at least one second unified TCI state, a transmission of the at least one second PUSCH of the PUSCH repetition is terminated.

18. The method of claim 16, wherein, in case that the at least one first unified TCI state is different from the at least one second unified TCI state, the at least one second PUSCH of the PUSCH repetition is transmitted based on the at least one first unified TCI state.

19. The method of claim 16, wherein, in case that the at least one first unified TCI state is different from the at least one second unified TCI state, the at least one second PUSCH of the PUSCH repetition is transmitted based on the at least one second unified TCI state.

20. The method of claim 16, wherein, in case that a part of the at least one second unified TCI state is different from the at least one first unified TCI state, a transmission of a PUSCH corresponding to the part among the at least one second PUSCH of the PUSCH repetition is terminated.

* * * * *